(12) United States Patent
Yin et al.

(10) Patent No.: US 8,891,402 B2
(45) Date of Patent: Nov. 18, 2014

(54) DEVICES FOR REPORTING UPLINK INFORMATION

(75) Inventors: Zhanping Yin, Vancouver, WA (US); Shohei Yamada, Camas, WA (US); Ahmad Khoshnevis, Portland, OR (US); John M. Kowalski, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 214 days.

(21) Appl. No.: 13/251,165

(22) Filed: Sep. 30, 2011

(65) Prior Publication Data

US 2013/0155898 A1 Jun. 20, 2013

(51) Int. Cl.
*H04L 12/28* (2006.01)

(52) U.S. Cl.
USPC ............................................................ 370/254

(58) Field of Classification Search
CPC ................................................ H04W 72/0446
USPC ..................... 370/328, 252, 280, 329, 315
See application file for complete search history.

(56) References Cited

U.S. PATENT DOCUMENTS

| | | | | |
|---|---|---|---|---|
| 2009/0323617 | A1* | 12/2009 | Che et al. ...................... | 370/329 |
| 2011/0002276 | A1 | 1/2011 | Chen et al. | |
| 2011/0103243 | A1 | 5/2011 | Larsson et al. | |
| 2011/0103323 | A1 | 5/2011 | Wang et al. | |
| 2011/0141878 | A1 | 6/2011 | Che et al. | |
| 2011/0194443 | A1 | 8/2011 | Li et al. | |
| 2011/0310760 | A1* | 12/2011 | Wu et al. ....................... | 370/252 |
| 2012/0099491 | A1* | 4/2012 | Lee et al. ...................... | 370/280 |
| 2012/0113827 | A1* | 5/2012 | Yamada et al. ............... | 370/252 |
| 2013/0034029 | A1* | 2/2013 | Lee ................................ | 370/280 |
| 2013/0051289 | A1* | 2/2013 | Hsieh et al. ................... | 370/280 |
| 2013/0315135 | A1* | 11/2013 | Lee et al. ...................... | 370/315 |

OTHER PUBLICATIONS

Catt, "TDD Inter-band Carrier Aggregation," 3GPP TSG RAN WG2 Meeting #75, R2-113944, Aug. 2011.
Sharp, "Uplink Reporting for Inter-band Carrier Aggregation with Different TDD Configurations," 3GPP TSG-RAN WG1 #66, R1-113345, Oct. 2011.
International Search Report issued for International Application No. PCT/JP2012/006040 on Nov. 20, 2012.
Huawei, HiSilicon, "Discussion on Different UL-DL Configurations for TDD with Inter-Band CA," 3GPP TSG RAN WG1 Meeting #66, R1-112036, Aug. 2011.
Ericsson, ST-Ericsson, "Operating Principles of Interband TDD CA with Different UL-DL Configurations," 3GPP TSG-RAN WG1 #66, R1-112079, Aug. 2011.

(Continued)

*Primary Examiner* — Yemane Mesfin
*Assistant Examiner* — Derrick V Rose
(74) *Attorney, Agent, or Firm* — Keating & Bennett, LLP

(57) ABSTRACT

A user equipment (UE) for reporting information is described. The UE includes a processor and instructions stored in memory that is in electronic communication with the processor. The UE selects a reference cell having a reference uplink-downlink (UL-DL) configuration. The UE also selects a first uplink subframe from the reference cell. The UE further selects a first subframe set from a first cell having a first UL-DL configuration. The first UL-DL configuration is different than the reference UL-DL configuration. The UE additionally determines a first set of associations between the first subframe set and the first uplink subframe. The UE further aggregates information corresponding to the reference cell and information corresponding to the first cell based on the first set of associations to produce aggregated information. The UE also reports the aggregated information on an uplink reporting cell.

12 Claims, 30 Drawing Sheets

(56) References Cited

OTHER PUBLICATIONS

Ericsson, St-Ericsson, "Hardware Impact of Supporting Interband TDD CA with Different UL-DL," 3GPP TSG-RAN WG1 #66, R1-112080, Aug. 2011.
Catt, "TDD Inter-band Carrier Aggregation," 3GPP TSG RAN WG1 Meeting #66, R1-112106, Aug. 2011.
Intel Corporation, "Control/Timing Issues Related to Mixed TDD Configurations in Inter-band CA," 3GPP TSG RAN 1 #66 Meeting, R1-112213, Aug. 2011.
Intel Corporation, "Supporting Different UL-DL Configurations for LTE TDD Inter-band Carrier Aggregation," 3GPP TSG RAN WG1 Meeting, #66, R1-112214, Aug. 2011.
Zte, "On Support of Inter-Band CA with Different TDD UL-DL Configurations," 3GPP TSG RAN WG1 Meeting #66, R1-112247, Aug. 2011.
Pantech, "Views on Support of Different TDD Configuration in Rel-11," 3GPP TSG RAN1 #66, R1-112280, Aug. 2011.
Renesas Mobile Europe Ltd., "Operation Principles of CC Specific TDD Configuration," 3GPP TSG-RAN WG1 Meeting #66, R1-112306, Aug. 2011.
MediaTek, Inc., "HARQ Feedback Mechanism in CA with Different TDD Configurations," 3GPP TSG-RAN WG1 Meeting #66, R1-112349, Aug. 2011.
Panasonic, "Issues on TDD Different DL/UL Configurations on Different Bands for Rel-11," 3GPP TSG-RAN WG1 Meeting #66, R1-112358, Aug. 2011.
Nokia Siemens Networks, Nokia Corporation, "Views on Inter-Band CA with Different TDD Configurations on Different Bands," 3GPP TSG-RAN WG1 Meeting #66, R1-112379, Aug. 2011.
Alcatel-Lucent, Alcatel-Lucent Shanghai Bell, "CC-Specific TDD Configuration for Enhanced CA in Rel-11," 3GPP TSG RAN WG1 Meeting #66, R1-112408, Aug. 2011.
ITRI, "Support Cell-Specific TDD UL-DL Configuration for Inter-Band CA," 3GPP TSG-RAN WG1 Meeting #66, R1-112451, Aug. 2011.
LG Electronics, "Consideration on Different TDD UL/DL Configurations for Inter-band CA," 3GPP TSG RAN WG1 Meeting #66, R1-112474, Aug. 2011.
Samsung, "DL/UL HARQ-ACK Transmission in CA with Different TDD Configurations," 3GPP TSG RAN WG1 #66, R1-112502, Aug. 2011.
Samsung, "Data Scheduling in CA with Different TDD UL-DL Configurations," 3GPP TSG RAN WG1 Meeting #66, R1-112503, Aug. 2011.
Qualcomm Incorporated, "Support of Different TDD UL-DL Configurations on Different Bands," 3GPP TSG-RAN WG1 #66, R1-112540, Aug. 2011.
Potevio, "Support of Different TDD UL-DL Configurations on Different Bands," 3GPP TSG RAN WG1 Meeting #66, R1-112579, Aug. 2011.
MediaTek Inc., "Cross-Carrier Scheduling on Different TDD Configurations," 3GPP TSG-RAN WG1 Meeting #66, R1-112584, Aug. 2011.
HTC, "Discussion on Different TDD UL-DL Configurations on Different Bands in Carrier Aggregation," 3GPP TSG RAN WG1 Meeting #66, R1-112597, Aug. 2011.
New Postcom, "Inter-Band CA with Different UL-DL Configuration in TDD," 3GPP TSG RAN WG1 Meeting #66, R1-112656, Aug. 2011.
3GPP TS 36.211 V9.0.0, "Evolved Universal Terrestrial Radio Access (E-UTRA); Physical Channels and Modulation (Release 9)," Dec. 2009.
3GPP TS 36.213 V8.6.0, "Evolved Universal Terrestrial Radio Access (E-UTRA); Physical Layer Procedures (Release 8)," Mar. 2009.
3GPP TS 36.331 V9.1.0, "Evolved Universal Terrestrial Radio Access (E-UTRA) Radio Resource Control (RRC); Protocol Specification (Release 9)," Dec. 2009.
3GPP TS 36.212 V9.0.0, "Evolved Universal Terrestrial Radio Access (E-UTRA); Multiplexing and Channel Coding (Release 9)," Dec. 2009.
MCC Support, "Draft Report of 3GPP TSG RAN WG1 #66 v0.2.0," 3GPP TSG RAN WG1 Meeting #66bis, R1-11xxxx, Sep. 2011.

* cited by examiner

DEVICES FOR REPORTING UPLINK INFORMATION

TECHNICAL FIELD

The present disclosure relates generally to communication systems. More specifically, the present disclosure relates to devices for reporting uplink information.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a fixed station that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
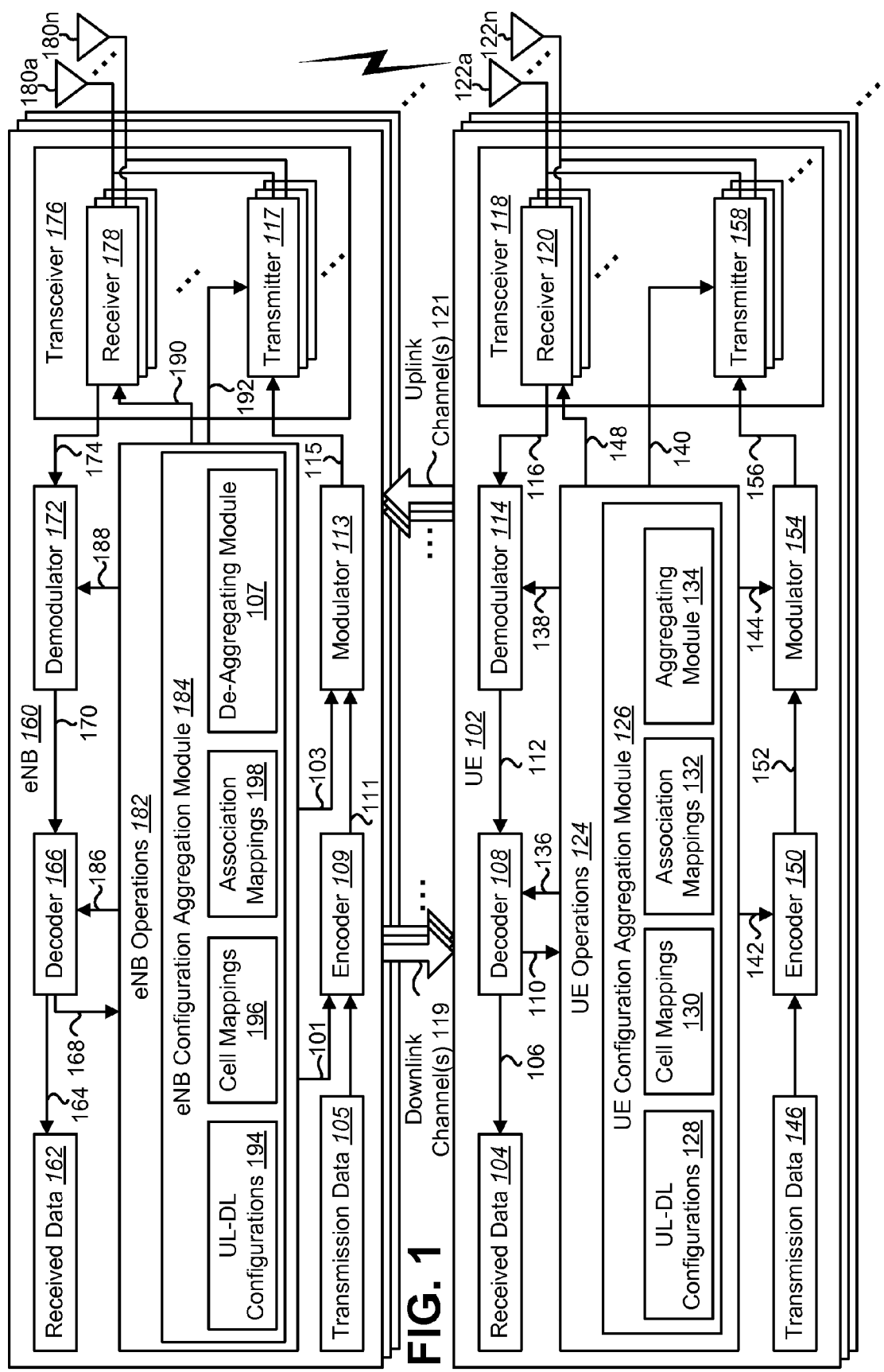
FIG. 1 is a block diagram illustrating one configuration of one or more evolved Node Bs (eNBs) and one or more user equipments (UEs) in which systems and methods for reporting uplink information with different duplexing configurations may be implemented.

A user equipment (UE) for reporting information is described. The UE includes a processor and instructions stored in memory that is in electronic communication with the processor. The UE selects a reference cell having a reference uplink-downlink (UL-DL) configuration. The UE also selects a first uplink subframe from the reference cell. The UE further selects a first subframe set from a first cell having a first UL-DL configuration. The UE additionally determines a first set of associations between the first subframe set and the first uplink subframe. The UE also aggregates information corresponding to the reference cell and information corresponding to the first cell based on the first set of associations to produce aggregated information. The UE further reports the aggregated information on an uplink reporting cell.

The aggregated information may include acknowledgment/negative acknowledgment (ACK/NACK) information.

The first subframe set may define an association region based on the reference cell. The association region may be the same for all UL-DL configurations. The UE may determine at least one additional set of associations between at least one additional subframe set from the first cell and at least one additional uplink subframe from the reference cell.

The first set of associations and the at least one additional set of associations may be balanced between the first uplink subframe and the at least one additional uplink subframe. Determining the first set of associations and determining the at least one additional set of associations may include at least minimizing the distance of each association or minimizing the total distance for all of the associations.

Selecting the reference cell may include determining at least one cell with a smallest periodicity. If it is determined that one cell is a cell with a smallest periodicity, then the reference cell may be the cell with the smallest periodicity. The UE may also determines if more than one cell is a cell with a smallest periodicity. If it is determined that more than one cell has the smallest periodicity, then at least one cell with a highest uplink allocation may be determined. If it is determined that one cell is a cell with the highest uplink allocation, then the reference cell may be the cell with the highest uplink allocation. The UE may further determine if more than one cell is a cell with a highest uplink allocation If it is determined that more than one cell has the highest uplink allocation, then a cell with the lowest cell index (Cell_ID) may be determined and the reference cell may be the cell with the lowest cell index (Cell_ID).

The uplink reporting cell may be a cell with the lowest cell index (Cell_ID) for a particular uplink subframe. The first cell may be in a first band and the reference cell may be in a second band. The first band and the second band may be different bands.

The reference UL-DL configuration may be a superset UL-DL configuration that combines one or more uplink subframes from a PCell and one or more SCells using different UL-DL configurations. The reference UL-DL configuration and the first UL-DL configuration may be the same UL-DL configuration or different UL-DL configurations.

A method for reporting information by a user equipment (UE) is also described. The method includes selecting a reference cell having a reference uplink-downlink (UL-DL) configuration. The method also includes selecting a first uplink subframe from the reference cell. The method further includes selecting a first subframe set from a first cell having a first UL-DL configuration. The method additionally includes determining a first set of associations between the first subframe set and the first uplink subframe. The method also includes aggregating information corresponding to the reference cell and information corresponding to the first cell based on the first set of associations to produce aggregated information. The method further includes reporting the aggregated information on an uplink reporting cell.

An evolved Node B (eNB) for receiving information is also described. The eNB includes a processor and instructions stored in memory that is in electronic communication with the processor. The eNB determines if aggregated information is being used in connection with a first cell having a first uplink-downlink (UL-DL) configuration and a second cell having a second UL-DL configuration. The first UL-DL configuration is different than the second UL-DL configuration. The eNB also receives aggregated information on an uplink reporting cell. The eNB further de-aggregates the aggregated information based on a set of associations. The uplink reporting cell may be the first cell or the second cell with the lowest cell index (Cell_ID) for each particular uplink subframe.

A method for receiving information by an evolved Node B (eNB). The method includes determining if aggregated information is being used in connection with a first cell having a first uplink-downlink (UL-DL) configuration and a second cell having a second UL-DL configuration. The method also includes receiving aggregated information on an uplink reporting cell. The method further includes de-aggregating the aggregated information based on a set of associations.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP Long Term Evolution (LTE), LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a User Equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a User Equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency band) to be used for communication between a Node B (e.g., eNodeB) and a UE. "Configured cells" are those cells of which the UE is aware and is allowed by a Node B (e.g., eNB) to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

In 3GPP specifications, carrier aggregation typically refers to the concurrent utilization of more than one carrier. In one example, carrier aggregation may be used to increase the effective bandwidth available to a UE. One type of carrier aggregation is inter-band carrier aggregation. In inter-band carrier aggregation, multiple carriers from multiple bands may be aggregated. For example, a carrier in a first band (e.g., 800 MHz) may be aggregated with a carrier in a second band (e.g., 2.6 GHz).

In the carrier aggregation enhancement, different time division duplex (TDD) uplink-downlink (UL-DL) configurations may be used for inter-band aggregation (e.g., the cells or component carriers (CCs) in different bands may have different UL-DL configurations). Carrier aggregation with different TDD configurations may be referred to as inter-band carrier aggregation.

For inter-band carrier aggregation, full-duplex may be supported so that a UE can simultaneously transmit on one cell in one band, and receive on another cell in another band. With full duplex support, the uplink scheduling and uplink transmission may be performed independently on each band. The acknowledgement/negative acknowledgement (ACK/NACK) feedback on the physical hybrid automatic repeat request (ARQ) indication channel (PHICH) or the physical downlink control channel (PDCCH) can also be handled by each carrier. However, in the current specification (e.g., 3GPP Release 10), the uplink reporting is carried only on the primary cell (PCell). This may or may not be changed in the future (e.g., in 3GPP Release 11). Under the current specification (e.g., 3GPP Release 10) for inter-band carrier aggregation with different UL-DL configurations, the uplink reporting of a secondary cell (SCell) with a different UL-DL configuration may be dropped. Therefore, some new rules of aggregating and reporting of ACK/NACK for downlink transmission need to be defined for inter-band carrier aggregation with different TDD UL-DL configurations.

The systems and methods disclosed herein may be used for uplink reporting when different UL-DL configurations are used in different cells. Furthermore, the systems and methods disclosed herein may be used to multiplex and aggregate uplink control information (UCI) reports from multiple cells in different bands to one uplink reporting on a physical uplink control channel (PUCCH) or a physical uplink shared channel (PUSCH). One example of UCI may be ACK/NACK reporting (e.g., ACK/NACK bits).

The systems and methods disclosed herein may be used to select uplink subframes in cells for uplink reporting. The systems and methods disclosed herein may also be used for ACK/NACK multiplexing and reporting based on subframe region mapping. The systems and methods disclosed herein may additionally be used for ACK/NACK multiplexing and reporting based on PCell uplink configuration. The systems and methods disclosed herein may also be used for ACK/NACK multiplexing and reporting based on the cell with maximum uplink allocation. The systems and methods disclosed herein may additionally be used for ACK/NACK multiplexing and reporting based on a cell with the aggregated uplink allocation of multiple (e.g., some, all) cells.

To achieve different downlink and uplink traffic ratios, seven UL-DL configurations are specified in 3GPP specifications (e.g., 3GPP TS 36.211). These allocations can allocate between 40% and 90% of subframes to downlink signals.

It should be noted that a subframe association may be referred to as an "uplink-downlink association," which may include uplink-to-downlink subframe associations and/or downlink-to-uplink subframe associations. Examples of associations include association of a downlink subframe physical downlink control channel (PDCCH) to uplink power control in an uplink subframe, association of a downlink subframe physical downlink control channel (PDCCH) to physical uplink shared channel (PUSCH) allocation in an uplink subframe, associations of acknowledgement and negative acknowledgement (ACK/NACK) feedback on uplink subframe(s) for physical downlink shared channel (PDSCH) transmissions in downlink subframe(s), association of acknowledgement and negative acknowledgement (ACK/NACK) feedback on a physical hybrid automatic repeat request (HARQ) indicator channel (PHICH) or physical downlink control channel (PDCCH) for physical uplink shared channel (PUSCH) transmission(s) in uplink subframe(s), etc.

The LTE-TDD frame structure and the uplink-downlink configuration may be given in 3GPP TS 36.211[1]. Uplink-downlink configurations with both 5 millisecond (ms) and 10 ms downlink-to-uplink switch-point periodicity may be supported. In current LTE TDD systems, there are seven UL-DL configurations (e.g., configurations 0-6) that are specified in the standard.

Configuration zero (e.g., "0") is a 5 ms configuration with an allocation of six uplink (UL) subframes (which may be a current maximum allocation for UL subframes). An illustration of two radio frames of configuration 0 is provided in Table 1 below. In the Tables given hereafter, "D" denotes a downlink subframe, "U" denotes an uplink subframe and "S" denotes a special subframe.

TABLE 1

| | Subframe Number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| Subframe Type | D | S | U | U | U | D | S | U | U | U | D | S | U | U | U | D | S | U | U | U |

Configuration one (e.g., "1") is a 5 ms configuration with 4 UL subframes. An illustration of two radio frames of configuration 1 is provided in Table 2 below.

TABLE 2

| | Subframe Number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| Subframe Type | D | S | U | U | D | D | S | U | U | D | D | S | U | U | D | D | S | U | U | D |

Configuration two (e.g., "2") is a 5 ms configuration with 2 UL subframes. An illustration of two radio frames of configuration 2 is provided in Table 3 below.

TABLE 3

| | Subframe Number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| Subframe Type | D | S | U | D | D | D | S | U | D | D | D | S | U | D | D | D | S | U | D | D |

Configuration three (e.g., "3") is a 10 ms configuration with 3 UL subframes (which may be the maximum number of uplink subframes for current 10 ms configurations). An illustration of two radio frames of configuration 3 is provided in Table 4 below.

TABLE 4

| | Subframe Number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| Subframe Type | D | S | U | U | U | D | D | D | D | D | D | S | U | U | U | D | D | D | D | D |

Configuration four (e.g., "4") is a 10 ms configuration with 2 UL subframes. An illustration of two radio frames of configuration 4 is provided in Table 5 below.

TABLE 5

| | Subframe Number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| Subframe Type | D | S | U | U | D | D | D | D | D | D | D | S | U | U | D | D | D | D | D | D |

Configuration five (e.g., "5") is a 10 ms configuration with 1 UL subframe. An illustration of two radio frames of configuration 5 is provided in Table 6 below.

TABLE 6

| | Subframe Number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| Subframe Type | D | S | U | D | D | D | D | D | D | D | D | S | U | D | D | D | D | D | D | D |

Configuration six (e.g., "6") is a 5 ms configuration with 5 UL subframes. An illustration of two radio frames of configuration 6 is provided in Table 7 below.

TABLE 7

| | Subframe Number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 0 | 1 | 2 | 3 | 4 | 5 | 6 | 7 | 8 | 9 |
| Subframe Type | D | S | U | U | U | D | S | U | U | D | D | S | U | U | U | D | S | U | U | D |

Examples of associations (in LTE-TDD, for instance) include the association of a PDCCH for uplink power control of an uplink subframe, association of a PDCCH for physical uplink shared channel (PUSCH) allocation in an uplink subframe, associations of ACK/NACK feedback of downlink transmission on uplink subframe(s), ACK/NACK feedback of uplink transmission on PHICH or PDCCH, etc.

For clarity, one example of a frame structure that may be used in accordance with the systems and methods disclosed herein is given from 3GPP TS 36.211 as follows. This frame structure may be applicable in time-division duplexing (TDD) approaches. Each frame may have a length of $T_f = 307200 \cdot T_s = 10$ milliseconds (ms), where $T_f$ is a radio frame duration and $T_s$ is a time unit equal to $$\frac{1}{(15000 \times 2048)}$$

seconds. The frame may include two half-frames, each having a length of $153600 \cdot T_s = 5$ ms. Each half-frame may include five subframes, each having a length of $30720 \cdot T_s = 1$ ms. Some UL-DL frame configurations are illustrated in Table 8 below.

TABLE 8

| UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 8, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table 9 (from Table 4.2-1 of 3GPP TS 36.211) subject to the total length of DwPTS, GP and UpPTS being equal to $30720 \cdot T_s = 1$ ms. Table 9 illustrates several configurations of (standard) special subframes. Each subframe i is defined as two slots, 2i and 2i+1 of length $T_{slot} = 15360 \cdot T_s = 0.5$ ms in each subframe. In Table 9, "cyclic prefix" is abbreviated as "CP" and "configuration" is abbreviated as "Config" for convenience.

TABLE 9

| | Normal CP in downlink | | | Extended CP in downlink | | |
|---|---|---|---|---|---|---|
| | | UpPTS | | | UpPTS | |
| Special Subframe Config | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL-DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission. In case multiple cells are aggregated, a UE may assume the same UL-DL configuration across all the cells and that the guard period of the special subframe in the different cells have an overlap of at least $1456 \cdot T_s$.

The UL-DL configuration may be a part of a SystemInformationBlockType1 (SIB1), defined by an information element (IE) TDD-Config, which includes a subframe assignment and specialSubframePatterns. The SIB1 may be transmitted on a broadcast control channel as a logical channel.

In the current specification (e.g., 3GPP Release 10) for carrier aggregation, the same TDD UL-DL configuration may be required for all aggregated cells. Additionally, the TDD UL-DL configuration may only be obtained from a PCell. As given in TS 36.331 Section 5.2.2.1[3]:

"The UE applies the system information acquisition and change monitoring procedures for the PCell only. For SCells, E-UTRAN provides, via dedicated signalling, all system information relevant for operation in RRC_CONNECTED when adding the SCell. Upon change of the relevant system information of a configured SCell, E-UTRAN releases and subsequently adds the concerned SCell, which may be done with a single RRCConnectionReconfiguration message. E-UTRAN may configure via dedicated signalling different parameter values than the ones broadcast in the concerned SCell."

Support for different TDD UL-DL configurations on different bands is considered in 3GPP discussion of carrier aggregation enhancement. The carrier aggregation with different TDD configurations may also be called inter-band carrier aggregation. The carrier aggregation in a heterogeneous network scenario is the key incentive for different TDD UL-DL configurations. With a heterogeneous network, a pico-cell in one band may have a very different UL-DL traffic load than a macro-cell in another band. Such a situation may require different UL-DL configurations. The PCell may be configured with the marco-cell or the pico-cell.

In one configuration of carrier aggregation, it may be assumed that the same eNB scheduler manages the resource for the PCell and SCell(s). Thus, the scheduler may know the actual configuration of each cell. The UEs may also be informed of the actual UL-DL configuration of each aggregated cell. This may especially be the case if the UE has a different UL-DL configuration from the PCell.

In a 3GPP specification meeting (e.g., RAN1 #66), it was agreed that: "If Support of different TDD UL-DL configurations on different bands is specified, the UEs will be informed of the actual UL/DL configuration of each aggregated CC. Note that depending on how the Rel-10 signalling is modified, it should be ensured that CCs in the same band have the same configuration. [5]" Also, it was agreed (e.g., RAN1 #66) that no new UL-DL configuration should be introduced.

Two methods may be used to get the UL-DL configuration of an SCell on a different band from the PCell. One method is to reuse existing dedicated signalling. For example, for SCells in a different band, E-UTRAN provides, via dedicated signalling, all system information relevant for operation in RRC_CONNECTED when adding the SCell. Upon change of the relevant system information of a configured SCell, E-UTRAN may release and may subsequently add the concerned SCell, which may be done with a single RRCConnectionReconfiguration message. In another method, when an SCell in a different band is added, the UE may be setup with an anchor cell, or a special SCell, or a secondary PCell, or a band PCell, in the band, and may obtain the system information from the PSS/SSS and BCH of each band. This may require more monitoring by the UE.

For inter-band carrier aggregation, each band may have its own power amplifier and filter. Thus, full duplex may be supported for simultaneous transmission on a cell in one band and reception on another cell in a different band.

There are four basic functions in uplink and downlink associations. Details can be found in TS36.213[2]. Downlink transmission and scheduling: PDSCH allocation is provided in the PDCCH and PDSCH transmission is performed in the same subframe. Uplink transmission scheduling or uplink grant: the UE shall upon detection of a PDCCH with uplink DCI format and/or a PHICH transmission in subframe n intended for the UE, adjust the corresponding PUSCH transmission in subframe n+k, with k given in Table 8-2 of TS 36.213, according to the PDCCH and PHICH information. Downlink ACK/NACK feedback for uplink transmissions: for PUSCH transmissions scheduled from serving cell c in subframe n, a UE shall determine the corresponding PHICH resource of serving cell c in subframe $n+k_{PHICH}$, where $k_{PHICH}$ is given in Table 9.1.2-1 of TS 36.213 for TDD. Alternatively, the PDCCH can override PHICH by indicating a new uplink grant with new data transmission or retransmission. Uplink ACK/NACK feedback for downlink transmissions: the ACK/NACK bits from a downlink association set are reported on PUCCH or PUSCH if PUSCH is allocated for the UE in the uplink subframe. The downlink association set depends on the TDD UL-DL configuration, as given in Table 10.1.3.1-1 of TS 36.213, which is given as Table 10 below. In Release-10 with carrier aggregation, the ACK/NACK bits of multiple serving cells are multiplexed and/or bundled, and reported on the PCell only with PUCCH or PUSCH transmission.

TABLE 10

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

With full-duplex support, the uplink scheduling and uplink transmission may be performed independently on each band. The ACK/NACK feedback on PHICH or PDCCH can also be handled by each carrier. Since different configurations have different uplink scheduling associations, cross-carrier scheduling for uplink transmissions may be disabled. However, cross-carrier scheduling for downlink transmissions may be used in a subframe where both cells have a downlink allocation. Furthermore, uplink scheduling may also be used if the association rules are defined so that there is no conflict with existing per cell based scheduling. In one configuration, all downlink signalling and PUSCH and PDSCH transmissions may be handled with full-duplex support for inter-band carrier aggregation with different UL-DL configurations.

However, in the Release-10 specification, the uplink reporting may be carried only on the PCell. For inter-band carrier aggregation with different UL-DL configurations, the uplink reporting of an SCell with a different UL-DL configuration may be dropped if the PCell has a downlink allocation and the SCell has an uplink allocation in the subframe. Conversely, in a subframe where a PCell is configured with an uplink and an SCell is configured with a downlink allocation, the ACK/NACK from the SCell may not be reported on the PCell because there is no uplink association for the ACK/NACK transmission in the SCell for the given subframe.

Similarly, the PUCCH and PUSCH are also used for feedback of channel state information (CSI). In Release-10, CSI reporting is scheduled independently for each cell, but only the PCell may carry the CSI reporting. Thus, a collision between an ACK/NACK and the CSI reporting may occur. With full-duplex support, several approaches may be considered to solve the uplink reporting problem.

Approach 1: In one approach, each band may have an anchor cell (e.g., the PCell in one band, an SCell in a different band may perform as a special SCell (SSCell), secondary PCell (SPCell) or primary secondary cell (PSCell) for the given band). Thus, the ACK/NACK reporting on PUCCH or PUSCH may be done on the SSCell, SPCell or PSCell for all the serving cells of each band. Since all the serving cells in a band have the same UL-DL configuration, there is no conflict in existing UL-DL associations. However, this approach requires multiple PUCCH or PUSCH reporting if inter-band aggregation is used. Even if the same UL-DL configuration is used in different bands, multiple PUCCH or PUSCH reporting are needed.

Approach 2: In another approach, each group of cells with the same UL-DL configuration may have an anchor cell (e.g., the PCell in one group, an SCell in a different band with a different UL-DL configuration may perform as an SSCell, SPCell or PSCell for the given UL-DL configuration group). Thus, the ACK/NACK reporting on PUCCH or PUSCH may be performed for each UL-DL configuration group. Note a UL-DL configuration group may include cells in different bands if they have the same UL-DL configuration. Since all serving cells in a group have the same UL-DL configuration, there is no conflict in existing UL-DL associations. Again, this approach requires multiple PUCCH or PUSCH reporting if inter-band aggregation with different UL-DL configurations is used.

Approach 3: In another approach, the PUCCH or PUSCH reporting of ACK/NACK and CSI may be carried on a PCell only. This is consistent with the current specification (e.g., 3GPP Release-10). For inter-band carrier aggregation with different UL-DL configurations, the uplink reporting of an SCell with a different UL-DL configuration may not be able to transmit if the PCell has a downlink allocation and the SCell has an uplink allocation in the subframe. Therefore, some new rules of aggregating and reporting of ACK/NACK for downlink transmission may need to be defined for inter-band carrier aggregation with different UL-DL configurations.

Approach 4: In yet another approach, PUCCH or PUSCH reporting may be carried on a serving cell. The serving cell may be the PCell, an SCell or a combination of uplink subframes in the PCell and SCell(s). For example, the serving cell may be a PCell for a first uplink subframe and may be an SCell for a second uplink subframe (with the first uplink subframe and the second uplink subframe occurring in the same radio frame, for example). Again, some new rules of aggregating and reporting of ACK/NACK for downlink transmission may need to be defined for inter-band carrier aggregation with different UL-DL configurations.

In many cases, the ACK/NACK bits of each cell depend on the actual PDSCH transmissions of the cell. If no PDSCH transmission is scheduled for a UE on a cell, there may be no ACK/NACK feedback on uplink reports for the given cell. If there are ACK/NACK bits to be reported on a cell, the rules of report association may need to be defined for the cell if it has a different configuration from the reporting reference configuration (e.g., the PCell configuration).

The systems and methods described herein may be directed to the uplink ACK/NACK multiplexing and reporting indicated in approach 3 and approach 4. In particular, an approach on how to aggregate the ACK/NACK bits for downlink transmissions on cells with different TDD UL-DL configurations is described.

With approach 3, PUCCH or PUSCH reporting may be carried on the PCell only. When an SCell has a different configuration from the PCell, the ACK/NACK reporting of downlink transmissions may have different associations. Thus, ACK/NACK from different subframe indexes in the SCell and the PCell may be associated to the same uplink subframe in both the PCell and the SCell. Furthermore, there may be cases where a subframe is configured with downlink in the PCell and an uplink in the SCell. Thus, the ACK/NACK associated in an SCell cannot be reported in the PCell if the existing SCell associations are used. Thus, new rules may need to be developed to aggregate the ACK/NACK bits for downlink transmissions on cells with different UL-DL allocations.

In one association mapping approach, the same association mapping can be applied to all UL-DL configurations. For example, an association region for each UL-DL configuration may be defined for the uplink reporting of different UL-DL configurations. The association region may be derived from the reference configuration.

In the case of PCell-only reporting, the reference configuration may be the PCell configuration. Thus, the applied association region may keep the same ACK/NACK associations for the PCell. The association region may add possible downlink transmission associations from different UL-DL configurations on the SCells and may associate then to the uplink subframes of the PCell. For an SCell, the ACK/NACK bits of the SCell in each association region is obtained and reported on the associated uplink in the PCell.

The approach may have many advantages. For example, this approach may be beneficial because it may provide simple and unified association mappings based on the reference configuration. This approach may also be beneficial because the fixed cells for uplink reporting may allow for backwards compatibility. Additionally, this approach may be beneficial because there may be no mapping changes with an SCell activation (e.g., adding an SCell) or deactivation (e.g., removing an SCell). Furthermore, this approach may be beneficial because there may be no mapping change with an SCell re-configuration (e.g., change in UL-DL configuration of the SCell).

The modified downlink association set index is given in Table 11 below. The new, added associations are included in parentheses and are added to the end of existing associations of the reference cell UL-DL configuration, i.e., the PCell in this case. Thus, for the PCell, the association may be the same as in the current specification (e.g., 3GPP Releases 8, 9 and 10). The added associations may not apply for the PCell reporting and the ordering of ACK/NACK bits may follow the existing rules. The added associations may apply for the reporting of an SCell. On the other hand, some of the existing associations from the PCell may not apply to an SCell. Therefore, the ACK/NACK bits for an SCell may remove the bits that are not applicable to the SCell configuration and may include the bits in the added associations that are applicable. The ACK/NACK bits ordering may follow the given set index order in Table 11.

TABLE 11

| Reference Cell UL-DL Configuration | Subframe n | | | | | | | | |
|---|---|---|---|---|---|---|---|---|---|
| | 0 | 1 | 2 | 3 | 4 | 5 | 6 | 7 | 8 | 9 |
| 0 | — | — | 6, (5) | (5, 4) | 4 | — | — | 6 | (5, 4) | 4 |
| 1 | — | — | 7, 6 | 4, (6, 5) | — | — | — | 7, 6 | 4, (5) | — |
| 2 | — | — | 8, 7, 4, 6, (5) | — | — | — | — | 8, 7, 4, 6 | — | — |
| 3 | — | — | 7, 6, 11, (9, 8) | 6, 5 | 5, 4 | — | — | — | — | — |
| 4 | — | — | 12, 8, 7, 11, (9) | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7, (6) | 5, (6) | — | — | 7 | 7, (5, 4) | — |

The ACK/NACK reporting on the PCell may be the aggregated ACK/NACK bits of the PCell and the SCell(s). The ACK/NACK aggregation may be performed by multiplexing the ACK/NACK bits of each serving cell by cell ordering (e.g., by cell index (Cell_ID)). Since the PCell has a cell index (Cell_ID) of 0, ACK/NACK bits of the PCell may be at the beginning. The ACK/NACK bits of the SCell(s) may be appended based on the cell ordering of each cell. For example, the ACK/NACK bits of an SCell with a lower Cell_ID may be appended before the ACK/NACK bits of an SCell with a higher Cell_ID. The ACK/NACK bundling of each cell and/or cross cell may or may not be applied depending on the configuration or the signalling.

In this approach, the PCell may be the most important cell for a UE. The UE may camp on and obtain system information from the PCell. The PCell-only solution may simplify the UE monitoring. The proposed ACK/NACK association approach may unify the ACK/NACK mappings. Thus, the ACK/NACK bits of all the cells may be distributed into the uplink reporting on the PCell.

This approach may be beneficial because of the simplicity of the uplink monitoring, the backwards compatibility and the ability to maintain the same uplink reporting agreement. This approach may also be beneficial because the PCell and the SCell(s) may have arbitrary UL-DL configurations.

In some cases, the network may limit the possible combinations of UL-DL configurations. In one case, the PCell should always have the same or smaller periodicity than the SCell. Therefore, if the PCell has 5 ms periodicity, then an SCell may have 5 ms or 10 ms periodicity. However, if the PCell has 10 ms periodicity, then an SCell may also have 10 ms periodicity. In another case, the PCell and the SCell(s) should always use the same periodicity setting.

The use of an association region based on a reference cell (e.g., the PCell) may provide a simple mapping approach to gathering uplink ACK/NACK report bits from other cells with different UL-DL configurations. However, the use of an association region may provide unbalanced distribution of ACK/NACK bits into different uplink subframes. For example, if a PCell has UL-DL configuration 3 and an SCell has UL-DL configuration 2, then the number of ACK/NACK bits mapped from the SCell are 5, 1 and 2 for the uplink subframes 2, 3 and 4 respectively. In some cases, a network may have difficulties handling unbalanced ACK/NACK bit distributions.

In another association mapping approach, the association mapping for a cell may be based on the number of uplink subframes in the reference cell. In one configuration, the reference cell may be the PCell. The mapping rules for a given configuration may include distributing the ACK/NACK bits into the uplink subframes of the reference cell configuration as evenly (e.g., as balanced) as possible. The mapping rules for a given configuration may also include putting the ACK/NACK bit for a special subframe at the end of the mapped ACK/NACK bits on each uplink subframe. This may be because the special subframe may have less downlink allocation, and may likely not be used for PDSCH transmission. The mapping rules for a given configuration may additionally include requiring that the distance between a downlink transmission and the corresponding uplink ACK/NACK report is at least 4 milliseconds (e.g., 4 subframes).

The association mapping may be improved (e.g., "optimized") by minimizing the total mapping distance for all downlink transmission to uplink mappings. The association mapping may also be improved (e.g., "optimized") by minimizing the mapping distance for the associations (e.g., for each association). In some cases, this may lead to longer mapping distances for some other associations.

The mapping of each UL-DL configuration with different reference configurations may be provided by or illustrated in new association tables. There may be many possible combinations for the associations. In one configuration, the associations from the regional mapping above may be reused as much as possible. In such a configuration, only the configurations with very unevenly distributed bits may be redefined. However, no matter what association table is used, the principle of defining fixed associations based on the reference cell UL-DL configuration may remain the same. Therefore, the association table may be agreed upon and specified in a standard (e.g., 3GPP Release 11). In this approach, the new associations may distribute the ACK/NACK bits more evenly in all of the uplink mapping subframes based on reference cell configuration.

In approach 4 above, the PUCCH or PUSCH reporting may be carried on one serving cell only in any subframe number. The serving cell may be the PCell, SCell or a combination the PCell and the SCell(s). For example, the serving cell may be the PCell for one uplink subframe and an SCell for another uplink subframe. The reporting may be carried on the uplink subframe of the serving cell regardless of whether the serving cell is a PCell or an SCell for a given uplink subframe.

In one approach, a combination of uplink subframes in the PCell and SCell(s) may be used. In this approach, the uplink reporting association may exist if any serving cell has an uplink allocation in a given subframe. The uplink reporting cell may be decided based on the order of the cell index (Cell_ID) for each uplink subframe. The PCell may always have the lowest Cell_ID (e.g., 0). In a subframe with the uplink subframe in the PCell, the uplink control information (UCI) may be reported on the PUCCH or PUSCH of the PCell (because it has the lowest Cell_ID, for example). In a subframe with a downlink subframe in the PCell and an uplink subframe in one or more of the SCells, the UCI may be reported on the PUCCH or PUSCH of an SCell. In the case of multiple SCells that have uplink subframes in the same subframe, the uplink subframe in the SCell with the lowest cell index (Cell_ID) may be used. Thus, the serving cell actually defines a superset UL-DL configuration of combined UL-DL configuration(s). For example, the superset UL-DL configuration may have an uplink allocation if any cell in the subframe has an uplink subframe. Again, some new rules of aggregating and reporting of ACK/NACK for downlink transmission may need to be defined for inter-band carrier aggregation with different UL-DL configurations.

In one configuration, the ACK/NACK aggregation may let each cell maintain the same associations (e.g., as in 3GPP Releases 8, 9 and 10). In one instance, the ACK/NACK bits of all cells with an uplink subframe are multiplexed together based on Cell_ID ordering. The aggregated ACK/NACK bits may be reported on the uplink subframe of the selected cell (e.g., the uplink reporting cell). This approach may have the benefit of backwards compatibility for uplink ACK/NACK reporting associations. A possible drawback of this approach is the variable payload size of the ACK/NACK report in different uplink subframes. For example, in a subframe where only one cell may have an uplink allocation, the ACK/NACK bits of only one cell are carried in the PUCCH or PUSCH UCI report. However, in a subframe where multiple cells have uplink allocation, the ACK/NACK bits of these cells may be aggregated and carried in the PUCCH or PUSCH UCI report on the one selected cell. Thus, a significantly larger payload may result for multiple cells with an ACK/NACK payload than with a single cell with an ACK/NACK payload. The high variation of ACK/NACK payloads in different uplink subframes may lead to high variation of ACK/NACK performance. As a result, the network may have to be designed so that the performance of the ACK/NACK reporting with the highest payload can be satisfied. This may inevitably reduce the range of cell coverage.

Therefore an approach to more evenly distribute ACK/NACK bits from all the cells into the uplink reports may be desirable. This approach may define a superset configuration that is derived from all the cells by combining all of the uplink allocations in all of the cells. In two cases, the superset results in allocations that are not in the existing UL-DL configurations. All of the associations corresponding to these two new superset UL-DL configurations are new because these UL-DL configurations do not currently exist.

To more evenly distribute the ACK/NACK bits, the uplink association based on the superset UL-DL configurations may be used as the reference cell. The corresponding ACK/NACK bits are then transmitted on the selected uplink subframe. The association mapping approaches described previously may be used with the superset UL-DL configurations. For example, associations based on an association region may be used. In another example, associations based on balanced distribution may be used.

UL-DL configuration two+three (e.g., "2+3") and UL-DL configuration two+four (e.g., "2+4") may be new added configurations if UL-DL configurations with different periodicity may be used in inter-band carrier aggregation. The new superset UL-DL configurations may be used as reference UL-DL configurations. In one configuration, an association region mapping approach may be used for association mapping with the superset UL-DL configurations. In another configuration, a more even distribution mapping approach may be used for distribution mapping with superset UL-DL configurations.

If UL-DL configuration 2 and UL-DL configuration 3 are combined to form a superset UL-DL configuration, new uplink ACK/NACK report associations may need to be defined. In an association region based approach, the ACK/NACK for subframes 3, 4 and 5 of all of the cells may be reported in an uplink in subframe 2 of the next radio frame. Similarly, the ACK/NACK for subframes 6 and 7 of all of the cells may be reported in an uplink in subframe 3 of the next radio frame. Additionally, the ACK/NACK for subframes 8 and 9 of all of the cells may be reported in an uplink in subframe 4 of the next radio frame. Furthermore, the ACK/NACK for subframes 0 and 1 of all of the cells may be reported in an uplink in subframe 7 of the same radio frame.

If UL-DL configuration 2 and UL-DL configuration 4 are combined to form a superset UL-DL configuration, new uplink ACK/NACK report associations may need to be defined. In an association region based approach, the ACK/NACK for subframes 3, 4 and 5 of all of the cells may be reported in an uplink in subframe 2 of the next radio frame. Similarly, the ACK/NACK for subframes 6, 7 and 8 of all cells may be reported in an uplink in subframe 3 of the next radio frame. Additionally, the ACK/NACK for subframe 9 in the current radio frame and subframes 0 and 1 of the next radio frame of all cells may be reported in an uplink in subframe 7 of the next radio frame.

In another configuration, a more evenly distributed mapping approach may be used for association mapping with the superset UL-DL configurations. If UL-DL configurations with different periodicity may not be used in inter-band carrier aggregation, only existing UL-DL configurations (e.g., UL-DL configurations 0-6) may need to be used. To avoid using unspecified UL-DL allocations, the same periodicity setting may be used in all bands. In some configurations, the reference cell may need to be determined. In some cases, only one cell may be selected as the reference cell. The cell may be the PCell or one of a set of SCells. The ACK/NACK reporting may follow any of the approaches described previously (e.g., association region based mapping, more evenly distributed based mapping) based on the selected reference cell. Several rules for selecting the reference cell may be defined.

First, if cells have different periodicity (e.g., a combination of 5 ms and 10 ms periodicity), a cell with 5 ms periodicity may be selected as the reference cell. This is because 10 ms periodicity settings cannot satisfy the delay requirements of 5 ms periodicity. For example, if one cell in one band with UL-DL configuration 2 (that has 5 ms periodicity, for example), and another cell in another band with UL-DL configuration 4 (with 10 ms periodicity, for example), the cell with UL-DL configuration 2 should be used as the reference cell. The selected reference cell may be the PCell or an SCell. The ACK/NACK reporting may follow one of the association mapping approaches described previously. The association mapping approach selected may be based on the selected reference cell, and are reported on the selected reference cell.

Second, among cells with the same periodicity, the cell with more uplink allocation may be selected as the reference cell. An UL-DL configuration with more uplink allocation may provide more uplink reporting instances with lower ACK/NACK payloads than UL-DL configurations with less uplink allocation. For example, if one cell in one band with UL-DL configuration 2 (that has 5 ms periodicity with 2 UL allocations, for example), and another cell in another band with UL-DL configuration 1 (with 5 ms periodicity with 1 UL allocation, for example), the cell with the UL-DL configuration 2 (with the greater UL allocations, for example) may be used as the reference cell. The selected reference cell may be the PCell or an SCell.

The ACK/NACK reporting may follow one of the allocation mapping approaches described previously based on the selected reference cell. The associations may be obtained by using an association region mapping or may be obtained by using a more evenly distributed mapping.

In one implementation, the uplink report may be carried on the selected reference cell only. This approach simplifies the uplink channel monitoring. In another implementation, each uplink transmission (e.g., UL subframe) may perform the reference cell selection described above. For an uplink allocation in the reference cell, the actual uplink reporting may be carried on a cell with the uplink subframe that has the lowest Cell_ID. The cell with the lowest Cell_ID may or may not be the same as the reference cell. The PCell may always have the lowest Cell_ID (e.g., Cell_ID=0). In a subframe with an uplink subframe in the PCell, UCI is reported on the PUCCH or PUSCH of the PCell. In a subframe with a downlink subframe in the PCell and an uplink subframe in one or more of the SCells, the UCI may be reported on the PUCCH or PUSCH of one of the SCells. In case of multiple SCells that have an uplink subframe in the same subframe, the uplink subframe in the SCell with the lowest cell index (Cell_ID) may be used.

In some configurations, different association mapping approaches may be concurrently used on different cells. For example, a first association mapping approach may be used on the PCell while a second association mapping approach may be used on an SCell.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for reporting uplink information with different duplexing configurations may be implemented. The one or more UEs 102 communicate with one or more evolved Node Bs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n. It should be noted that the eNB 160 may be a Node B, home evolved Node B (HeNB) or other kind of base station in some configurations.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a physical uplink shared channel (PUSCH), etc. The one or more eNBs 160 may also transmit information or data to the one or more UEs 102 using one or more downlink channels 119, for instance. Examples of downlink channels 119 include a physical downlink control channel (PDCCH), a physical downlink shared channel (PDSCH), etc. Other kinds of channels may be used.

Each of the one or more UEs 102 may include one or more transceivers 118, one or more demodulators 114, one or more decoders 108, one or more encoders 150, one or more modulators 154 and a UE operations module 124. For example, one or more reception and/or transmission paths may be used in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be used depending on the implementation.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include a UE configuration aggregation module 126. The UE configuration aggregation module 126 may include UL-DL configurations 128, cell mappings 130, association mappings 132 and an aggregating module 134.

The UL-DL configurations 128 may specify a set of UL-DL configurations that may be used for communication between the UE 102 and the eNB 160. Examples of UL-DL configurations include the UL-DL configurations 0-6 described previously, superset configurations (e.g., configurations 2+3, 2+4), any other configuration, etc. The UL-DL configurations 128 may be used by the UE configuration aggregation module 126, UE operations module 124 and the UE 102 for proper communication and scheduling. For example, the UL-DL configurations 128 may indicate the subframes for receiving information from the eNB 160 and may indicate the subframes for transmitting information to the eNB 160. A UL-DL configuration may indicate a timing sequence for communication. For example, the UE 102 may receive during a DL subframe and may transmit during a UL subframe. For proper communication on a cell, the same UL-DL configuration 128 may be used by the UE 102 and the eNB 160 on the same cell. However, different UL-DL configurations 128 may be used on different cells.

The cell mappings 130 may indicate the number of cells that the UE 102 may be using to communicate with one or more eNBs 160. The cell mappings 130 may additionally indicate the UL-DL configuration 128 (e.g., configuration 0-6, 2+3, 2+4, etc.) of each cell. For example, the UE 102 may communication with one or more eNBs 160 with a PCell and two SCells. The cell mappings 130 may indicate that the PCell includes a Cell_ID of 0 and that the PCell is using a particular UL-DL configuration 128 (e.g., configuration 2). The cell mappings 130 may also indicate that a first SCell includes a Cell_ID of 1 and that a first SCell is using a particular UL-DL configuration 128 (e.g., configuration 4). The cell mappings 130 may additionally indicate that a second SCell includes a Cell_ID of 2 and that the second SCell is using a particular UL-DL configuration 128 (e.g., configuration 5).

The association mappings 132 may indicate the uplink reporting associations for a particular UL-DL configuration 128 given a particular association mapping approach. For example, the UE configuration aggregation module 126 may indicate that the more evenly distributed mapping approach is to be used with the example cell mappings 130 described previously. For instance, ACK/NACK bits may be distributed as evenly as possible within a number of subframes. In this example, the association mappings 132 may specify more evenly distributed mappings for the PCell (e.g., mappings for configuration 2), the first SCell (e.g., mappings for configuration 4) and the second SCell (e.g., mappings for configuration 5). In one configuration, the association mappings 132 may include mapping tables.

The aggregating module 134 may aggregate the UCI (e.g., ACK/NACK bits) based on the association mappings 132 and the cell mappings 130. The order of aggregation may be determined based on the Cell_ID (e.g., the cell mappings 130) of each cell. For example, the aggregating module 134 may first aggregate the ACK/NACK bits from Cell_ID 0 (e.g., PCell), then aggregate the ACK/NACK bits from Cell_ID 1 (e.g., a first SCell) and then aggregate the ACK/NACK bits from Cell_ID 2 (e.g., a second SCell). The aggregation module 134 may aggregate based on each UL subframe. Any uplink associations associated with a particular uplink subframe may be reported on that particular uplink subframe. The number of ACK/NACK bits that are reported on each UL subframe may depend on the association mappings 132 and the UL-DL configuration of each cell. The uplink associations for reporting ACK/NACK bits are described in greater detail below.

The UE operations module 124 may provide information 148 to the one or more receivers 120. For example, the UE operations module 124 may inform the receiver(s) 120 when or when not to receive transmissions based on the UL-DL configurations 128 and cell mappings 130.

The UE operations module 124 may provide information 138 to the demodulator 114. For example, the UE operations module 124 may inform the demodulator 114 of a modulation pattern anticipated for transmissions from the eNB 160. In some implementations, this may be based on the UL-DL configuration 128 of a given cell.

The UE operations module 124 may provide information 136 to the decoder 108. For example, the UE operations module 124 may inform the decoder 108 of an anticipated encoding for transmissions from the eNB 160. In some implementations, this may be based on the UL-DL configuration 128 of a give cell.

The UE operations module 124 may provide information 142 to the encoder 150. The information 142 may include data to be encoded and/or instructions for encoding. For example, the UE operations module 124 may instruct the encoder 150 to encode transmission data 146 and/or control information 142 based on a UL-DL configuration 128 of a given cell.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. In some configurations, this may be based on a UL-DL configuration 128. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some configurations, this may be based on a UL-DL configuration 128. For instance, the one or more transmitters 158 may transmit during a downlink subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113 and an eNB operations module 182. For example, one or more reception and/or transmission paths may be used in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be used depending on the implementation.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data 162. A second eNB-decoded signal 168 may comprise overhead data and/or control data. For example, the second UE-decoded signal 168 may provide data that may be used by the eNB operations module 182 to perform one or more operations.

The eNB operations module 182 may include an eNB configuration aggregation module 184. The eNB configuration aggregation module 184 may include UL-DL configurations 194, cell mappings 196, association mappings 198 and a de-aggregating module 107.

The UL-DL configurations 194 may specify the set of UL-DL configurations 194 that may be used for communication between the eNB 160 and a UE 102. Examples of UL-DL configurations 194 include configurations 0-6 described previously, superset configurations (e.g., configurations 2+3, 2+4), any other configuration, etc. The UL-DL configurations 194 may be used by the eNB configuration aggregation module 184, eNB operations module 182, and the eNB 160 for proper communication and scheduling. For example, the UL-DL configurations 194 may indicate the subframes for receiving information from the UE 102 and may indicate the subframes for transmitting information to the UE 102. A UL-DL configuration 196 may indicate a timing sequence for communication. For example, the UE 102 may receive during a DL subframe and may transmit during a UL subframe. Thus, for proper communication, the same UL-DL configuration 194 may be used by the eNB 160 and the UE 102 on the same cell. However, different UL-DL configurations 194 may be used on different cells.

The cell mappings 196 may indicate the number of cells that the eNB 160 may be using to communicate with a UE 102. The cell mappings 196 may additionally indicate the UL-DL configuration 194 (e.g., configuration 0-6, 2+3, 2+4, etc.) of each cell. For example, an eNB 160 may be connected to a UE 102 with a PCell and two SCells. The cell mappings 196 may indicate that the eNB 160 is connected to the UE 102 using a PCell with a Cell_ID of 0 and that the PCell is using a particular UL-DL configuration 194 (e.g., configuration 2). The cell mappings 196 may also indicate that the eNB 160 is connected to the UE 102 using an SCell with a Cell_ID of 1 and that the SCell is using a particular UL-DL configuration 194 (e.g., configuration 4). The cell mappings 196 may additionally indicate that the eNB 160 is connected to the UE 102 using another SCell with a Cell_ID of 2 using a particular UL-DL configuration 194 (e.g., configuration 5).

The association mappings 198 may indicate the uplink reporting associations for a particular UL-DL configuration 194 given a particular association mapping approach. For example, the eNB configuration aggregation module 184 may indicate that the more evenly distributed mapping approach is to be used with the example cell mappings 196 described previously. In this example, the association mappings 198 may specify more evenly distributed mappings (as described above) for the PCell (e.g., mappings for configuration 2), the first SCell (e.g., mappings for configuration 4) and the second SCell (e.g., mappings for configuration 5). In one configuration, the association mappings 198 may include mapping tables.

The de-aggregating module 107 may de-aggregate the UCI (e.g., ACK/NACK bits) based on the association mappings 198 and the cell mappings 196. The order of de-aggregation may be determined based on the Cell_ID (e.g., the cell mappings 196) of each cell. For example, the de-aggregating module 107 may de-aggregate the ACK/NACK bits from Cell_ID 0 (e.g., a PCell) from the ACK/NACK bits from Cell_ID 1 (e.g., a first SCell) and from the ACK/NACK bits from Cell_ID 2 (e.g., a second SCell). The de-aggregating module 107 may also de-aggregate the ACK/NACK bits from Cell_ID 1 (e.g., the first SCell) from the ACK/NACK bits from Cell_ID 2 (e.g., the second SCell). The de-aggregation module 107 may de-aggregate based on each UL subframe. The number of ACK/NACK bits that are reported on each UL subframe may depend on the association mappings 198 and the UL-DL configuration 194 of each cell. The uplink associations for reporting ACK/NACK bits are described in further detail below.

The eNB operations module 182 may provide information 190 to the one or more receivers 178. For example, the eNB operations module 182 may inform the receiver(s) 178 when or when not to receive transmissions based on a UL-DL configuration 194 for a given cell.

The eNB operations module 182 may provide information 188 to the demodulator 172. For example, the eNB operations module 182 may inform the demodulator 172 of a modulation pattern anticipated for transmissions from the UE(s) 102. In some configurations, this may be based on an UL-DL configuration 194 for a given cell.

The eNB operations module 182 may provide information 186 to the decoder 166. For example, the eNB operations module 182 may inform the decoder 166 of an anticipated encoding for transmissions from the UE(s) 102. In some configurations, this may be based on a UL-DL configuration 194 for a given cell.

The eNB operations module 182 may provide information 101 to the encoder 109. The information 101 may include data to be encoded and/or instructions for encoding. For example, the eNB operations module 182 may instruct the encoder 109 to encode transmission data 105 and/or control information 101 based on a UL-DL configuration 194 for a given cell.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. In some configurations, this may be based on a UL-DL configuration 194 for a given cell. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on a current configuration 148. The one or more transmitters 117 may upconvert and transmit the modulated signal(s) 115 to one or more UEs 102.

It should be noted that a downlink subframe may be transmitted from the eNB 160 to one or more UEs 102 and that an uplink subframe may be transmitted from one or more UEs 102 to the eNB 160. Furthermore, both the eNB 160 and the one or more UEs 102 may transmit data in a standard special subframe.

Figure 2:
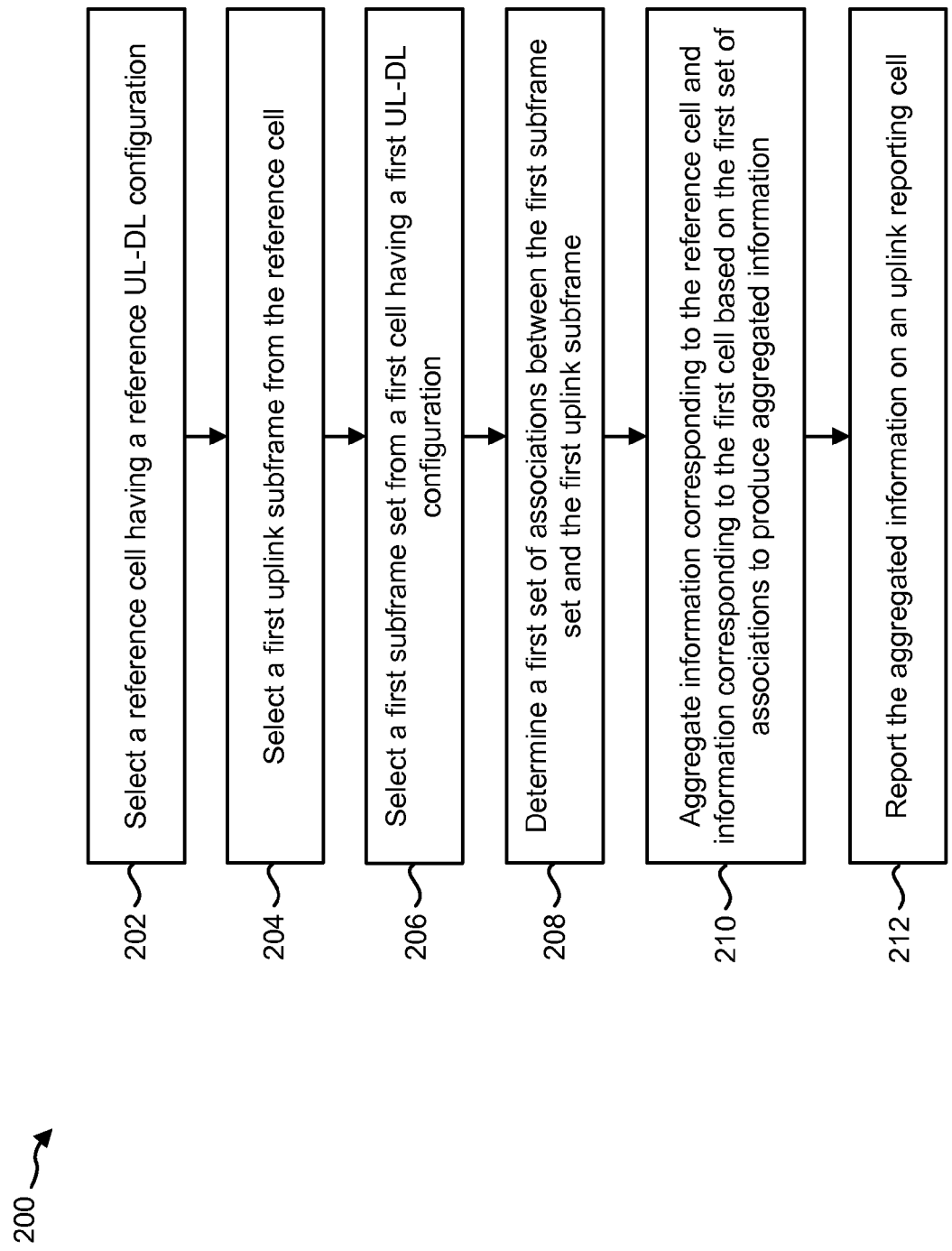
FIG. 2 is a flow diagram illustrating one configuration of a method for reporting information on a UE.

FIG. 2 is a flow diagram illustrating one configuration of a method 200 for reporting information on a UE 102. A UE 102 may select 202 a reference cell having a reference UL-DL configuration. The UE 102 may select the reference cell based on cell mappings 130. In one configuration, the reference cell may be the cell with the lowest Cell_ID. For example, the PCell may be selected as the reference cell. In another configuration, the reference cell may be determined for each uplink subframe for any of the cells. In this configuration, the cell with the lowest Cell_ID for a particular uplink subframe may be selected as the reference cell.

The reference cell may have a reference UL-DL configuration. The cell mappings 130 may specify the UL-DL configuration for a particular cell. In one configuration, the reference UL-DL configuration may be the UL-DL configuration of the reference cell. In another configuration, the reference UL-DL configuration may be a UL-DL configuration that is different from the UL-DL configurations specified in the cell mappings 130. The reference UL-DL configuration may be one of the UL-DL configurations specified in UL-DL configurations 128.

The UE 102 may select 204 a first uplink subframe from the reference cell. For example, the UE 102 may select 204 a first uplink subframe for uplink reporting. Each UL-DL configuration in the UL-DL configurations 128 may have different configurations of uplink subframes. Selecting 204 a first uplink subframe may include selecting 204 the first uplink subframe with an existing uplink association. The existing uplink associations may be specified in the association mappings 132. In some configurations, multiple uplink subframes (e.g., at least one additional uplink subframe) may be selected.

The UE 102 may select 206 a first subframe set from a first cell having a first UL-DL configuration. The first cell may be a different cell than the reference cell. For example, the first cell may be in a first band and the reference cell may be in a second band. The first UL-DL configuration may be the same as or different from the reference UL-DL configuration. For example, the first UL-DL configuration may be a configuration 1 UL-DL configuration and the reference UL-DL configuration may be a configuration 1 UL-DL configuration. In another example, the first UL-DL configuration may be a configuration 1 UL-DL configuration and the reference UL-DL configuration may be a configuration 0 UL-DL configuration. The reference cell with the reference UL-DL configuration and the first cell with the first UL-DL configuration may be specified in the cell mappings 130. In some configurations, multiple subframe sets (e.g., at least one additional subframe set) may be selected from a first cell.

The subframe set may refer to one or more subframes of one or more types (e.g., downlink subframe, special subframe, uplink subframe, etc.). For example, the subframe set may include subframes that are downlink subframes and/or special subframes in the first cell that correspond with uplink subframes in the reference cell (there may not be an existing uplink association (according to current 3GPP specifications) in the reference cell for each of the subframes in the subframe set in the first cell, for example).

The UE 102 may determine 208 a first set of associations between the first subframe set and the first uplink subframe. An association may be an uplink association that enables a first cell with a first UL-DL configuration to do ACK/NACK reporting on the on the selected reference cell even though the reference cell may be using a different UL-DL configuration. The first set of associations may include an uplink association for each subframe in the subframe set. The first set of associations may be specified (e.g., stored) in the association mappings 132. It should be noted that a set of associations may include one or more associations.

The first set of associations may be determined 208 according to one or more association approaches. In one example, the uplink associations may be determined 208 to minimize the number of subframes between the associated subframe and the uplink subframe (e.g., the distance of an association). In other words, the distance between subframes may be the difference between subframe numbering associated with the subframes. In another example, the uplink associations may be determined 208 to minimize the total distance of all of the associations. In yet another example, an association may be determined 208 based on a minimum association distance of 4 subframes (e.g., 4 milliseconds).

In some configurations, multiple sets of associations (e.g., at least one additional set of associations) may be determined 208. An additional set of associations may be between an additional subframe set (e.g., from a first cell) and an additional uplink subframe (e.g., from a reference cell).

In some configurations, multiple cells may utilize the systems and methods described herein. For example, a combination of cells may be used. In one case, all of the cells may have the same UL-DL configuration. For example, the PCell may have a UL-DL configuration of 6 and all of the SCells may each have the same UL-DL configuration (e.g., configuration 2). In another case, some of the cells may have different UL-DL configurations. For example, the PCell may have a UL-DL configuration of 6 and all of the SCells may each have different UL-DL configuration (e.g., configurations 0-6). In another example, the PCell may have a UL-DL configuration of 6 and some of the SCells may have a variety of UL-DL configurations (e.g., some configuration 2, some configuration 1, some configuration 6, etc.).

The UE 102 may aggregate 210 information corresponding to the reference cell and information corresponding to the first cell based on the first set of associations to produce aggregated information. For example, the aggregating module 134 may aggregate the uplink reporting information from the subframes in the reference cell that are associated to the first uplink subframe. Examples of uplink reporting information include ACK/NACK, channel state information (CSI), uplink control information (UCI), etc. The aggregating module 134 may also aggregate the uplink reporting information from the subframes in the first cell that are associated to the first uplink subframe. The aggregating module 134 may additionally aggregate the uplink reporting information from any subframes from any additional cells that are associated with the first uplink subframe. For example, the aggregating module 134 may order the aggregation of information based on the Cell_ID of the cells. For instance, the information associated with the reference cell may be aggregated first because the reference cell may have the lowest Cell_ID. The information associated with the next lowest Cell_ID may be aggregated together and so forth. The aggregating module 134 may aggregate the information to produce aggregated information.

In one configuration, aggregated information (e.g., ACK/NACK bits) may be multiplexed together based on a lowest Cell_ID ordering. In this case, the uplink reporting information of the first cell may be multiplexed with (e.g., added to) the uplink reporting information of the reference cell. Thus, the aggregated information is aggregated with the standard uplink reporting of the reference cell.

The UE 102 may report 212 the aggregated information on an uplink reporting cell. For example, the UE 102 may report 212 aggregated ACK/NACK in one or more uplink subframes based on one or more associations corresponding to a subframe region mapping. In another example, the UE 102 may report 212 aggregated ACK/NACK based on the PCell uplink configuration. In another example, the UE 102 may report 212 aggregated ACK/NACK based on the cell with the maximum uplink allocation (e.g., the cell with the most uplink subframes). In yet another example, the UE 102 may report 212 aggregated ACK/NACK based on a cell with the aggregated uplink allocation of all cells (e.g., based on a superset configuration as described in connection with FIG. 21 below). It should be noted that the UE 102 may additionally multiplex and/or bundle ACK/NACK bits in order to report 212 the aggregated information as described herein.

The aggregated information may be reported 212 in the place of the standard uplink reporting on the uplink reporting cell. In one configuration, the uplink reporting cell is the PCell only. In this configuration, the uplink reporting may be consistent with current specification uplink reporting (e.g., 3GPP Releases 8, 9 and 10). This may be beneficial because it is backwards compatible. For example, the same uplink reporting routines may be used regardless of the number of cells that are aggregated. Furthermore, cells with different UL-DL configurations may be added, removed or reconfigured without changing the uplink reporting on the PCell. In another configuration, the uplink reporting cell may be a serving cell (e.g., PCell, SCell or a combination of the PCell and one or more SCells). In another configuration, the uplink reporting cell may be the reference cell.

Figure 3:
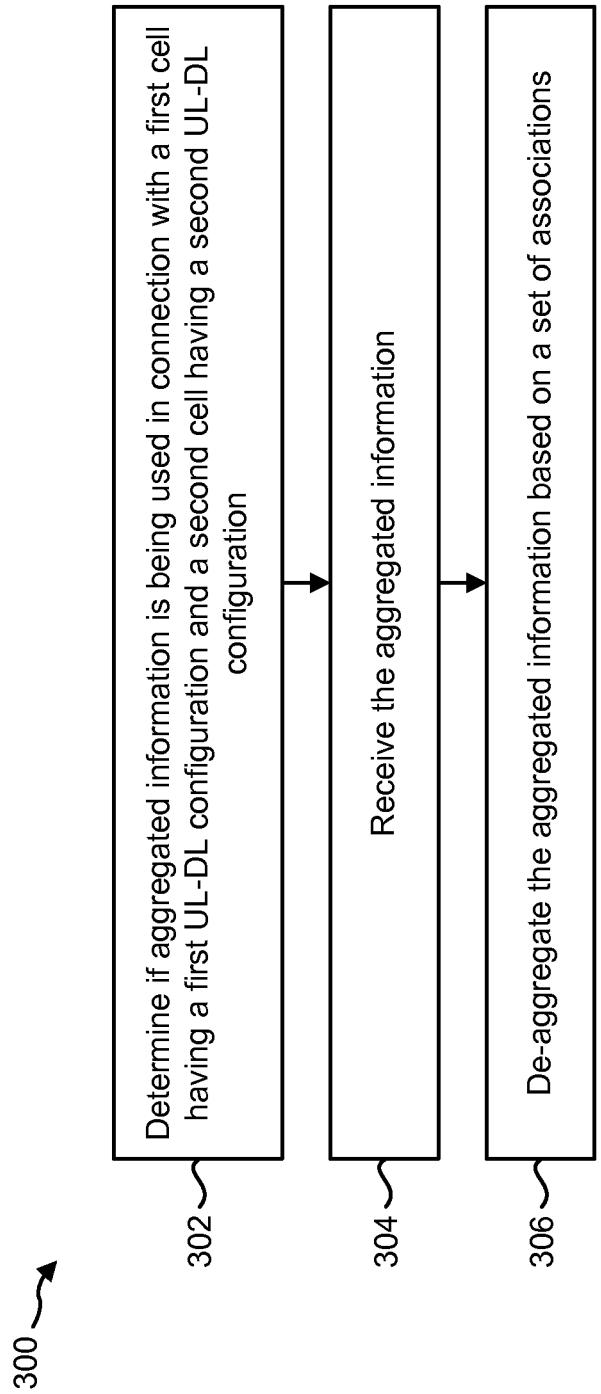
FIG. 3 is a flow diagram illustrating one configuration of a method for receiving information on an eNB.

FIG. 3 is a flow diagram illustrating one configuration of a method 300 for receiving information on an eNB 160. An eNB 160 may determine 302 if aggregated information is being used in connection with a first cell having a first UL-DL configuration and a second cell having a second UL-DL configuration. For example, the eNB 160 may determine 302 this based on the cell mappings 196 (e.g., that the eNB 160 assigned to the UE 102) that the eNB 160 may be communicating to the same device (e.g., a UE 102) on a first cell having a first UL-DL configuration and a second cell having a second UL-DL configuration. The eNB 160 may additionally determine 302 that a certain association mapping has been specified for use (the eNB 160 directed a UE 102 to use a specific association mapping approach, for example).

In some configurations, the eNB 160 may determine 302 if aggregated information is being used by comparing the size of the uplink reporting payload with characteristic uplink reporting payloads (e.g., non-aggregation payloads, association region based payloads, more evenly distributed based payloads, etc.). In other configurations, the eNB 160 may receive an indication that aggregate information is being used.

The eNB 160 may receive 304 the aggregated information. The aggregated information may be received in the same manner that non-aggregated information may be received. More particularly, the eNB 160 may receive 304 the aggregated information in place of the uplink reporting information for the reference cell. In some configurations, an eNB 160 may receive 304 aggregated information that includes uplink reporting information for one or more cells that are hosted by one or more eNBs 160.

The eNB 160 may de-aggregate 306 the aggregated information based on a set of associations. For example, the de-aggregating module 107 may separate the aggregated information based on the association mappings 198 and the cell mappings 196. More specifically, the de-aggregating module 107 may determine the Cell_ID for each of the cells that may be utilizing the aggregated uplink reporting. The de-aggregating module 107 may additionally determine the UL-DL configuration for each of the cells (based on the cell mappings 196 and the UL-DL configurations 194). The de-aggregating module 107 may also determine the association mapping approach being used for each cell. Thus, the de-aggregating module 107 may determine the specific uplink reporting bits associated with the particular subframes of the particular cells. The de-aggregating module 107 may parse through the aggregated information to de-aggregate the uplink reporting information for each particular cell. In some cases, the uplink reporting information for a cell associated with another eNB 160 may be transmitted to the other eNB 160.

Figure 4:
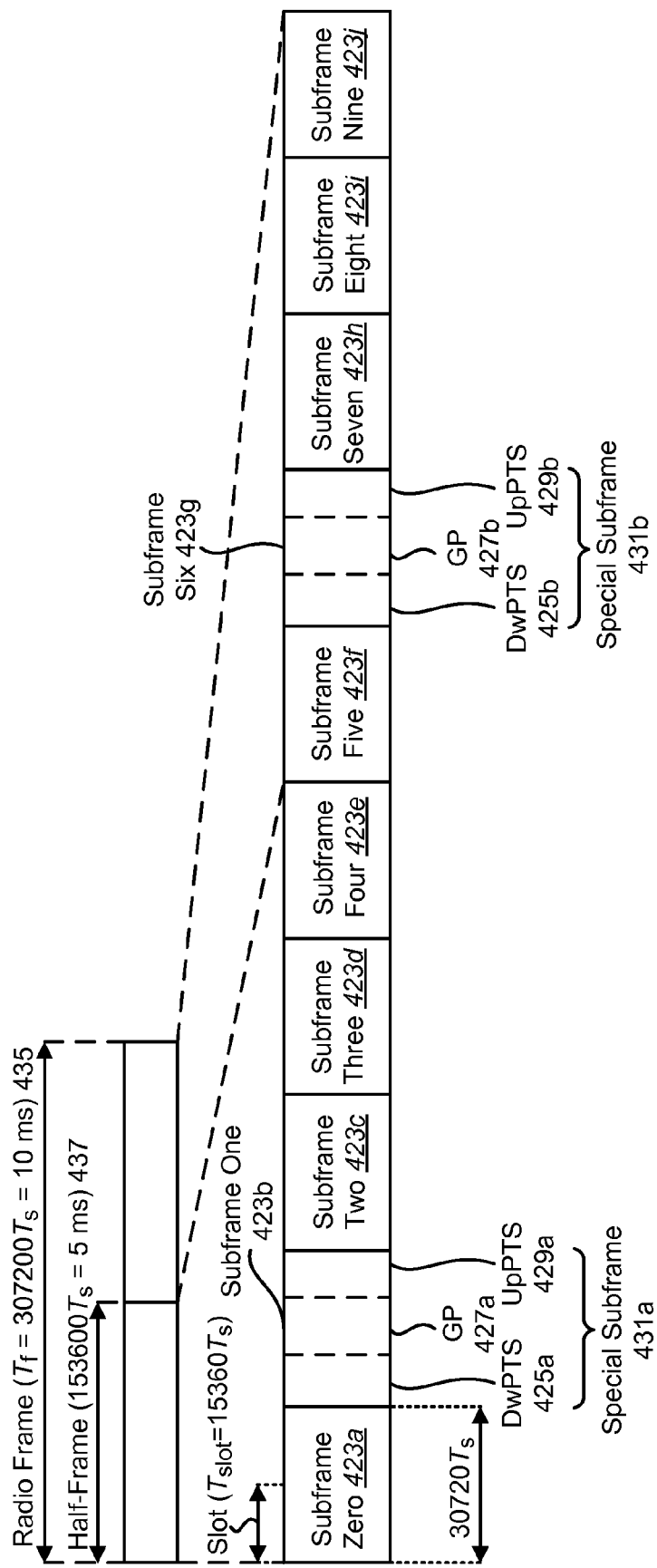
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure may be applicable in time-division duplexing (TDD) approaches. Each radio frame 435 may have a length of $T_f=307200 \cdot T_s=10$ milliseconds (ms), where $T_f$ is a radio frame 435 duration and $T_s$ is a time unit equal to $$\frac{1}{(15000 \times 2048)}$$

seconds. The radio frame 435 may include two half-frames 437, each having a length of $153600 \cdot T_s=5$ ms. Each half-frame 437 may include five subframes 423a-e, 423f-j each having a length of $30720 \cdot T_s=1$ ms.

In accordance with the systems and methods disclosed herein, some types of subframes 423 that may be used include a downlink subframe, an uplink subframe and a special subframe 431. In the example illustrated in FIG. 4, two standard special subframes 431a-b are included in the radio frame 435.

The first standard special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table 9 above) subject to the total length of each set of DwPTS 425, GP 427 and UpPTS 429 being equal to $30720 \cdot T_s=1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot}=15360 \cdot T_s=0.5$ ms in each subframe 423. For example, subframe zero (e.g., 0) 423a may include two slots, including a first slot.

UL-DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 437 includes a standard special subframe 431*a-b*. In the case of 10 ms downlink-to-uplink switch-point periodicity, a special subframe may exist in the first half-frame 437 only.

Subframe zero (e.g., 0) 423*a* and subframe five (e.g., 5) 423*f* and DwPTS 425*a-b* may be reserved for downlink transmission. The UpPTS 429*a-b* and the subframe(s) immediately following the special subframe(s) 431*a-b* (e.g., subframe two 423*c* and subframe seven 423*h*) may be reserved for uplink transmission.

FIGS. 5-27 illustrate various examples of association mappings for interband carrier aggregation with different UL-DL configurations. The association regions and the subframes that map to the distribution regions may be examples of sets of subframes or subframe sets as described in connection with FIG. 2 above. For instance, the first association region described in FIG. 5 may be one example of a first subframe set as described in FIG. 2. Similarly, the subframes that map to the first distribution region described in FIG. 14 may be another example of a first subframe set as described in FIG. 2. The UL-DL configurations referred to in FIGS. 5-27 may correspond to configurations 0-6 described previously. It should be noted that in FIGS. 5-27, "D" denotes a downlink subframe, "U" denotes an uplink subframe and "S" denotes a special subframe.

FIGS. 5-13 illustrate various examples of association regions in accordance with the systems and methods disclosed herein. In general, an association region is a region that includes one or more subframes (e.g., a subframe set or set of subframes) that map to one or more particular uplink subframes. Downlink subframes and special subframes may report an acknowledgment (ACK) if data was properly received or a negative acknowledgment (NACK) if data was improperly received or not received at all. This ACK/NACK reporting for a subframe (e.g., downlink subframe, special subframe) may be reported during an uplink subframe. An association exists between a subframe and an uplink subframe where the uplink reporting (e.g., ACK/NACK, CSI, UCI, etc.) for that subframe occurs. A set of associations exists for each of the seven defined UL-DL configurations. These existing associations are specified in Table 10. In Table 10, a number specified for a particular subframe is an uplink reporting subframe for the numbers listed. The numbers listed refer to a subframe previous to the reporting subframe. For example, in Table 10, under configuration 1 and subframe 2 are the numbers 7 and 6. This means that in configuration 1, subframe 2 does uplink reporting for the subframes that are 7 subframes and 6 subframes previous to subframe 2. In other words, subframe 2 provides uplink reporting for subframe 5 and subframe 6 of the previous radio frame, which may be a downlink subframe and a special subframe.

When only a single UL-DL configuration is used (e.g., all the cells use the same UL-DL configurations), the standard associations listed in Table 10 may provide all of the necessary uplink reporting. However, when multiple UL-DL configurations are used (e.g., cells using different UL-DL configurations) the standard associations may not provide all of the necessary uplink reporting. Different UL-DL configurations may have different subframes that need uplink reporting. In one implementation, an association region may be defined for a reference configuration that identifies a region of subframes (e.g., association region) that maps to a particular uplink subframe for uplink reporting. The association region may add new uplink reporting associations that allow for uplink reporting for any UL-DL configuration. Table 11 identifies the existing associations and the added associations (in parentheses) for the association regions for each UL-DL configuration.

Association regions may be described in further detail with reference to the Figures below. For convenience, association regions are indicated in a dotted outline. The association regions illustrated may specify examples of sets of associations as described above (in connection with FIG. 2, for example).

Figure 5:
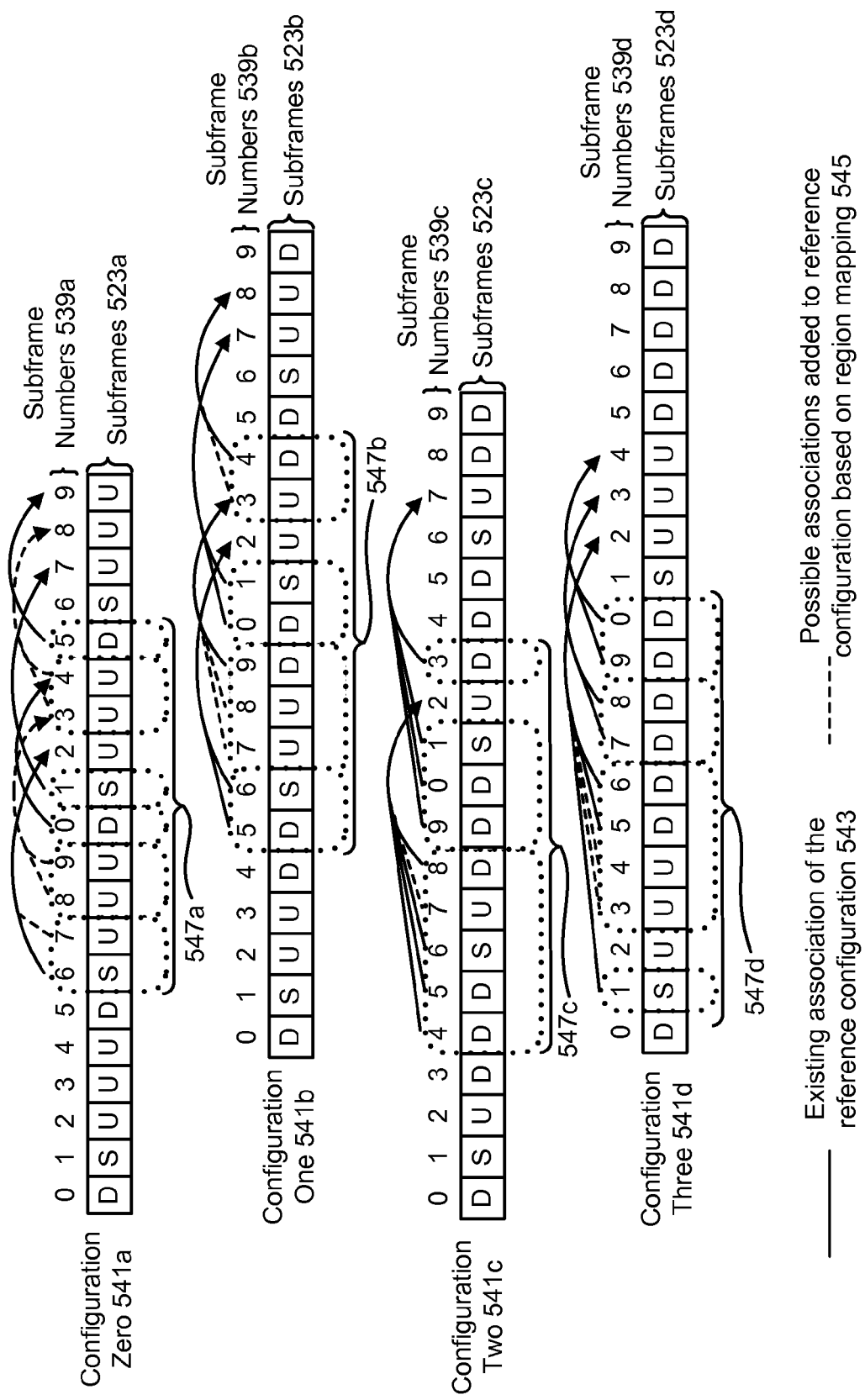
FIG. 5 is a diagram illustrating several examples of association regions for uplink reporting in accordance with the systems and methods disclosed herein.

FIG. 5 is a diagram illustrating several examples of association regions for uplink reporting in accordance with the systems and methods disclosed herein. For convenience, existing associations 543 (in current 3GPP specifications) may be indicated with solid lines and possible associations 545 that have been added based on the association region mappings may be indicated with dashed lines. Each of the subframes 523 may correspond to a subframe number 539. The subframes 523 may be referred to according to subframe numbers 539.

Configuration zero 541*a* (e.g., "0") corresponds to six association regions 547*a*. A first association region 547*a* for configuration zero 541*a* includes subframes 6 and 7 and includes association mappings to the uplink subframe 2 in the next radio frame. The association from subframe 6 to the uplink subframe 2 is an existing association mapping 543 of configuration zero 541*a*. The association mapping from subframe 7 to the uplink subframe 2 is a new association mapping 545 for configuration zero 541*a*.

A second association region 547*a* for configuration zero 541*a* includes subframes 8 and 9 and includes association mappings to the uplink subframe 3 in the next radio frame. The association from subframe 8 to the uplink subframe 3 and the association from subframe 9 to the uplink subframe 3 are new association mappings 545 for configuration zero 541*a*.

A third association region 547*a* for configuration zero 541*a* includes subframe 0 and includes an association mapping to the uplink subframe 4 in the current radio frame. The association from subframe 0 to the uplink subframe 4 is an existing association mapping 543 of configuration zero 541*a*.

A fourth association region 547*a* for configuration zero 541*a* includes subframe 1 and includes an association mapping to the uplink subframe 7 in the current radio frame. The association from subframe 1 to the uplink subframe 7 is an existing association mapping 543 of configuration zero 541*a*.

A fifth association region 547*a* for configuration zero 541*a* includes subframes 3 and 4 and includes association mappings to the uplink subframe 8 in the current radio frame. The association from subframe 3 to the uplink subframe 8 and the association from subframe 4 to the uplink subframe 8 are new association mappings 545 for configuration zero 541*a*.

A sixth association region 547*a* for configuration zero 541*a* includes subframe 5 and includes an association mapping to the uplink subframe 9 in the current radio frame. The association from subframe 5 to the uplink subframe 9 is an existing association mapping 543 of configuration zero 541*a*.

Configuration one 541*b* (e.g., "1") corresponds to four association regions 547*b*. A first association region 547*b* for configuration one 541*b* includes subframes 5 and 6 and includes association mappings to the uplink subframe 2 in the next radio frame. The association mappings from subframes 5 and 6 to the uplink subframe 2 are existing association mappings 543 of configuration one 541*b*.

A second association region 547*b* for configuration one 541*b* includes subframes 7, 8 and 9 and includes association mappings to the uplink subframe 3 in the next radio frame. The association mappings from subframes 7 and 8 to the uplink subframe 3 are new association mappings 545 for configuration one 541b. The association from subframe 9 to the uplink subframe 3 is an existing association mapping 543 for configuration one 541b.

A third association region 547b for configuration one 541b includes subframes 0 and 1 and includes association mappings to the uplink subframe 7 in the same radio frame. The association mappings from subframe 0 and 1 to the uplink subframe 7 are existing association mappings 543 for configuration one 541b.

A fourth association region 547b for configuration one 541b includes subframes 3 and 4 and includes association mappings to the uplink subframe 8 in the same radio frame. The association mapping from subframe 3 to the uplink subframe 8 is a new association mapping 545 for configuration one 541b. The association from subframe 4 to the uplink subframe 8 is an existing association mapping 543 for configuration one 541b.

Configuration two 541c (e.g., "2") corresponds to two association regions 547c. A first association region 547c for configuration two 541c includes subframes 4, 5, 6, 7 and 8 and includes association mappings to the uplink subframe 2 in the next radio frame. The association mappings from subframes 4, 5, 6 and 8 to the uplink subframe 2 are existing association mappings 534 for configuration two 541c. The association mapping from subframe 7 to the uplink subframe 2 is a new association mapping 545 for configuration two 541c.

A second association region 547c for configuration two 541c includes subframes 9, 0, 1 and 3 and includes association mappings to the uplink subframe 7. The association mappings from subframes 9, 0, 1 and 3 to the uplink subframe 7 are existing association mappings 543 for configuration two 541c.

Configuration three 541d (e.g., "3") corresponds to three association regions 547d. A first association region 547d for configuration three 541d includes subframes 1, 3, 4, 5 and 6 and includes association mappings to the uplink subframe 2 in the next radio frame. The association mappings from subframe 1, 5 and 6 to the uplink subframe 2 are existing association mappings 543 for configuration three 541d. The association mappings from subframe 3 and 4 are new association mappings 545 for configuration three 541d.

A second association region 547d for configuration three 541d includes subframes 7 and 8 and includes association mappings to the uplink subframe 3 in the next radio frame. The association mappings from subframe 7 and 8 to the uplink subframe 3 are existing association mappings 543 for configuration three 541d.

A third association region 547d for configuration three 541d includes subframes 9 and 0 and includes association mappings to the uplink subframe 4. The association mappings from subframe 9 and 0 to the uplink subframe 4 are existing association mappings 543 for configuration three 541d.

Figure 6:
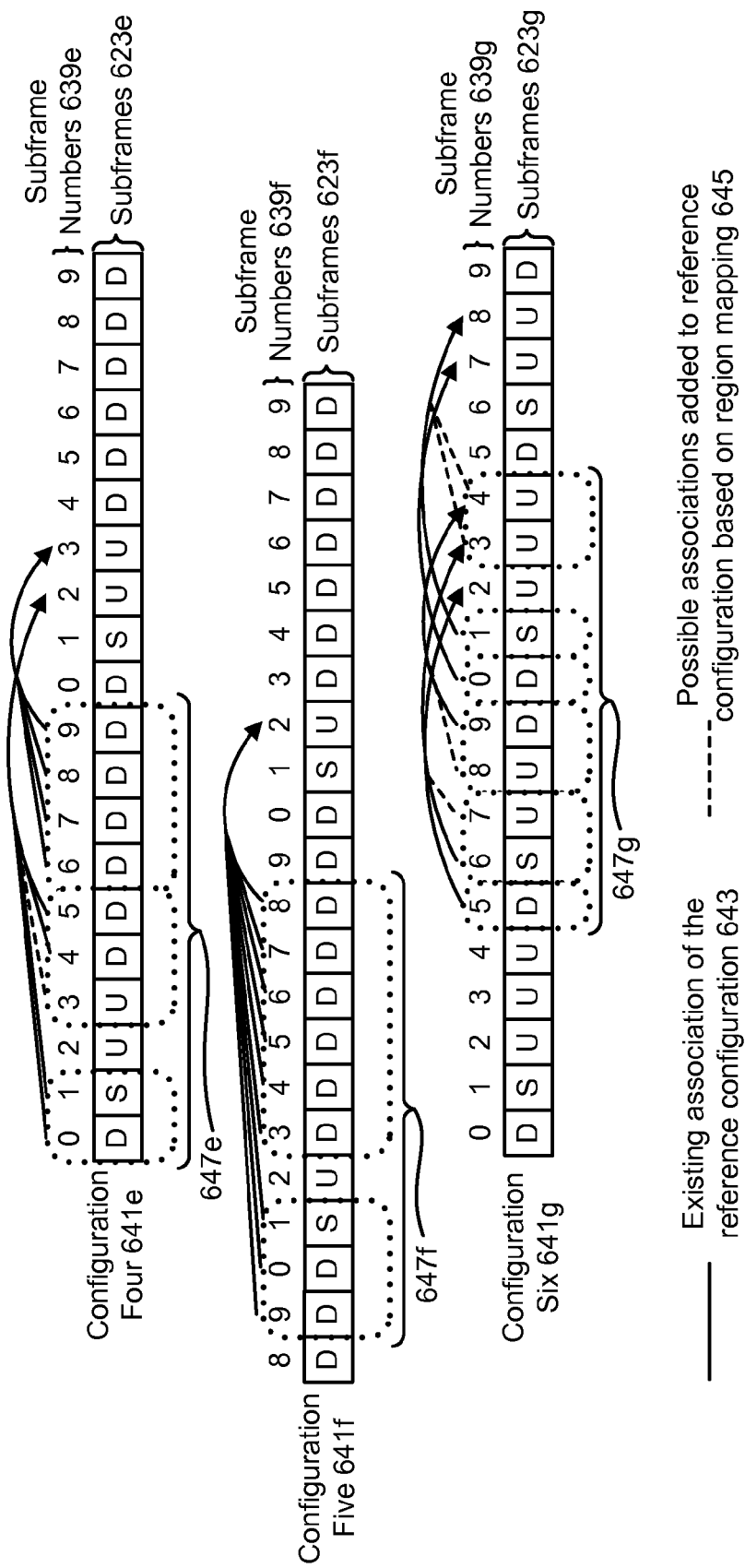
FIG. 6 is a diagram illustrating several examples of association regions for uplink reporting in accordance with the systems and methods disclosed herein.

FIG. 6 is a diagram illustrating several examples of association regions for uplink reporting in accordance with the systems and methods disclosed herein. For convenience, existing associations 643 (in current 3GPP specifications) may be indicated with solid lines and possible associations 645 that have been added based on the association region mappings may be indicated with dashed lines. Each of the subframes 623 may correspond with a subframe number 639. The subframes 623 may be referred to according to subframe numbers 639.

Configuration four 641e (e.g., "4") corresponds to two association regions 647e. A first association region 647e for configuration four 641e includes subframes 0, 1, 3, 4 and 5 and includes association mappings to the uplink subframe 2 in the next radio frame. The association mappings from subframes 0, 1, 4 and 5 to the uplink subframe 2 are existing association mappings 634 for configuration four 641e. The association mapping from subframe 3 to the uplink subframe 2 is a new association mapping 645 for configuration four 641e.

A second association region 647e for configuration four 641e includes subframes 6, 7, 8 and 9 and includes association mappings to the uplink subframe 3 in the next radio frame. The association mappings from subframes 6, 7, 8 and 9 to the uplink subframe 3 are existing association mappings 643 for configuration four 641e.

Configuration five 641f (e.g., "5") corresponds to one association region 647e. A first association region 647f for configuration five 641f includes subframes 9, 0, 1, 3, 4, 5, 6, 7 and 8 and includes association mappings to the uplink subframe 2 in the next radio frame. The association mappings from subframes 9, 0, 1, 3, 4, 5, 6, 7 and 8 to the uplink subframe 2 are existing association mappings 643 for configuration five 641f.

Configuration six 641g (e.g., "6") corresponds to five association regions 647g. A first association region 647g for configuration six 641g includes subframe 5 and includes an association mapping to the uplink subframe 2 in the next radio frame. The association mapping from subframe 5 to the uplink subframe 2 is an existing association mapping 643 for configuration six 641g.

A second association region 647g for configuration six 641g includes subframes 6 and 7 and includes association mappings to the uplink subframe 3 in the next radio frame. The association mapping from subframe 6 to the uplink subframe 2 is an existing association mapping 643 for configuration six 641g. The association mapping from subframe 7 to the uplink subframe 2 is a new association mapping 645 for configuration six 641g.

A third association region 647g for configuration six 641g includes subframes 8 and 9 and includes association mappings to the uplink subframe 4 in the next radio frame. The association mapping from subframe 8 to the uplink subframe 4 is a new association mapping 645 for configuration six 641g. The association mapping from subframe 9 to the uplink subframe 4 is an existing association mapping 643 for configuration six 641g.

A fourth association region 647g for configuration six 641g includes subframe 0 and includes an association mapping to the uplink subframe 7 in the same radio frame. The association mapping from subframe 0 to the uplink subframe 7 is an existing association mapping 643 for configuration six 641g.

A fifth association region 647g for configuration six 641g includes subframes 1, 3 and 4 and includes an association mapping to the uplink subframe 8 in the same radio frame. The association mapping from subframe 1 to the uplink subframe 8 is an existing association mapping 643 for configuration six 641g. The association mappings from subframes 3 and 4 to the uplink subframe 8 are new association mappings 645 for configuration six 641g.

Figure 7:
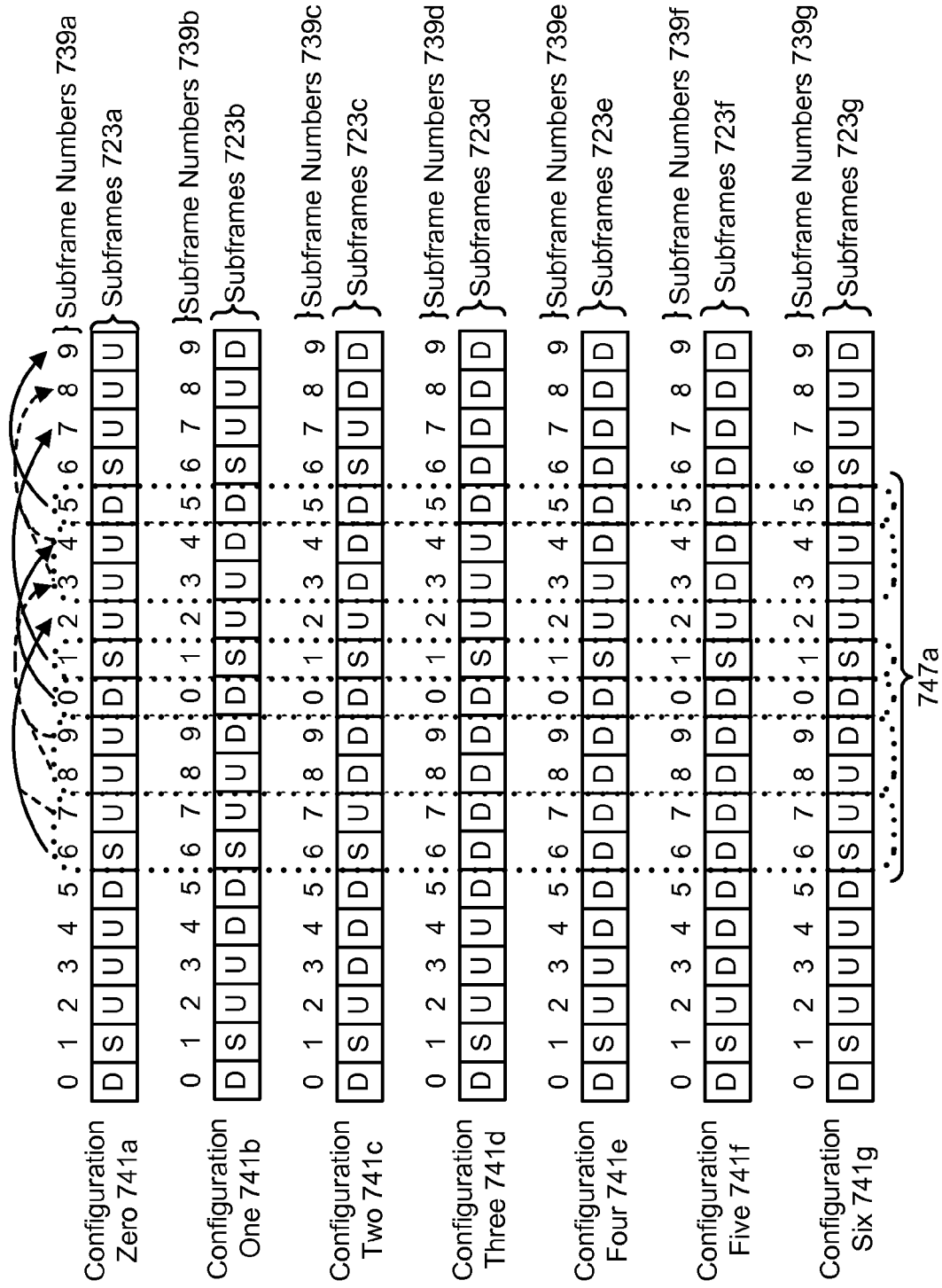
FIG. 7 illustrates more specifically the association regions for configuration zero with respect to other uplink-downlink (UL-DL) configurations.

FIG. 7 illustrates more specifically the association regions for configuration zero 741a with respect to other UL-DL configurations 741b-g. For example, the association regions 747a illustrated in FIG. 7 may be the same as the association regions 547a illustrated in FIG. 5 as applied to other UL-DL configurations 741b-g. The configurations 741a-g in FIG. 7 are illustrated as subframes 723a-g with corresponding subframe numbers 739a-g. Table 12 below indicates the existing associations 743 for configuration zero 741a and the added associations 745 for aggregated uplink reporting of different UL-DL configurations.

TABLE 12

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 (Ref. Cell) | — | — | 6 | — | 4 | — | — | 6 | — | 4 |
| 1 | — | — | 6 | 4 | 4 | — | — | 6 | 4 | 4 |
| 2 | — | — | 6 | 5, 4 | 4 | — | — | 6 | 5, 4 | 4 |
| 3 | — | — | 6, 5 | 5, 4 | 4 | — | — | 6 | — | 4 |
| 4 | — | — | 6, 5 | 5, 4 | 4 | — | — | 6 | 4 | 4 |
| 5 | — | — | 6, 5 | 5, 4 | 4 | — | — | 6 | 5, 4 | 4 |
| 6 | — | — | 6 | 4 | 4 | — | — | 6 | — | 4 |

The added associations listed in Table 12 allow for uplink reporting from the association regions for configuration zero 741*a* described previously with respect to FIG. 5. For example, the first association region 747*a* for configuration zero 741*a* captures the additional downlink subframes (e.g., subframe 7) for configuration three 741*d*, configuration four 741*e* and configuration five 741*f*. As illustrated, the association regions 747*a* for configuration zero 741*a* allow for uplink reporting of any of the other UL-DL configurations.

Figure 8:
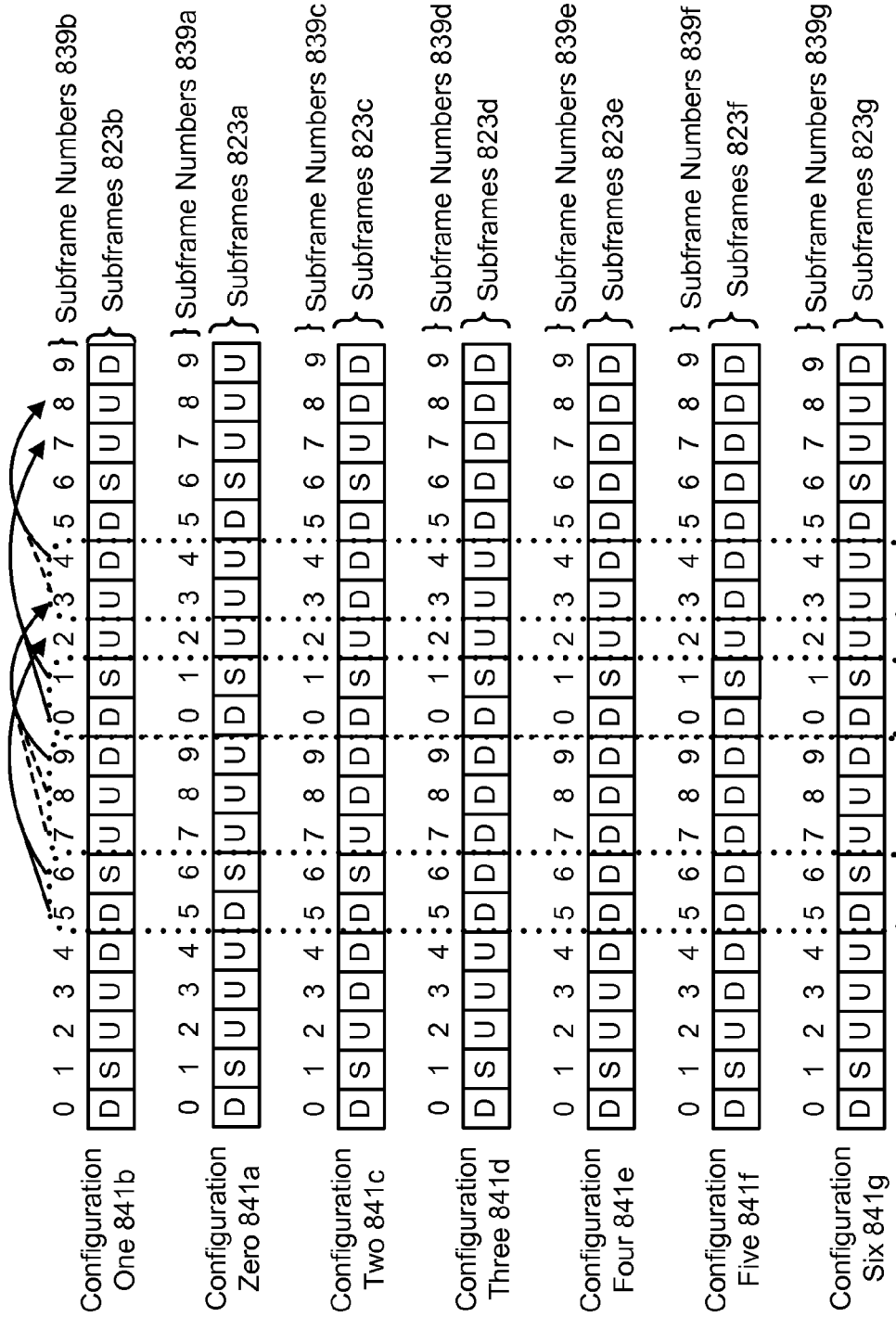
FIG. 8 illustrates more specifically the association regions for configuration one with respect to other uplink-downlink (UL-DL) configurations.

FIG. 8 illustrates more specifically the association regions for configuration one 841*b* with respect to other UL-DL configurations 841*a*, 841*c-g*. For example, the association regions 847*b* illustrated in FIG. 8 may be the same as the association regions 547*b* illustrated in FIG. 5 as applied to other UL-DL configurations 841*a*,*c-g*. The configurations 841*a-g* in FIG. 8 are illustrated as subframes 823*a-g* with corresponding subframe numbers 839*a-g*. Table 13 below indicates the existing associations 843 for configuration one 841*b* and the added associations 845 for aggregated uplink reporting of different UL-DL configurations.

TABLE 13

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1 (Ref. Cell) | — | — | 7, 6 | 4 | — | — | — | 7, 6 | 4 | — |
| 0 | — | — | 7, 6 | — | — | — | — | 7, 6 | — | — |
| 2 | — | — | 7, 6 | 4, 5 | — | — | — | 7, 6 | 4, 5 | — |
| 3 | — | — | 7, 6 | 4, 6, 5 | — | — | — | 7, 6 | — | — |
| 4 | — | — | 7, 6 | 4, 6, 5 | — | — | — | 7, 6 | 4 | — |
| 5 | — | — | 7, 6 | 4, 6, 5 | — | — | — | 7, 6 | 4, 5 | — |
| 6 | — | — | 7, 6 | 4 | — | — | — | 7, 6 | — | — |

The added associations listed in Table 13 allow for uplink reporting from the association regions for configuration one 841*b* described previously with respect to FIG. 5. For example, the second association region 847*b* for configuration one 841*b* captures the additional downlink subframes (e.g., subframes 7 and 8) for configuration two 841*c*, configuration three 841*d*, configuration four 841*e* and configuration five 841*f*. As illustrated, the association regions 847*b* for configuration one 841*b* allow for uplink reporting of any of the other UL-DL configurations.

Figure 9:
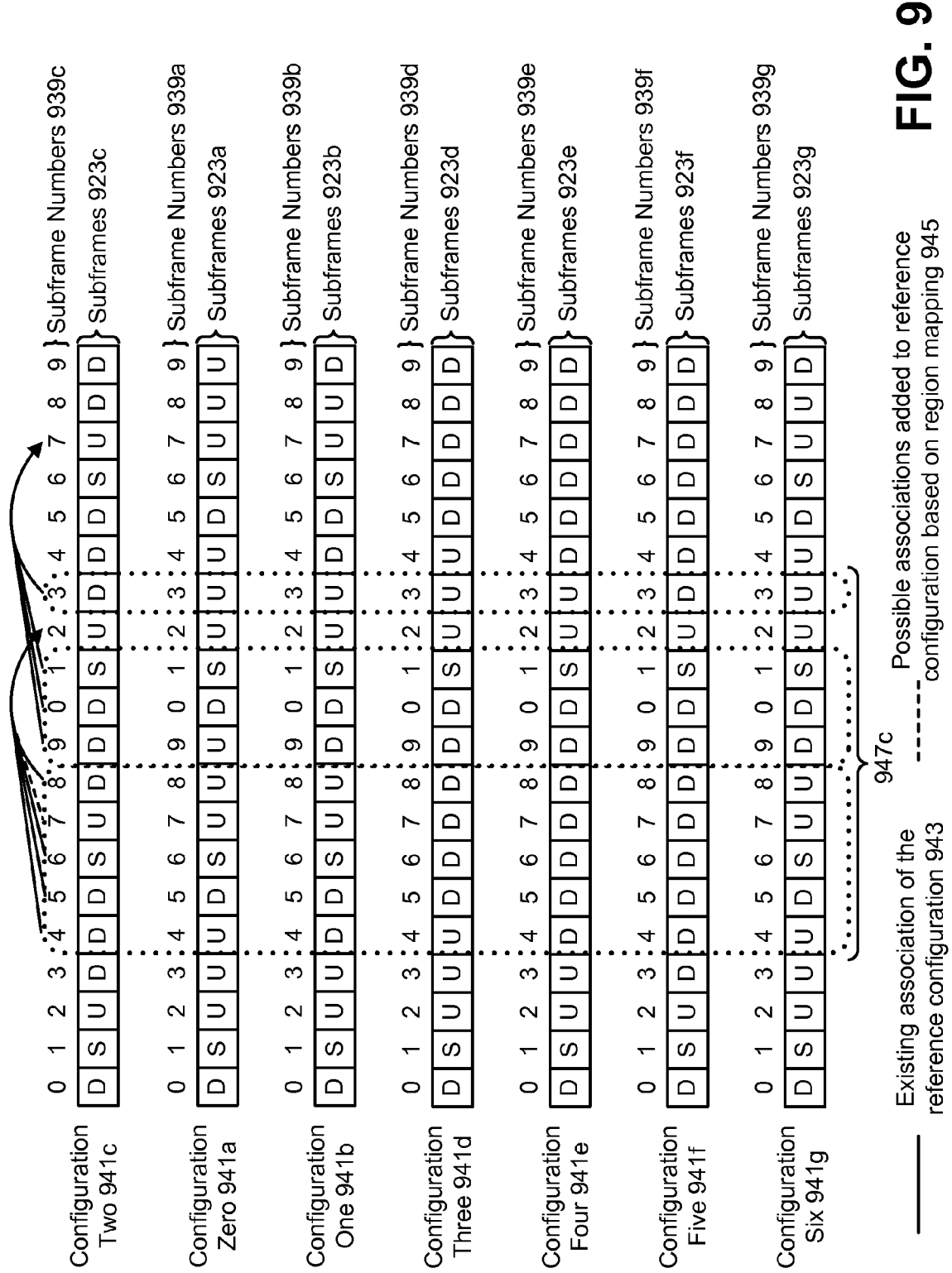
FIG. 9 illustrates more specifically the association regions for configuration two with respect to other uplink-downlink (UL-DL) configurations.

FIG. 9 illustrates more specifically the association regions for configuration two 941*c* with respect to other UL-DL configurations 941*a-b*, 941*d-g*. For example, the association regions 947*c* illustrated in FIG. 9 may be the same as the association regions 547*c* illustrated in FIG. 5 as applied to other UL-DL configurations 941*a-b*,*d-g*. The configurations 941*a-g* in FIG. 9 are illustrated as subframes 923*a-g* with corresponding subframe numbers 939*a-g*. Table 14 below indicates the existing associations 943 for configuration two 941*c* and the added associations 945 for aggregated uplink reporting of different UL-DL configurations.

TABLE 14

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 (Ref. Cell) | — | — | 8, 7, 4, 6 | — | — | — | — | 8, 7, 4, 6 | — | — |
| 0 | — | — | 7, 6 | — | — | — | — | 7, 6 | — | — |
| 1 | — | — | 8, 7, 6 | — | — | — | — | 8, 7, 6 | — | — |
| 3 | — | — | 7, 4, 6, 5 | — | — | — | — | 8, 7, 6 | — | — |
| 4 | — | — | 8, 7, 4, 6, 5 | — | — | — | — | 8, 7, 6 | — | — |
| 5 | — | — | 8, 7, 4, 6, 5 | — | — | — | — | 8, 7, 4, 6 | — | — |
| 6 | — | — | 7, 6 | — | — | — | — | 8, 7, 6 | — | — |

The added associations listed in Table 14 allow for uplink reporting from the association regions for configuration two 941*c* described previously with respect to FIG. 5. For example, the first association region 947*c* for configuration two 941*c* captures the additional downlink subframes (e.g., subframe 7) for configuration three 941*d*, configuration four 941*e* and configuration five 941*f*. As illustrated, the association regions 947*c* for configuration two 941*c* allow for uplink reporting of any of the other UL-DL configurations.

Figure 10:
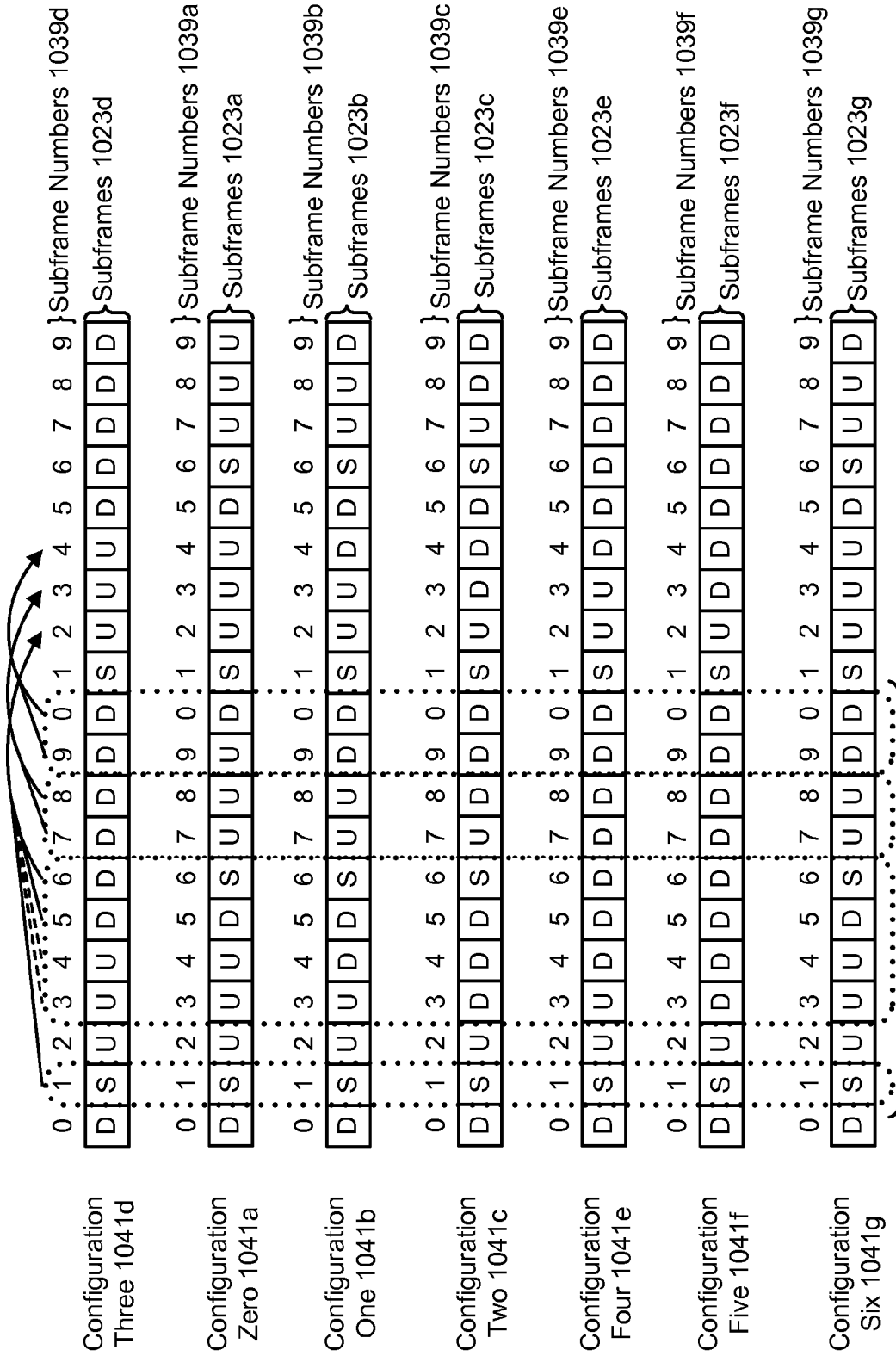
FIG. 10 illustrates more specifically the association regions for configuration three with respect to other uplink-downlink (UL-DL) configurations.

FIG. 10 illustrates more specifically the association regions for configuration three 1041*d* with respect to other UL-DL configurations 1041*a-c*, 1041*e-g*. For example, the association regions 1047*d* illustrated in FIG. 10 may be the same as the association regions 547*d* illustrated in FIG. 5 as applied to other UL-DL configurations 1041*a-c*,*e-g*. The configurations 1041*a-g* in FIG. 10 are illustrated as subframes 1023*a-g* with corresponding subframe numbers 1039*a-g*. Table 15 below indicates the existing associations 1043 for configuration three 1041*d* and the added associations 1045 for aggregated uplink reporting of different UL-DL configurations.

TABLE 15

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 (Ref. Cell) | — | — | 7, 6, 11 | 6, 5 | 5, 4 | — | — | — | — | — |
| 0 | — | — | 7, 6, 11 | — | 4 | — | — | — | — | — |
| 1 | — | — | 7, 6, 11, 8 | — | 5, 4 | — | — | — | — | — |
| 2 | — | — | 7, 6, 11, 9, 8 | 5 | 5, 4 | — | — | — | — | — |
| 4 | — | — | 7, 6, 11, 8 | 6, 5 | 5, 4 | — | — | — | — | — |
| 5 | — | — | 7, 6, 11, 9, 8 | 6, 5 | 5, 4 | — | — | — | — | — |
| 6 | — | — | 7, 6, 11 | — | 5, 4 | — | — | — | — | — |

The added associations listed in Table 15 allow for uplink reporting from the association regions for configuration three 1041*d* described previously with respect to FIG. 5. For example, the first association region 1047*d* for configuration three 1041*d* captures the additional downlink subframes (e.g., subframe 3 and 4) for configuration one 1041*b*, configuration two 1041*c*, configuration four 1041*e* and configuration five 1041*f*. As illustrated, the association regions 1047*d* for configuration three 1041*d* allow for uplink reporting of any of the other UL-DL configurations.

Figure 11:
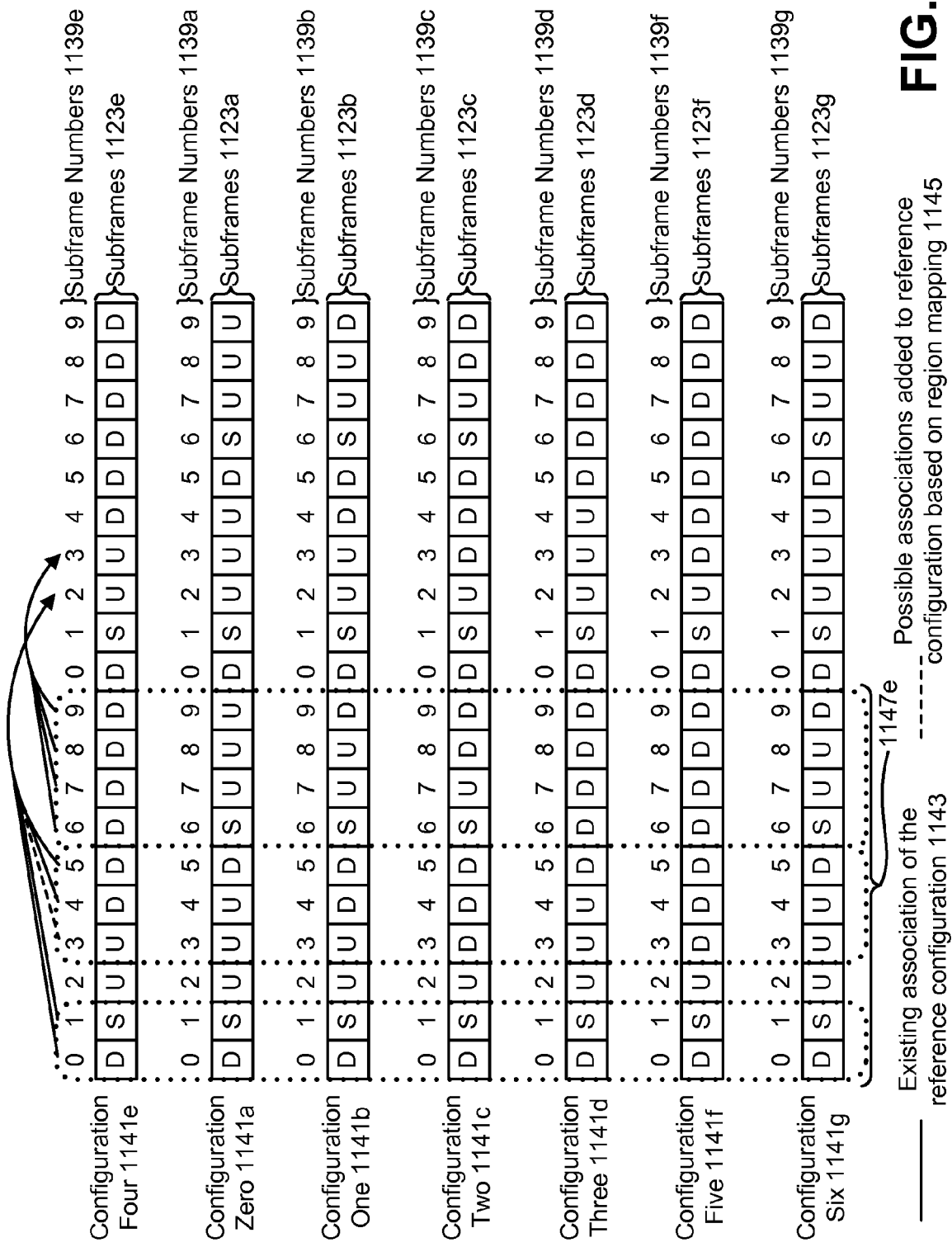
FIG. 11 illustrates more specifically the association regions for configuration four with respect to other uplink-downlink (UL-DL) configurations.

FIG. 11 illustrates more specifically the association regions for configuration four 1141*e* with respect to other UL-DL configurations 1141*a-d*, 1141*f-g*. For example, the association regions 1147*e* illustrated in FIG. 11 may be the same as the association regions 647*e* illustrated in FIG. 6 as applied to other UL-DL configurations 1141*a-d*,*f-g*. The configurations 1141*a-g* in FIG. 11 are illustrated as subframes 1123*a-g* with corresponding subframe numbers 1139a-g. Table 16 below indicates the existing associations 1143 for configuration four 1141e and the added associations 1145 for aggregated uplink reporting of different UL-DL configurations.

TABLE 16

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 (Ref. Cell) | — | — | 12, 8, 7, 11 | 6, 5, 4, 7 | — | — | — | — | — | — |
| 0 | — | — | 12, 7, 11 | 7 | — | — | — | — | — | — |
| 1 | — | — | 12, 8, 7, 11 | 4, 7 | — | — | — | — | — | — |
| 2 | — | — | 12, 8, 7, 11, 9 | 5, 4, 7 | — | — | — | — | — | — |
| 3 | — | — | 12, 7, 11 | 6, 5, 4, 7 | — | — | — | — | — | — |
| 5 | — | — | 12, 8, 7, 11, 9 | 6, 5, 4, 7 | — | — | — | — | — | — |
| 6 | — | — | 12, 7, 11 | 4, 7 | — | — | — | — | — | — |

The added associations listed in Table 16 allow for uplink reporting from the association regions for configuration four 1141e described previously with respect to FIG. 6. For example, the first association region 1147e for configuration four 1141e captures the additional downlink subframe (e.g., subframe 3) for configuration two 1141c and configuration five 1141f. As illustrated, the association regions 1147e for configuration four 1141e allow for uplink reporting of any of the other UL-DL configurations.

Figure 12:
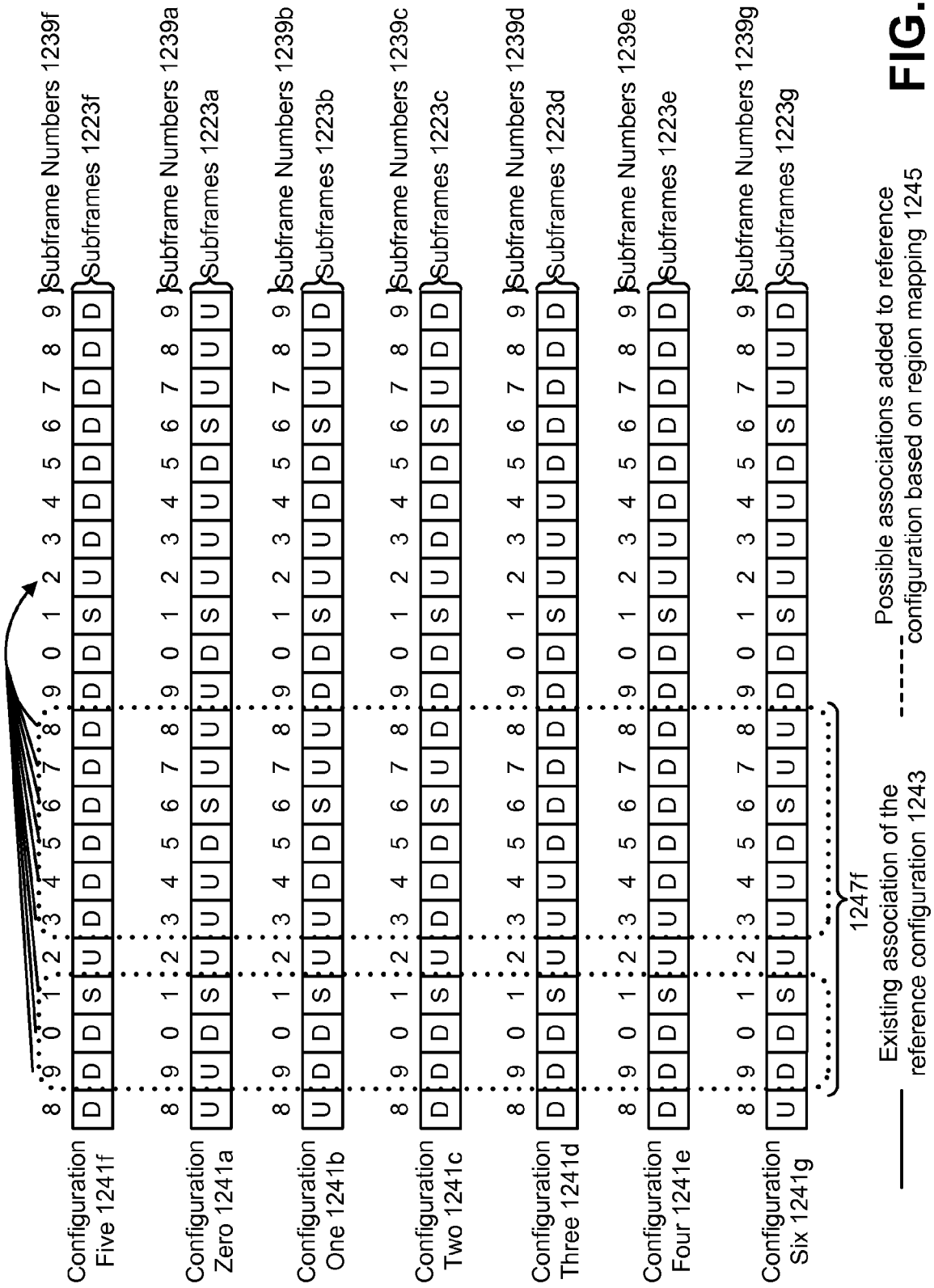
FIG. 12 illustrates more specifically the association regions for configuration five with respect to other uplink-downlink (UL-DL) configurations.

FIG. 12 illustrates more specifically the association regions for configuration five 1241f with respect to other UL-DL configurations 1241a-e, 1241g. For example, the association regions 1247f illustrated in FIG. 12 may be the same as the association regions 647f illustrated in FIG. 6 as applied to other UL-DL configurations 1241a-e,g. The configurations 1241a-g in FIG. 12 are illustrated as subframes 1223a-g with corresponding subframe numbers 1239a-g. Table 17 below indicates the existing associations 1243 for configuration four 1241f and the added associations 1245 for aggregated uplink reporting of different UL-DL configurations.

TABLE 17

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 5 (Ref. Cell) | — | — | 13, 12, 9, 8, 7, 5, 4, 11, 6 | — | — | — | — | — | — | — |
| 0 | — | — | 12, 7, 11, 6 | — | — | — | — | — | — | — |
| 1 | — | — | 13, 12, 8, 7, 11, 6 | — | — | — | — | — | — | — |
| 2 | — | — | 13, 12, 9, 8, 7, 4, 11, 6 | — | — | — | — | — | — | — |
| 3 | — | — | 13, 12, 7, 5, 4, 11, 6 | — | — | — | — | — | — | — |
| 4 | — | — | 13, 12, 8, 7, 5, 4, 11, 6 | — | — | — | — | — | — | — |
| 6 | — | — | 13, 12, 7, 11, 6 | — | — | — | — | — | — | — |

The added associations listed in Table 17 allow for uplink reporting from the association regions for configuration five 1241f described previously with respect to FIG. 6. As illustrated, the association regions 1247f for configuration five 1241f allow for uplink reporting of any of the other UL-DL configurations.

Figure 13:
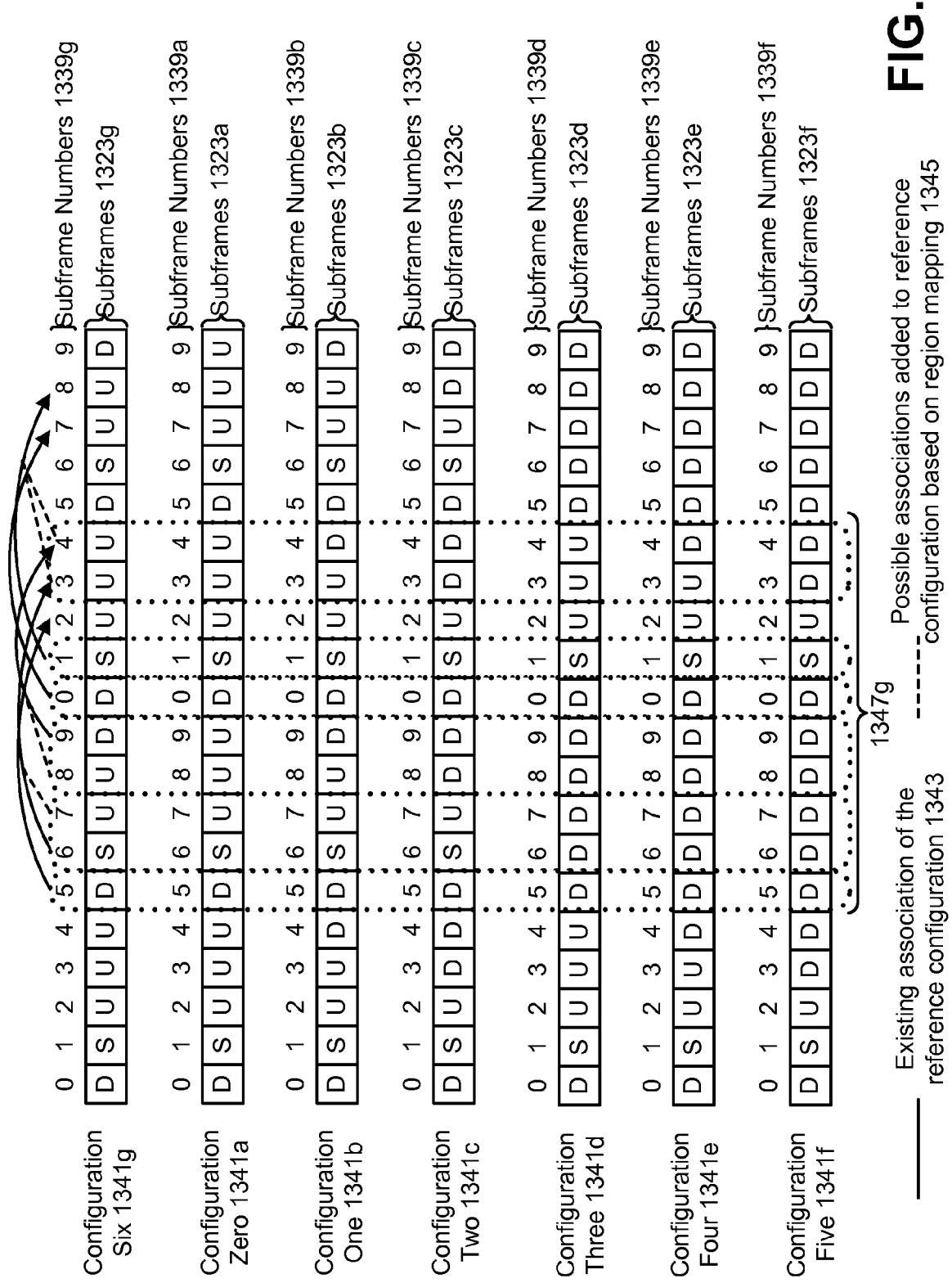
FIG. 13 illustrates more specifically the association regions for configuration six with respect to other uplink-downlink (UL-DL) configurations.

FIG. 13 illustrates more specifically the association regions for configuration six 1341g with respect to other UL-DL configurations 1341a-f. For example, the association regions 1347g illustrated in FIG. 13 may be the same as the association regions 647g illustrated in FIG. 6 as applied to other UL-DL configurations 1341a-f. The configurations 1341a-g in FIG. 13 are illustrated as subframes 1323a-g with corresponding subframe numbers 1339a-g. Table 18 below indicates the existing associations 1343 for configuration six 1341g and the added associations 1345 for aggregated uplink reporting of different UL-DL configurations.

TABLE 18

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 6 (Ref. Cell) | — | — | 7 | 7 | 5 | — | — | 7 | 7 | — |
| 0 | — | — | 7 | 7 | — | — | — | 7 | 7 | — |
| 1 | — | — | 7 | 7 | 5 | — | — | 7 | 7, 4 | — |
| 2 | — | — | 7 | 7 | 5, 6 | — | — | 7 | 7, 5, 4 | — |
| 3 | — | — | 7 | 7, 6 | 5, 6 | — | — | 7 | 7 | — |
| 4 | — | — | 7 | 7, 6 | 5, 6 | — | — | 7 | 7, 4 | — |
| 5 | — | — | 7 | 7, 6 | 5, 6 | — | — | 7 | 7, 5, 4 | — |

The added associations listed in Table 18 allow for uplink reporting from the association regions for configuration six 1341g described previously with respect to FIG. 6. For example, the second association region 1347g for configuration six 1341g captures the additional downlink subframe (e.g., subframe 7) for configuration three 1341d, configuration four 1341e and configuration five 1341f. As illustrated, the association regions 1347g for configuration six 1341g allow for uplink reporting of any of the other UL-DL configurations.

FIGS. 14-20 illustrate one example of a more evenly distributed mapping approach for each UL-DL configuration. In some cases, the association region mapping approach may result in unbalanced uplink reporting payloads. For example, if a PCell has configuration 3 and an SCell has configuration 2, then the number of ACK/NACK bits mapped from SCell are 5, 1 2 for uplink subframes 2, 3 and 4 respectively. In some cases, the unbalanced payload may limit the ability to effectively utilize the association region mapping approach. However, there are many other possible association mapping approaches. One possible approach may be a more evenly distributed mapping approach. The more evenly distributed mapping approach (e.g., distribution mapping) may define possible uplink reporting associations for more evenly distributed uplink reporting payloads. In one configuration, a distribution region may be defined for a reference configuration that identifies a region of uplink subframes that a set of subframes may be associated with in a more evenly balanced manner. The distribution regions may add new uplink reporting associations that balance the uplink reporting payloads.

The distribution mapping may be accomplished using a variety of possible associations. In one configuration, the unbalanced associations of the association region mapping approach may be redefined to provide a more evenly balanced distributed mapping. Several examples of distribution mapping are described herein. It should be noted that the terms "more evenly," "balanced" and variations thereof may be used to mean that bits may be spread across a number of subframes in order to reduce disproportionality between subframes. It should be noted, however, that a "balanced" or "more even" distribution may not require an average number of bits per subframe. Rather, the bits may be more evenly distributed as compared to the "unbalanced" association region mapping approach in some cases.

It should be noted that different association mapping approaches may be used on different cells. For example, a first approach may be applied to one cell and a second approach may be applied to a second cell. Distribution regions may be described in further detail with reference to the Figures below. For convenience, distribution regions are indicated within dotted outlines.

Figure 14:
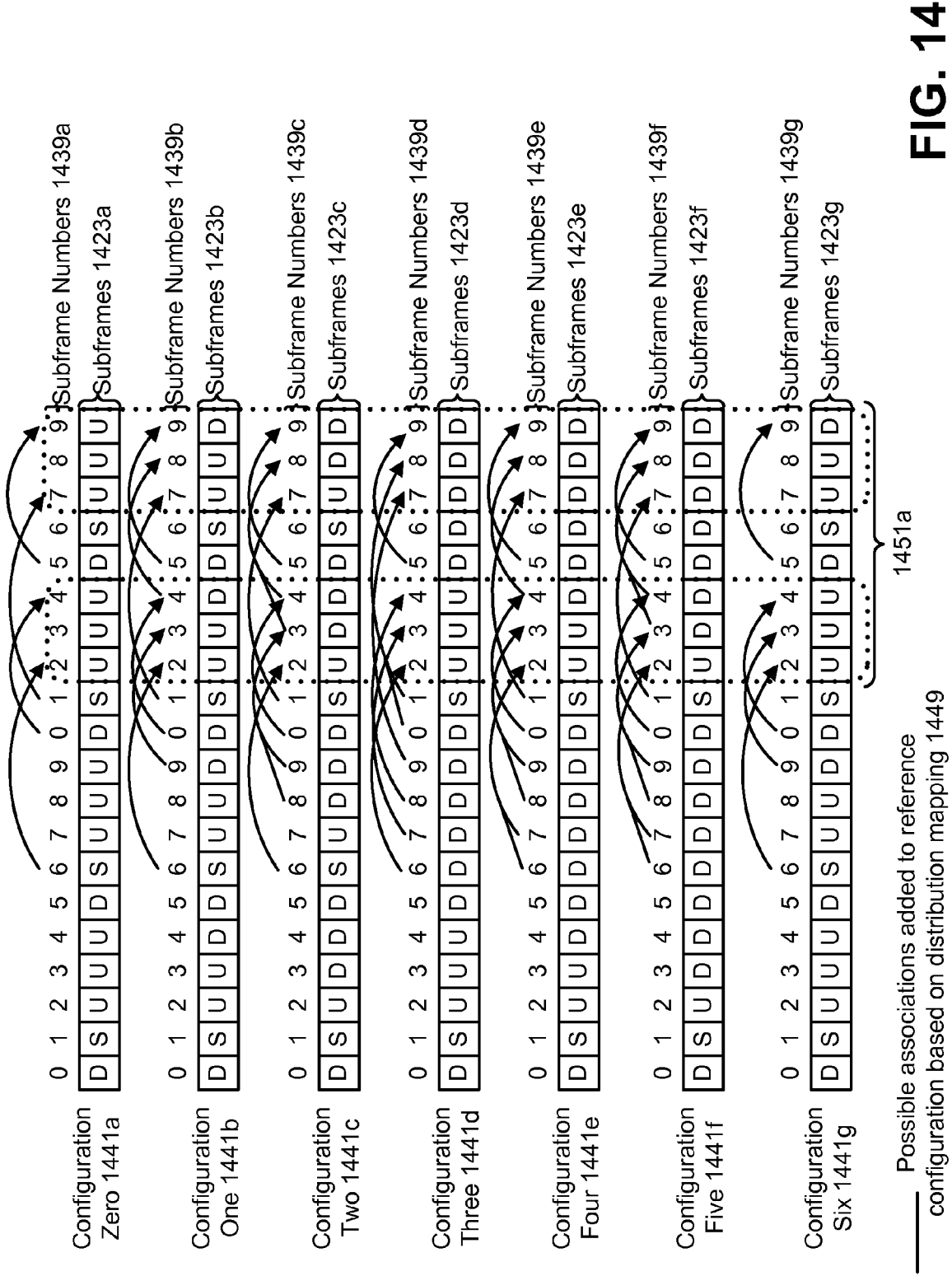
FIG. 14 is a diagram illustrating one example of a more evenly distributed mapping approach for configuration zero as applied to other configurations.

FIG. 14 is a diagram illustrating one example of a more evenly distributed mapping approach for configuration zero 1441a as applied to other configurations 1441b-g. For convenience, possible associations 1449 that have been added based on the distribution region mappings may be indicated with solid lines. Subframe numbers 1439 may indicate corresponding subframes 1423. In this example, two distribution regions 1451a may correspond to configuration zero 1441a. A first distribution region 1451a for configuration zero 1441a includes uplink subframes 2, 3 and 4 and the second distribution region 1451a for configuration zero 1441a includes uplink subframes 7, 8 and 9. In configuration zero 1441a (e.g., the reference configuration), possible associations 1449 from subframes 6, 0, 1 and 5 are distributed between subframes 1423a within the first distribution region 1451a and the second distribution region 1451a. As illustrated in FIG. 14, the uplink reporting associations for each of the reporting subframes in each of the UL-DL configurations may be distributed between subframes 1423 within the distribution regions 1451a. For example, in configuration three 1441d, possible associations 1449 from subframes 6, 7, 8, 9, 0, 1 and 5 are balanced between the subframes 1423d within the distribution regions 1451a with subframes 6, 7 and 8 balanced within the first distribution region 1451a and with subframes 9, 0, 1 and 5 balanced within the second distribution region 1451a. Table 19 below summarizes one example of distribution mapping associations for each of the UL-DL configurations.

TABLE 19

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 (Ref. Cell) | — | — | 6 | — | 4 | — | — | 6 | — | 4 |
| 1 | — | — | 6 | 4 | 4 | — | — | 6 | 4 | 4 |
| 2 | — | — | 6 | 5, 4 | 4 | — | — | 6 | 5, 4 | 4 |
| 3 | — | — | 6 | 6 | 6 | — | — | 8 | 8, 7 | 4 |
| 4 | — | — | 6, 5 | 5, 4 | 4 | — | — | 6 | 4 | 4 |
| 5 | — | — | 6, 5 | 5, 4 | 4 | — | — | 6 | 5, 4 | 4 |
| 6 | — | — | 6 | 4 | 4 | — | — | 6 | — | 4 |

Figure 15:
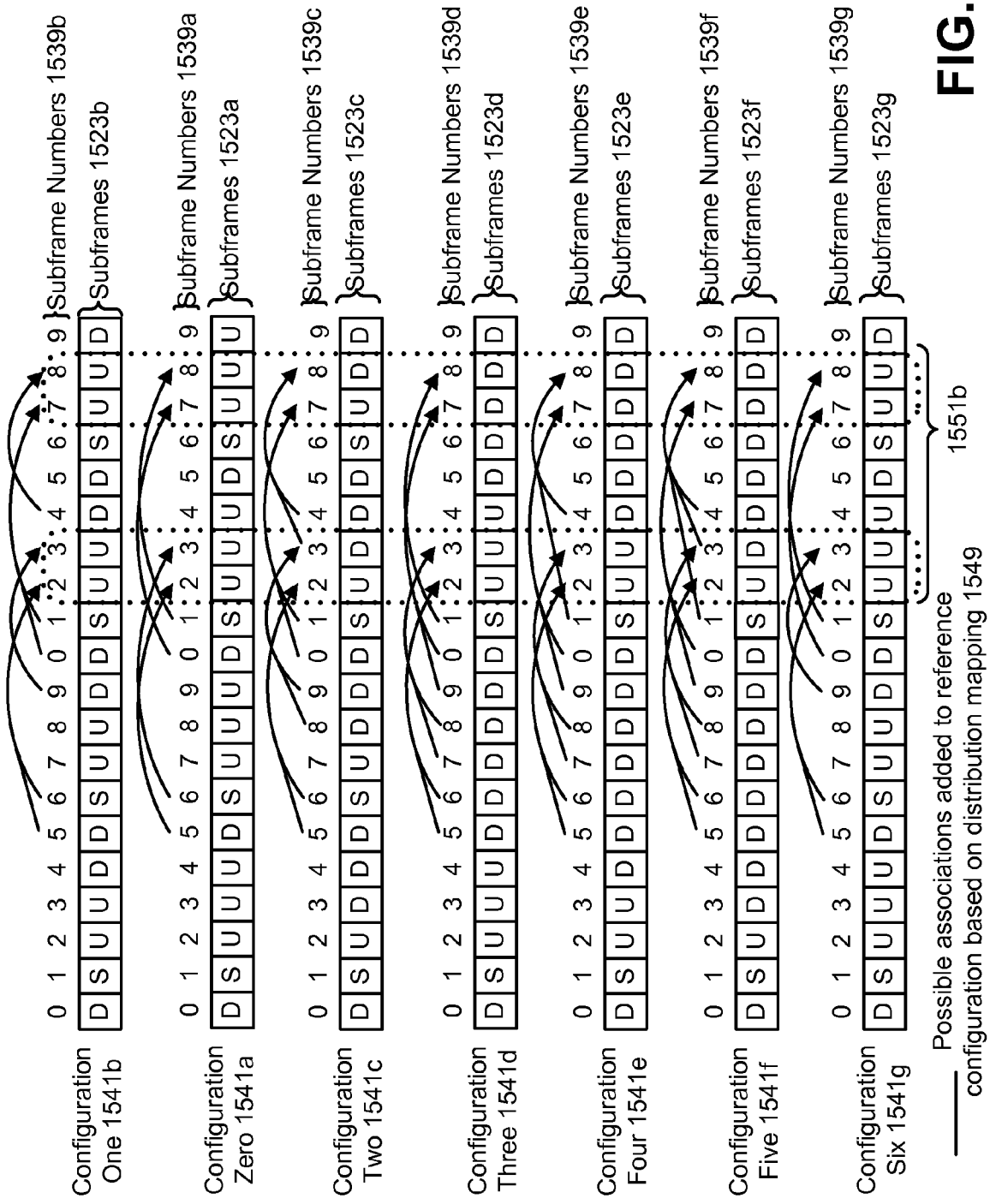
FIG. 15 is a diagram illustrating one example of a more evenly distributed mapping approach for configuration one as applied to other configurations.

FIG. 15 is a diagram illustrating one example of a more evenly distributed mapping approach for configuration one 1541b as applied to other configurations 1541a, 1541c-g. For convenience, possible associations 1549 that have been added based on the distribution region mappings may be indicated with solid lines. Subframe numbers 1539 may indicate corresponding subframes 1523. In this example, two distribution regions 1551b may correspond to configuration one 1541b. A first distribution region 1551b for configuration one 1541b includes uplink subframes 2 and 3 and the second distribution region 1551b for configuration one 1541b includes uplink subframes 7 and 8. In configuration one 1541b (e.g., the reference configuration), possible associations 1549 from subframes 5, 6, 9, 0, 1 and 4 are distributed between subframes 1523b within the first distribution region 1551b and the second distribution region 1551b. As illustrated in FIG. 15, the uplink reporting associations for each of the reporting subframes in each of the UL-DL configurations may be distributed between subframes 1523 within the distribution regions 1551b. For example, in configuration three 1541d, possible associations 1549 from subframes 5, 6, 7, 8, 9, 0 and 1 are balanced between the subframes 1523d within the distribution regions 1551b with subframes 5, 6, 7 and 8 balanced within the first distribution region 1551b and with subframes 9, 0, and 1 balanced within the second distribution region 1551b. Table 20 below summarizes one example of distribution mapping associations for each of the UL-DL configurations.

TABLE 20

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1 (Ref. Cell) | — | — | 7, 6 | 4 | — | — | — | 7, 6 | 4 | — |
| 0 | — | — | 7 | 7 | — | — | — | 7 | 7 | — |
| 2 | — | — | 7, 6 | 5, 4 | — | — | — | 7, 6 | 5, 4 | — |
| 3 | — | — | 7, 6 | 6, 5 | — | — | — | 8, 7 | 7 | — |
| 4 | — | — | 7, 6 | 6, 5 | — | — | — | 8, 7 | 4, 7 | — |
| 5 | — | — | 7, 6 | 6, 5 | — | — | — | 8, 7 | 5, 4, 7 | — |
| 6 | — | — | 7, 6 | 4 | — | — | — | 7 | 7 | — |

Figure 16:
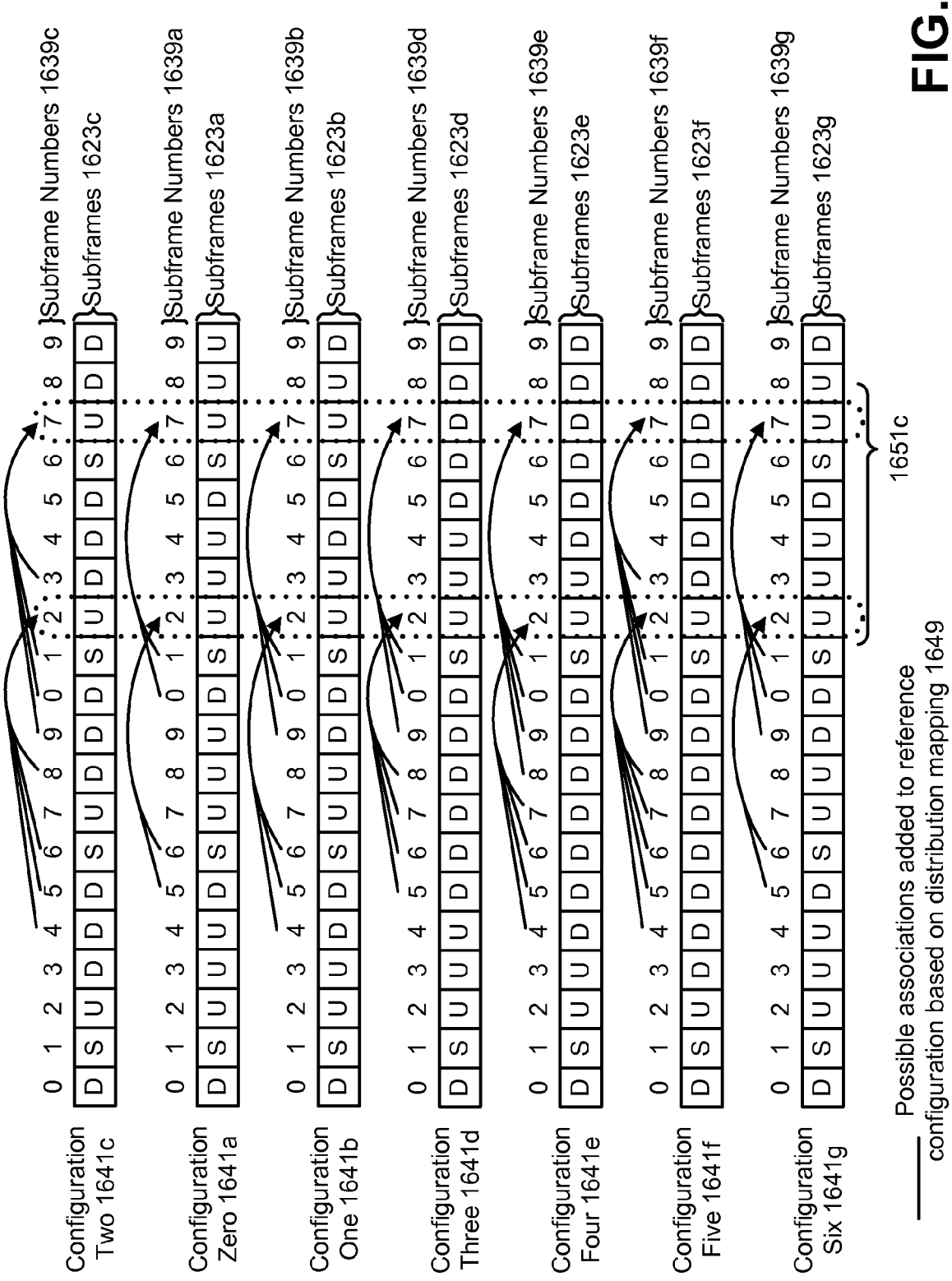
FIG. 16 is a diagram illustrating one example of a more evenly distributed mapping approach for configuration two as applied to other configurations.

FIG. 16 is a diagram illustrating one example of a more evenly distributed mapping approach for configuration two 1641c as applied to other configurations 1641a-b, 1641d-g. For convenience, possible associations 1649 that have been added based on the distribution region mappings may be indicated with solid lines. Subframe numbers 1639 may indicate corresponding subframes 1623. In this example, two distribution regions 1651c may correspond to configuration two 1641c. A first distribution region 1651c for configuration two 1641c includes uplink subframe 2 and the second distribution region 1651c for configuration two 1541c includes uplink subframe 7. In configuration two 1641c (e.g., the reference configuration), possible associations 1649 from subframes 4, 5, 6, 8, 9, 0, 1 and 3 are distributed between subframes 1623c within the first distribution region 1651c and the second distribution region 1651c. As illustrated in FIG. 16, the uplink reporting associations for each of the reporting subframes in each of the UL-DL configurations may be distributed between subframes 1623 within the distribution regions 1651b. For example, in configuration three 1641d, possible associations 1649 from subframes 5, 6, 7, 8, 9, 0 and 1 are balanced between the subframes 1623d within the distribution regions 1651c with subframes 5, 6, 7 and 8 balanced within the first distribution region 1651c and with subframes 9, 0 and 1 balanced within the second distribution region 1651c. Table 21 below summarizes one example of distribution mapping associations for each of the UL-DL configurations.

TABLE 21

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 (Ref. Cell) | — | — | 8, 7, 4, 6 | — | — | — | — | 8, 7, 4, 6 | — | — |
| 0 | — | — | 7, 6 | — | — | — | — | 7, 6 | — | — |
| 1 | — | — | 8, 7, 6 | — | — | — | — | 8, 7, 6 | — | — |
| 3 | — | — | 7, 6, 5, 4 | — | — | — | — | 8, 7, 6 | — | — |
| 4 | — | — | 8, 7, 6, 5 | — | — | — | — | 9, 8, 7, 6 | — | — |
| 5 | — | — | 8, 7, 6, 5, 4 | — | — | — | — | 8, 7, 4, 6 | — | — |
| 6 | — | — | 7, 6 | — | — | — | — | 8, 7, 6 | — | — |

Figure 17:
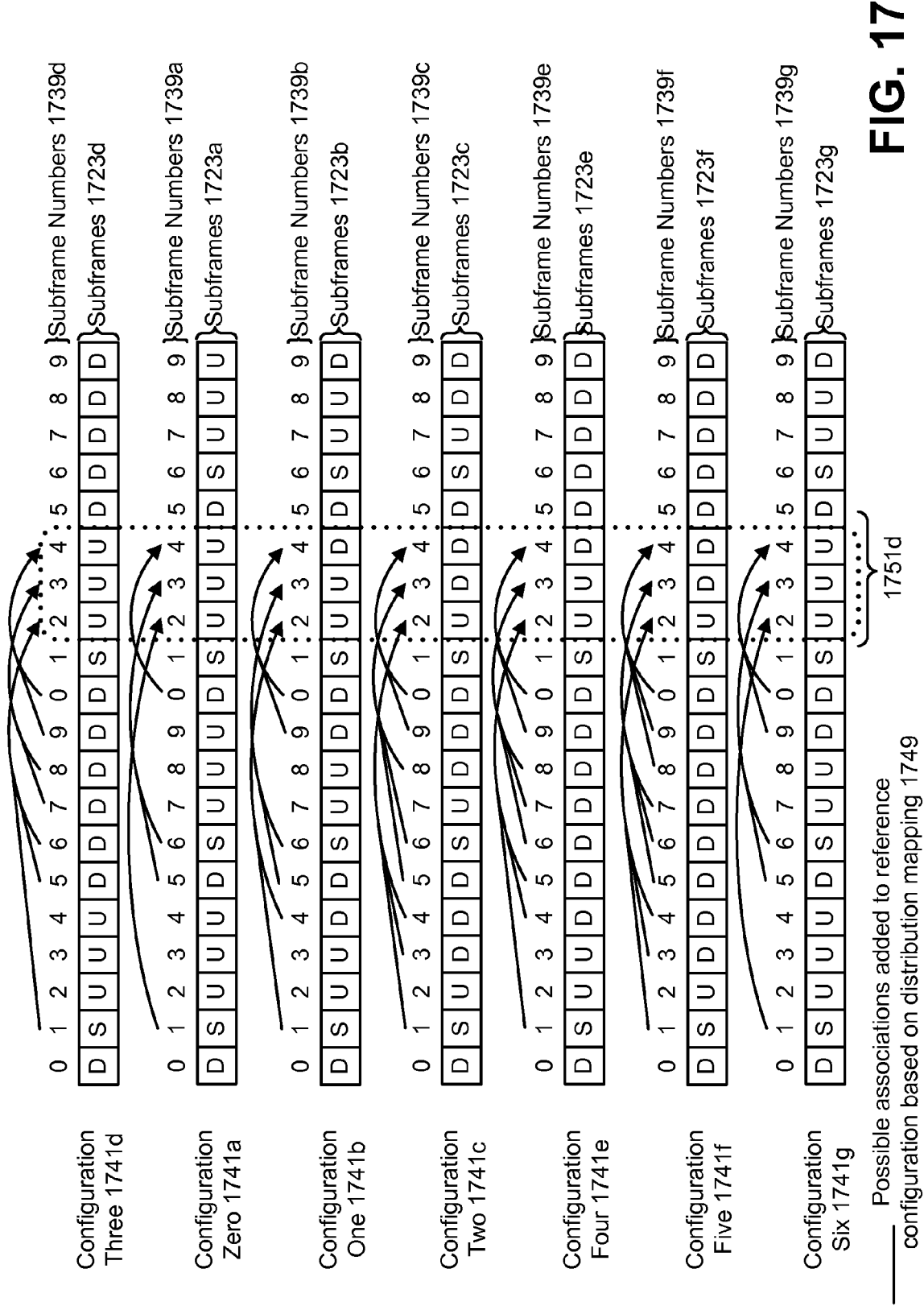
FIG. 17 is a diagram illustrating one example of a more evenly distributed mapping approach for configuration three as applied to other configurations.

FIG. 17 is a diagram illustrating one example of a more evenly distributed mapping approach for configuration three 1741c as applied to other configurations 1741a-c, 1741e-g. For convenience, possible associations 1749 that have been added based on the distribution region mappings may be indicated with solid lines. Subframe numbers 1739 may indicate corresponding subframes 1723. In this example, one distribution region 1751d may correspond to configuration three 1741d. A first distribution region 1751d for configuration three 1741d includes uplink subframes 2, 3 and 4. In configuration three 1741d (e.g., the reference configuration), possible associations 1749 from subframes 1, 5, 6, 7, 8, 9 and 0 are distributed between subframes 1723d within the first distribution region 1751d. As illustrated in FIG. 17, the uplink reporting associations for each of the reporting subframes in each of the UL-DL configurations may be distributed between subframes 1723 within the distribution regions 1751d. For example, in configuration two 1741c, possible associations 1749 from subframes 1, 3, 4, 5, 6, 8, 9 and 0 are balanced between the subframes 1723d within the distribution region 1751d. Table 22 below summarizes one example of distribution mapping associations for each of the UL-DL configurations.

TABLE 22

| UL-DL Con-figuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 (Ref. Cell) | — | — | 7, 6, 11 | 6, 5 | 5, 4 | — | — | — | — | — |
| 0 | — | — | 11 | 8, 7 | 4 | — | — | — | — | — |
| 1 | — | — | 11, 8 | 8, 7 | 5, 4 | — | — | — | — | — |
| 2 | — | — | 11, 9, 8 | 8, 5, 7 | 5, 4 | — | — | — | — | — |
| 4 | — | — | 11, 8, 7 | 7, 6, 5 | 5, 4 | — | — | — | — | — |
| 5 | — | — | 11, 9, 8 | 8, 7, 6 | 6, 5, 4 | — | — | — | — | — |
| 6 | — | — | 11 | 8, 7 | 5, 4 | — | — | — | — | — |

Figure 18:
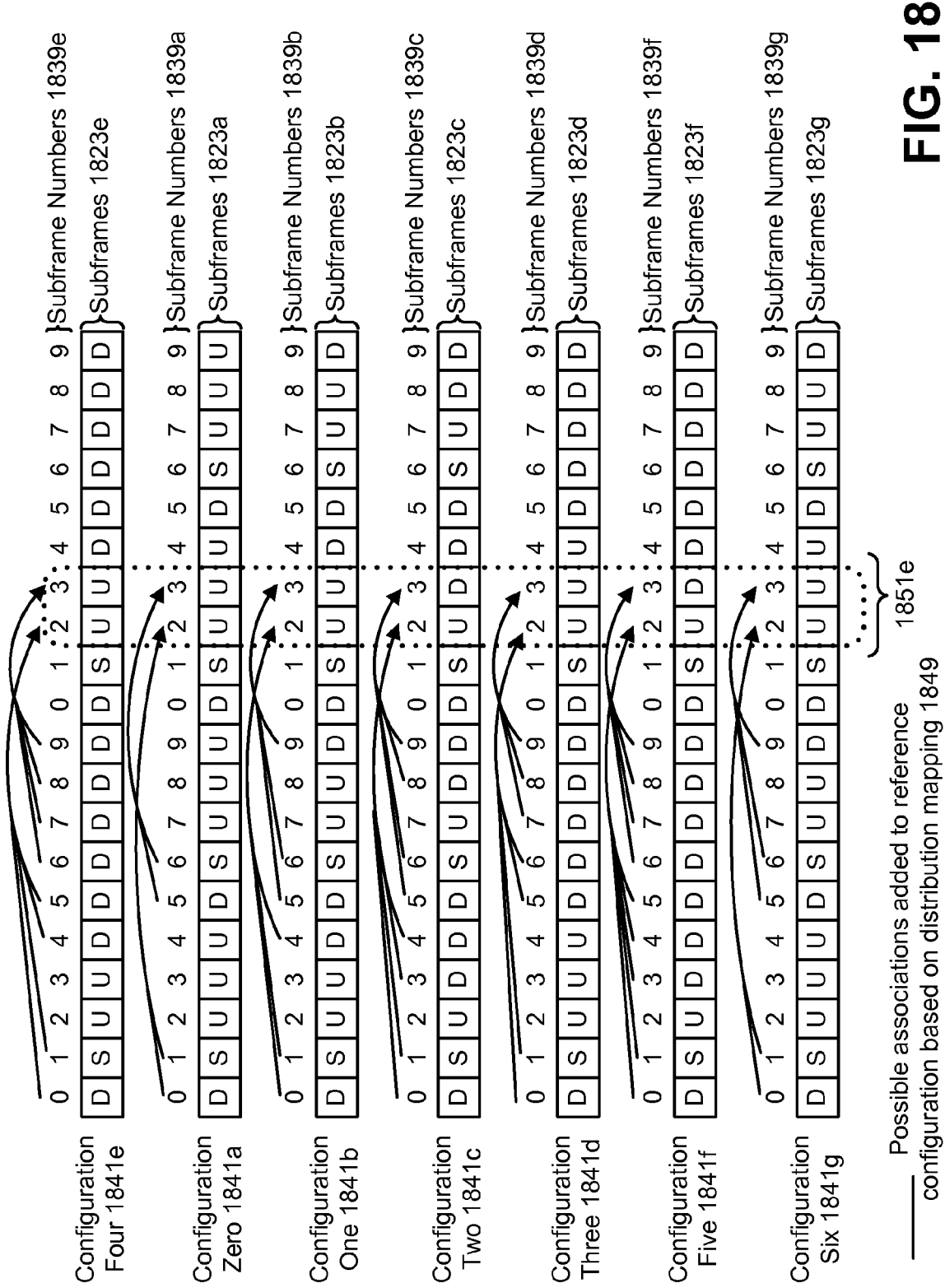
FIG. 18 is a diagram illustrating one example of a more evenly distributed mapping approach for configuration four as applied to other configurations.

FIG. 18 is a diagram illustrating one example of a more evenly distributed mapping approach for configuration four 1841e as applied to other configurations 1841a-d, 1841f-g. For convenience, possible associations 1849 that have been added based on the distribution region mappings may be indicated with solid lines. Subframe numbers 1839 may indicate corresponding subframes 1823. In this example, a distribution region 1851e may correspond to configuration four 1841e. A first distribution region 1851e for configuration four 1841e includes uplink subframes 2 and 3. In configuration four 1841e (e.g., the reference configuration), possible associations 1849 from subframes 0, 1, 4, 5, 6, 7, 8 and 9 are distributed between subframes 1823e within the first distribution region 1851e. As illustrated in FIG. 18, the uplink reporting associations for each of the reporting subframes in each of the UL-DL configurations may be distributed between subframes 1823 within the distribution region 1851e. Table 23 below summarizes one example of distribution mapping associations for each of the UL-DL configurations.

TABLE 23

| UL-DL Con-figuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 (Ref. Cell) | — | — | 12, 8, 7, 11 | 6, 5, 4, 7 | — | — | — | — | — | — |

TABLE 23-continued

| UL-DL Con-figuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 12, 11 | 8, 7 | — | — | — | — | — | — |
| 1 | — | — | 12, 8, 11 | 8, 4, 7 | — | — | — | — | — | — |
| 2 | — | — | 12, 9, 8, 11 | 8, 5, 4, 7 | — | — | — | — | — | — |
| 3 | — | — | 12, 7, 6, 11 | 6, 5, 4 | — | — | — | — | — | — |
| 5 | — | — | 12, 9, 8, 7, 11 | 7, 6, 5, 4 | — | — | — | — | — | — |
| 6 | — | — | 12, 11 | 8, 4, 7 | — | — | — | — | — | — |

Figure 19:
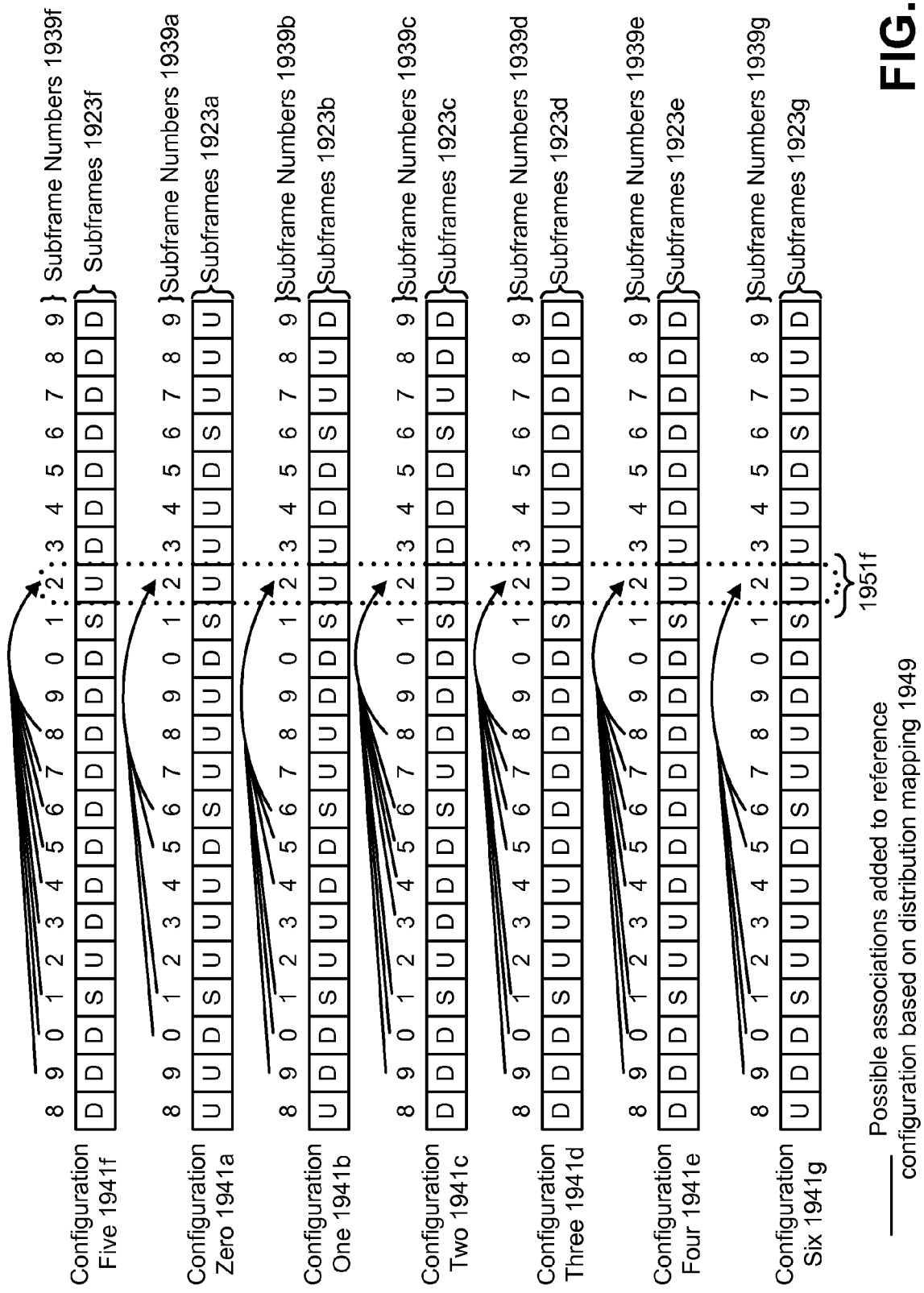
FIG. 19 is a diagram illustrating one example of a more evenly distributed mapping approach for configuration five as applied to other configurations.

FIG. 19 is a diagram illustrating one example of a more evenly distributed mapping approach for configuration five 1941f as applied to other configurations 1941a-e, 1941g. For convenience, possible associations 1949 that have been added based on the distribution region mappings may be indicated with solid lines. Subframe numbers 1939 may indicate corresponding subframes 1923. In this example, one distribution region 1951f may correspond to configuration five 1941f. A first distribution region 1951f for configuration five 1941f includes uplink subframe 2. In configuration five 1941f (e.g., the reference configuration), possible associations 1949 from subframes 9, 0, 1, 3, 4, 5, 6, 7 and 8 are distributed between subframes 1923f within the first distribution region 1951f. As illustrated in FIG. 19, the uplink reporting associations for each of the reporting subframes in each of the UL-DL configurations may be distributed between subframes 1923 within the distribution region 1951f. Table 24 below summarizes one example of distribution mapping associations for each of the UL-DL configurations.

TABLE 24

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 5 (Ref. Cell) | — | — | 13, 12, 9, 8, 7, 5, 4, 11, 6 | — | — | — | — | — | — | — |
| 0 | — | — | 12, 7, 11, 6 | — | — | — | — | — | — | — |
| 1 | — | — | 13, 12, 8, 7, 11, 6 | — | — | — | — | — | — | — |
| 2 | — | — | 13, 12, 9, 8, 7, 4, 11, 6 | — | — | — | — | — | — | — |
| 3 | — | — | 13, 12, 7, 5, 4, 11, 6 | — | — | — | — | — | — | — |
| 4 | — | — | 13, 12, 8, 7, 5, 4, 11, 6 | — | — | — | — | — | — | — |
| 6 | — | — | 13, 12, 7, 11, 6 | — | — | — | — | — | — | — |

Figure 20:
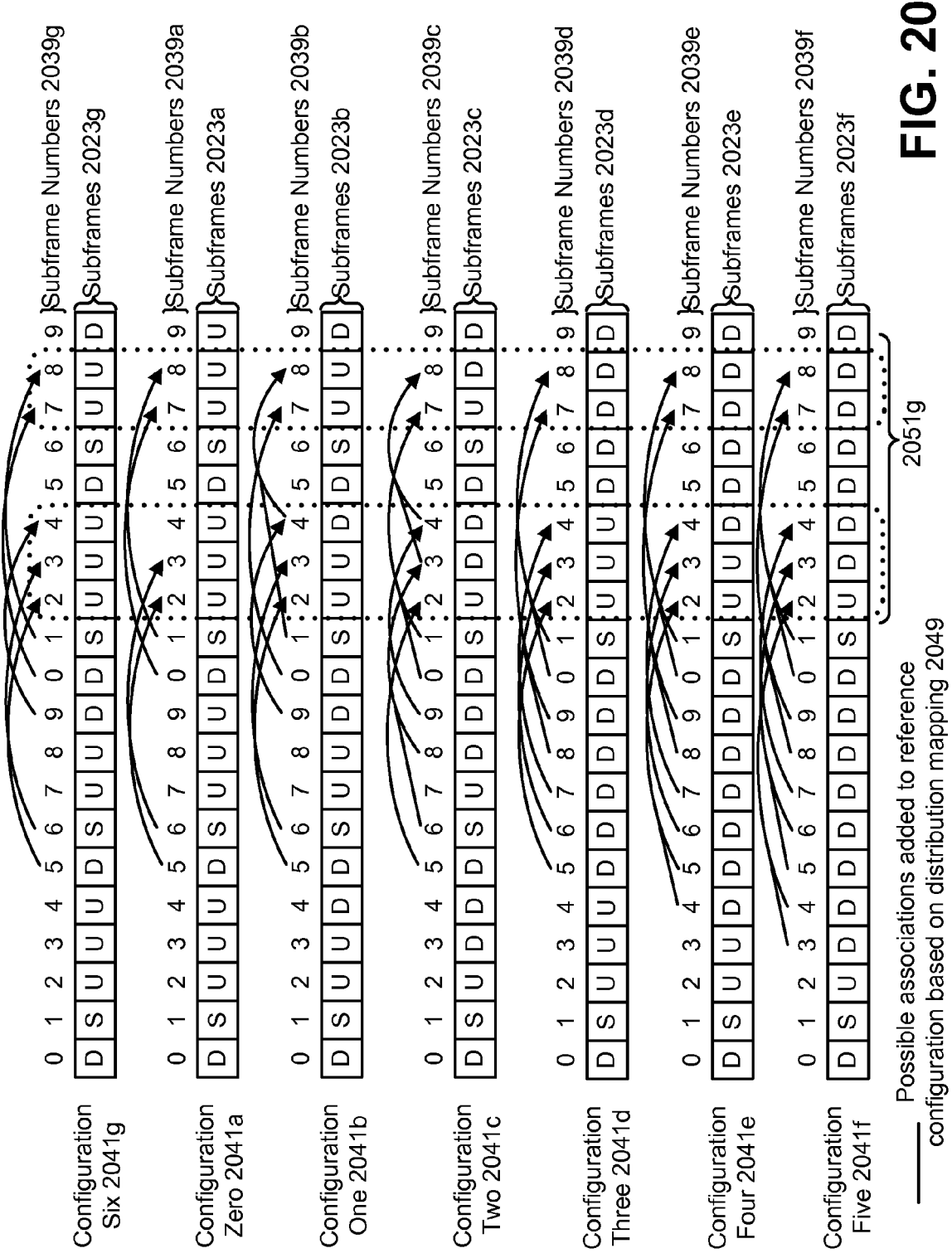
FIG. 20 is a diagram illustrating one example of a more evenly distributed mapping approach for configuration six as applied to other configurations.

FIG. 20 is a diagram illustrating one example of a more evenly distributed mapping approach for configuration six 2041g as applied to other configurations 2041a-f. For convenience, possible associations 2049 that have been added based on the distribution region mappings may be indicated with solid lines. Subframe numbers 2039 may indicate corresponding subframes 2023. In this example, two distribution regions 2051g may correspond to configuration six 2041g. A first distribution region 2051g for configuration six 2041g includes uplink subframes 2, 3 and 4 and the second distribution region 2051g for configuration six 2041g includes uplink subframes 7 and 8. In configuration six 2041g (e.g., the reference configuration), possible associations 2049 from subframes 5, 6, 9, 0 and 1 are distributed between subframes 2023g within the first distribution region 2051g and the second distribution region 2051g. As illustrated in FIG. 20, the uplink reporting associations for each of the reporting subframes in each of the UL-DL configurations may be distributed between subframes 2023 within the distribution regions 2051g. For example, in configuration three 2041d, possible associations 2049 from subframes 5, 6, 7, 8, 9, 0 and 1 are balanced between the subframes 2023d within the distribution regions 2051g with subframes 5, 6 and 7 balanced within the first distribution region 2051g and with subframes 8, 9, 0 and 1 balanced within the second distribution region 2051g. Table 25 below summarizes one example of distribution mapping associations for each of the UL-DL configurations.

TABLE 25

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 6 (Ref. Cell) | — | — | 7 | 7 | 5 | — | — | 7 | 7 | — |
| 0 | — | — | 7 | 7 | — | — | — | 7 | 7 | — |
| 1 | — | — | 7 | 7 | 5 | — | — | 7 | 4, 7 | — |
| 2 | — | — | 7 | 5, 7 | 5 | — | — | 7, 6 | 5, 4 | — |
| 3 | — | — | 7 | 7 | 7 | — | — | 9, 8 | 8, 7 | — |
| 4 | — | — | 8, 7 | 7 | 7 | — | — | 9, 8 | 8, 7 | — |
| 5 | — | — | 9, 8 | 8, 7 | 7 | — | — | 9, 8 | 8, 7 | — |

Figure 21:
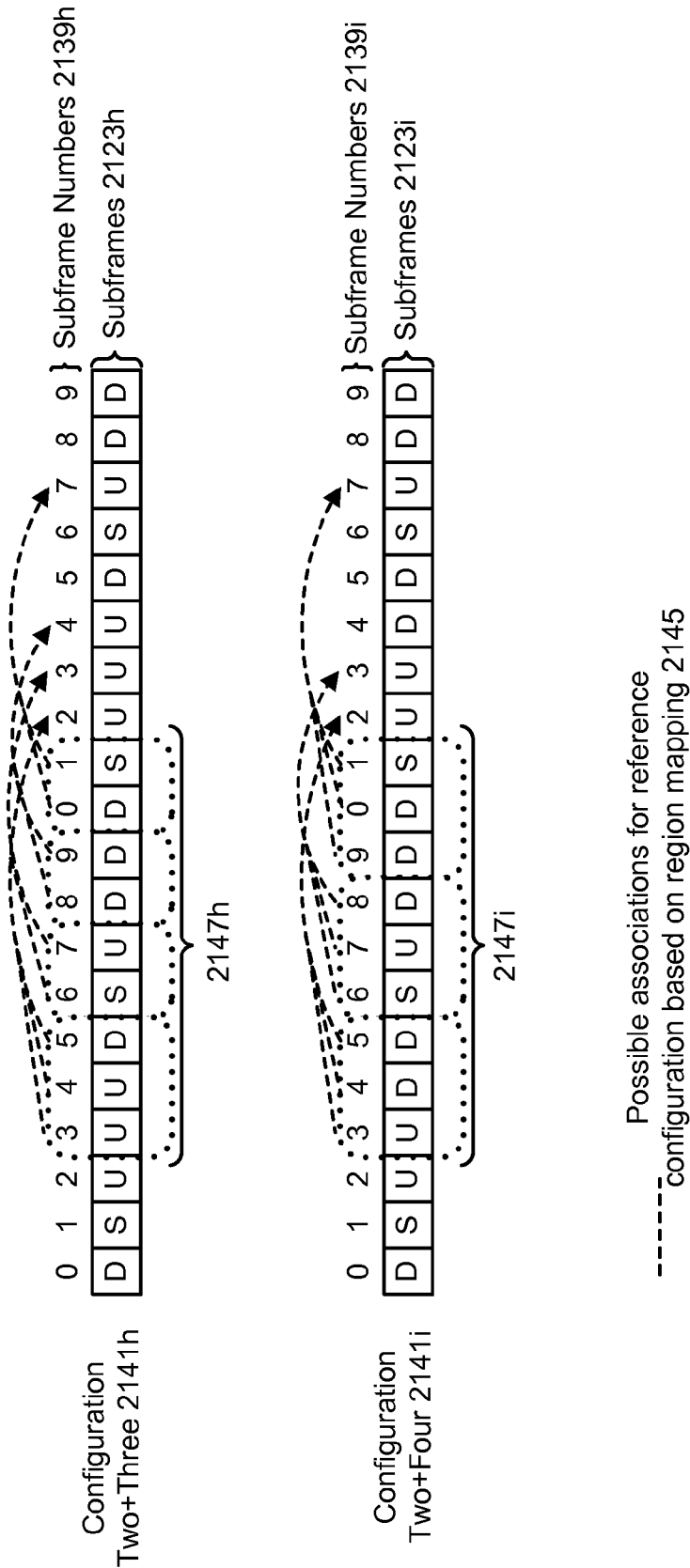
FIG. 21 is a diagram illustrating two new superset uplink-downlink (UL-DL) configurations that may be used in accordance with the systems and methods disclosed herein.

FIG. 21 is a diagram illustrating two new superset uplink-downlink (UL-DL) configurations that may be used as reference cells in accordance with the systems and methods disclosed herein. In some cases, it may be beneficial to increase the number of uplink subframes that may be used. For example, increasing the number of uplink subframes may reduce the uplink reporting payload size.

In one configuration, the number of uplink subframes may be increased by using a combination of uplink subframes from some or all of the cells. In cases where multiple cells include uplink subframes during a particular subframe, the uplink subframe on the cell with the lowest Cell_ID may be used. For example, the uplink subframes of a PCell (e.g., Cell_ID=0) may be combined with the uplink subframes of one or more SCells. In this example, the PCell may be the uplink reporting cell for the uplink subframes in the PCell and an SCell (e.g., with a lowest Cell_ID for a particular subframe) may be the uplink reporting cell for any uplink subframes occurring on during a downlink subframe on the PCell. For instance, if configuration 2 and configuration 3 are both being used, then configuration 2 and configuration 3 may be combined to increase the number of uplink subframes. For instance, the cell with configuration 3 may be used as the uplink reporting cell for subframes 3, 4 and 5, and the cell with configuration 2 may be used as the uplink reporting cell for subframe 7.

Combining the uplink subframes from different UL-DL configurations may result in one or more superset UL-DL configurations. For example, the uplink subframes from configuration two and configuration three may be combined to form a superset UL-DL configuration that may be referred to as configuration two+three 2141h (e.g., "2+3"). In another example, the uplink subframes from configuration two and configuration four may be combined to form a superset UL-DL configuration that may be referred to as configuration two+four 2141i (e.g., "2+4"). In some cases, the superset UL-DL configurations may be used as a reference configuration. In one configuration, a reference cell may have a superset UL-DL configuration (e.g., configuration 2+3, configuration 2+4) as a reference configuration. In another configuration, a combination of uplink reporting cells may realize a superset UL-DL configuration (e.g., configuration 2+3, configuration 2+4). For instance, the uplink subframes from a first uplink reporting cell having configuration 2 and the uplink subframes from a second uplink reporting cell having configuration 3 may be combined to realize a superset reference configuration (e.g., configuration 2+3). In one configuration, both the first uplink reporting cell and the second uplink reporting cell may be reference cells. In another configuration, the reference cell may switch based on subframes. For instance, a cell with configuration 3 may be the reference cell for a number of subframes and then the reference cell may switch to a cell with configuration 2 for a number of subframes.

Configuration two+three 2141h and configuration two+four 2141i may be used as reference configurations for all of the systems and methods described herein. For example, association region mappings may be based on configuration two+three 2141h and configuration two+four 2141i. In another example, more evenly distributed mappings may be based on configuration two+three 2141h and configuration two+four 21411.

Configuration two+three 2141h and configuration two+four 2141i are illustrated in FIG. 21. For convenience, possible associations 2145 that have been added based on the association region mappings may be indicated with dashed lines. Subframe numbers 2139 may indicate corresponding subframes 2123. Configuration two+three 2141h includes four association regions 2147h. A first association region 2147h for configuration two+three 2141h includes subframes 3, 4 and 5 and includes association mappings to the uplink subframe 2 in the next radio frame. The association from subframes 3, 4 and 5 to the uplink subframe 2 are new association mappings 2145 for configuration two+three 2141h.

A second association region 2147h for configuration two+three 2141h includes subframes 6 and 7 and includes association mappings to the uplink subframe 3 in the next radio frame. The association mappings from subframes 6 and 7 to the uplink subframe 3 are new association mappings 2145 for configuration two+three 2141h.

A third association region 2147h for configuration two+three 2141h includes subframes 8 and 9 and includes an association mapping to the uplink subframe 4 in the next radio frame. The association from subframes 8 and 9 to the uplink subframe 4 are new association mappings 2145 for configuration two-three 2141h.

A fourth association region 2147h for configuration two+three 2141h includes subframes 0 and 1 and includes an association mapping to the uplink subframe 7 in the current radio frame. The associations from subframes 0 and 1 to the uplink subframe 7 are new association mappings 2145 for configuration two+three 2141h.

Configuration two+four 2141i includes three association regions 2147i. A first association region 2147i for configuration two+four 2141i includes subframes 3, 4 and 5 and includes association mappings to the uplink subframe 2 in the next radio frame. The association from subframes 3, 4 and 5 to the uplink subframe 2 are new association mappings 2145 for configuration two+four 2141i.

A second association region 2147i for configuration two+four 2141i includes subframes 6, 7 and 8 and includes association mappings to the uplink subframe 3 in the next radio frame. The association mappings from subframes 6, 7 and 8 to the uplink subframe 3 are new association mappings 2145 for configuration two+four 21411.

A third association region 2147i for configuration two+four 2141i includes subframes 9, 0 and 1 and includes an association mapping to the uplink subframe 7. The association from subframes 9, 0 and 1 to the uplink subframe 7 are new association mappings 2145 for configuration two-four 21411.

Figure 22:
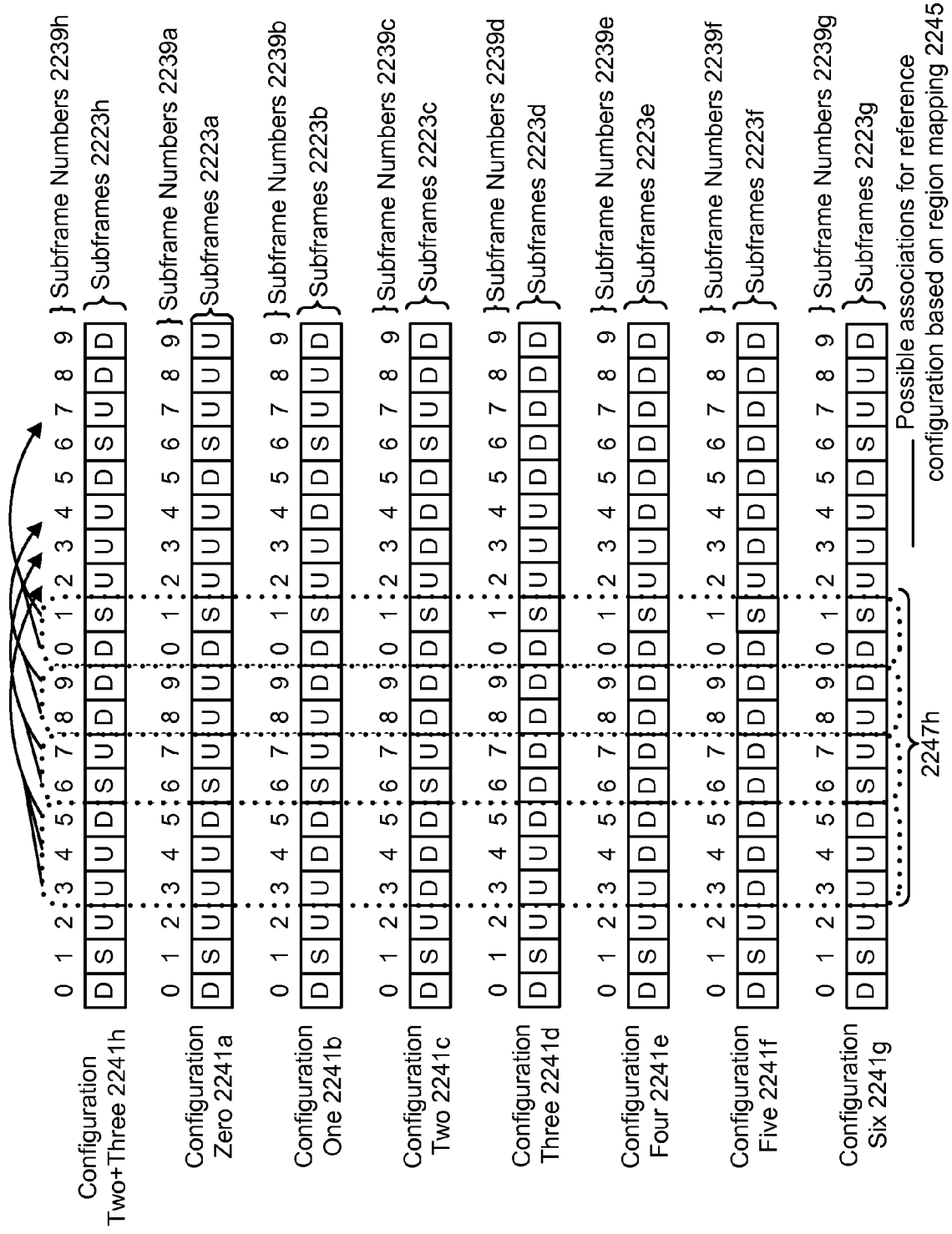
FIG. 22 illustrates more specifically the association regions for configuration two+three with respect to other uplink-downlink (UL-DL) configurations.

FIG. 22 illustrates more specifically the association regions for configuration two+three 2241h with respect to other uplink-downlink (UL-DL) configurations 2241a-g. For example, the association regions 2247h illustrated in FIG. 22 may be the same as the association regions 2147h illustrated in FIG. 21 as applied to other UL-DL configurations 2241a-g. The configurations 2241a-h in FIG. 22 are illustrated as subframes 2223a-h with corresponding subframe numbers 2239a-h. Table 26 below indicates the possible associations 2245 for configuration two+three 2241h (e.g., the reference configuration) for aggregated uplink reporting of different UL-DL configurations.

TABLE 26

| Superset UL-DL Con-figuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 + 3 (Ref. Conf) | — | — | 9, 8, 7 | 7, 6 | 6, 5 | — | — | 7, 6 | — | — |
| 0 | — | — | 7 | 7 | — | — | — | 7, 6 | — | — |
| 1 | — | — | 8, 7 | 7 | 5 | — | — | 7, 6 | — | — |
| 2 | — | — | 9, 8, 7 | 7 | 6, 5 | — | — | 7, 6 | — | — |
| 3 | — | — | 7 | 7, 6 | 6, 5 | — | — | 7, 6 | — | — |
| 4 | — | — | 8, 7 | 7, 6 | 6, 5 | — | — | 7, 6 | — | — |
| 5 | — | — | 9, 8, 7 | 7, 6 | 6, 5 | — | — | 7, 6 | — | — |
| 6 | — | — | 7 | 7 | 5 | — | — | 7, 6 | — | — |

The possible associations listed in Table 26 allow for uplink reporting from the association regions for configuration two+three 2241h described previously with respect to FIG. 21. For example, the first association region 2247h for configuration two+three 2241h captures the additional downlink subframes (e.g., subframes 3 and 4) for configuration one 2241b, configuration two 2241c, configuration four 2241e and configuration five 2241f. As illustrated, the association regions 2247h for configuration two+three 2241h allow for uplink reporting of any of the other UL-DL configurations 2241a-g.

Figure 23:
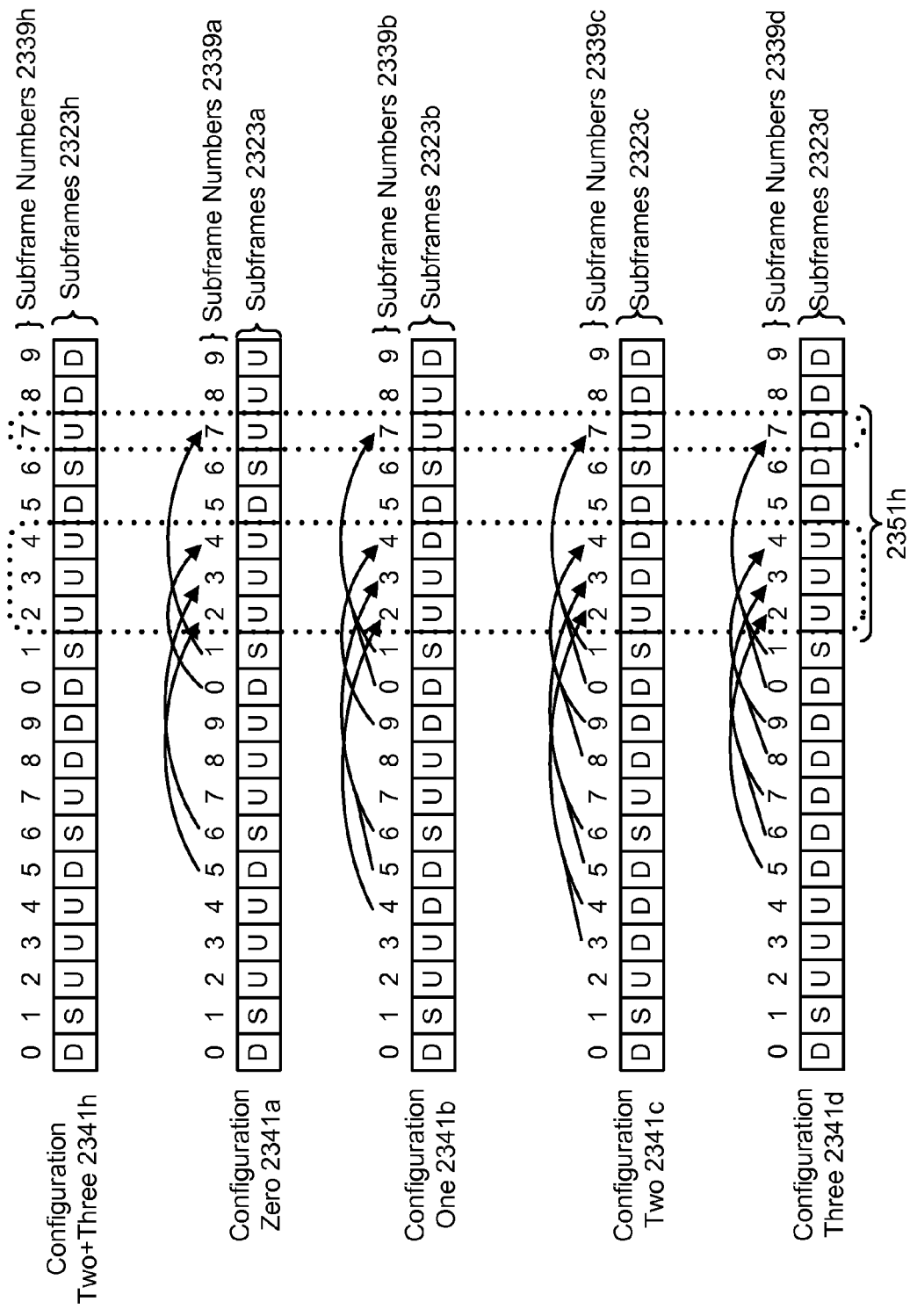
FIG. 23 is a diagram illustrating one example of a more evenly distributed mapping approach for configuration two+three.

FIG. 23 is a diagram illustrating one example of a more evenly distributed mapping approach for configuration two+three 2341h as applied to other configurations 2341a-d. For convenience, possible associations 2349 that have been added based on the distribution region mappings may be indicated with solid lines. Subframe numbers 2339 may indicate corresponding subframes 2323. In this example, two distribution regions 2351b may correspond to configuration two+three 2341h. A first distribution region 2351h for configuration two+three 2341h includes uplink subframes 2, 3 and 4 and the second distribution region 2351h for configuration two+three 2341h includes uplink subframe 7. Distribution regions 2351h may be based on configuration two+three 2341h (e.g., the reference configuration). As illustrated in FIG. 23, the uplink reporting associations for each of the reporting subframes in each of the UL-DL configurations may be distributed between subframes 2323 within the distribution regions 2351h. For example, in configuration three 2341d, possible associations 2349 from subframes 5, 6, 7, 8, 9, 0 and 1 are balanced between the subframes 2323d within the distribution regions 2351h with subframes 5, 6, 7, 8 and 9 balanced within the first distribution region 2351h and with subframes 0 and 1 balanced within the second distribution region 2351h.

Figure 24:
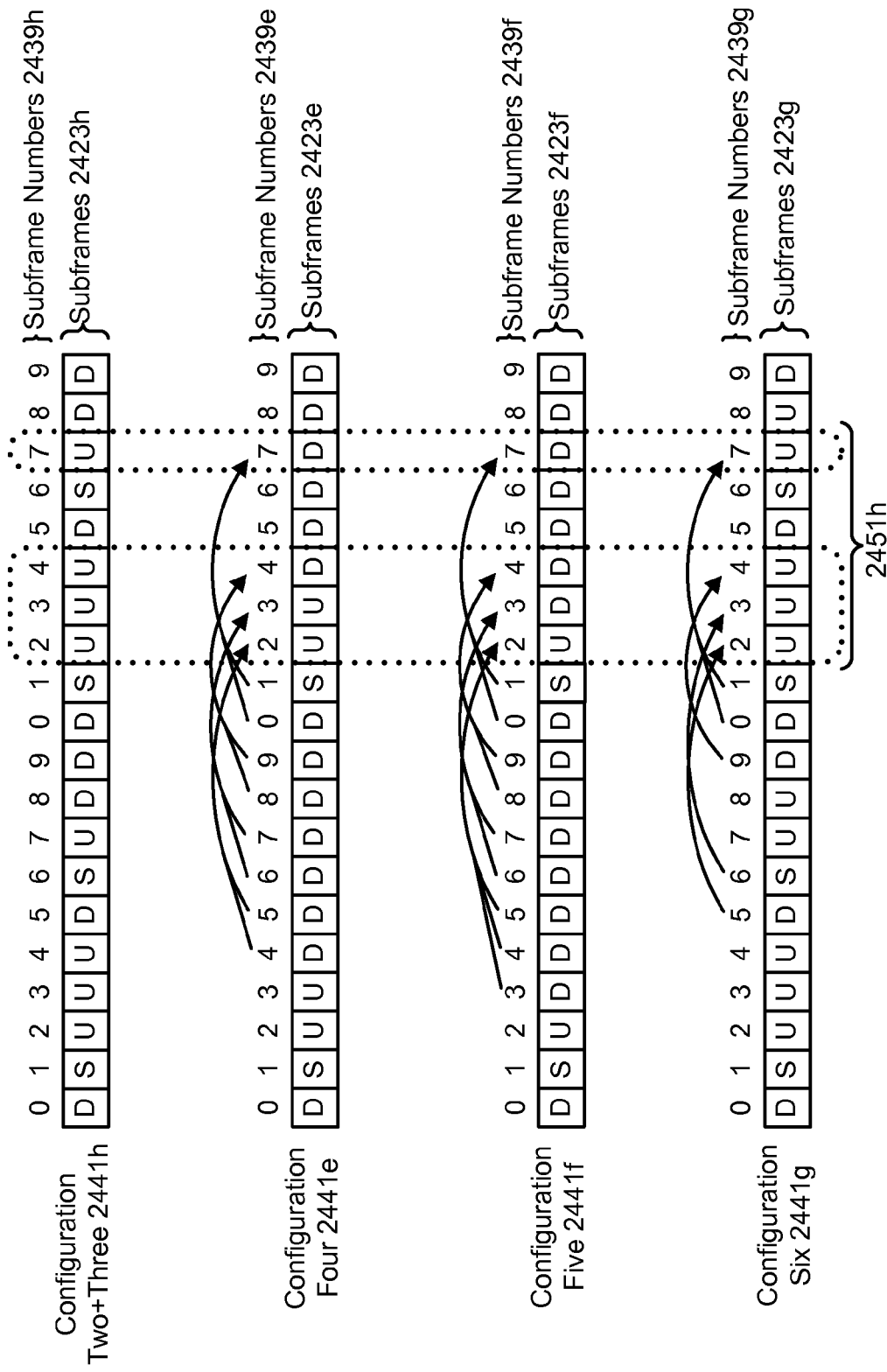
FIG. 24 is a diagram further illustrating the example set forth in FIG. 23.

FIG. 24 is a diagram further illustrating the example set forth in FIG. 23. More specifically, FIG. 24 illustrates an example of a more evenly distributed mapping approach for configuration two+three 2441h as applied to other configurations 2441e-g. For convenience, possible associations 2449 that have been added based on the distribution region mappings may be indicated with solid lines. Subframe numbers 2439 may indicate corresponding subframes 2423. In this example, two distribution regions 2451h may correspond to configuration two+three 2341h as described previously. As illustrated in FIG. 24, the uplink reporting associations for each of the reporting subframes in each of the UL-DL configurations may be distributed between subframes 2423 within the distribution regions 2451h as described previously. Table 27 below summarizes one example of distribution mapping associations for each of the UL-DL configurations. Table 27 corresponds with the diagrams in FIGS. 23 and 24.

TABLE 27

| Superset UL-DL Con-figuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 + 3 (Ref. Conf) | — | — | | | | — | — | | — | — |
| 0 | — | — | 7 | 7 | 4 | — | — | 6 | — | — |
| 1 | — | — | 8 | 8, 7 | 5 | — | — | 7, 6 | — | — |
| 2 | — | — | 9, 8 | 8, 7 | 6, 5 | — | — | 7, 6 | — | — |
| 3 | — | — | 7 | 7, 6 | 6, 5 | — | — | 7, 6 | — | — |
| 4 | — | — | 8, 7 | 7, 6 | 6, 5 | — | — | 7, 6 | — | — |
| 5 | — | — | 9, 8, 7 | 7, 6 | 6, 5 | — | — | 7, 6 | — | — |
| 6 | — | — | 7 | 7 | 5 | — | — | 7, 6 | — | — |

Figure 25:
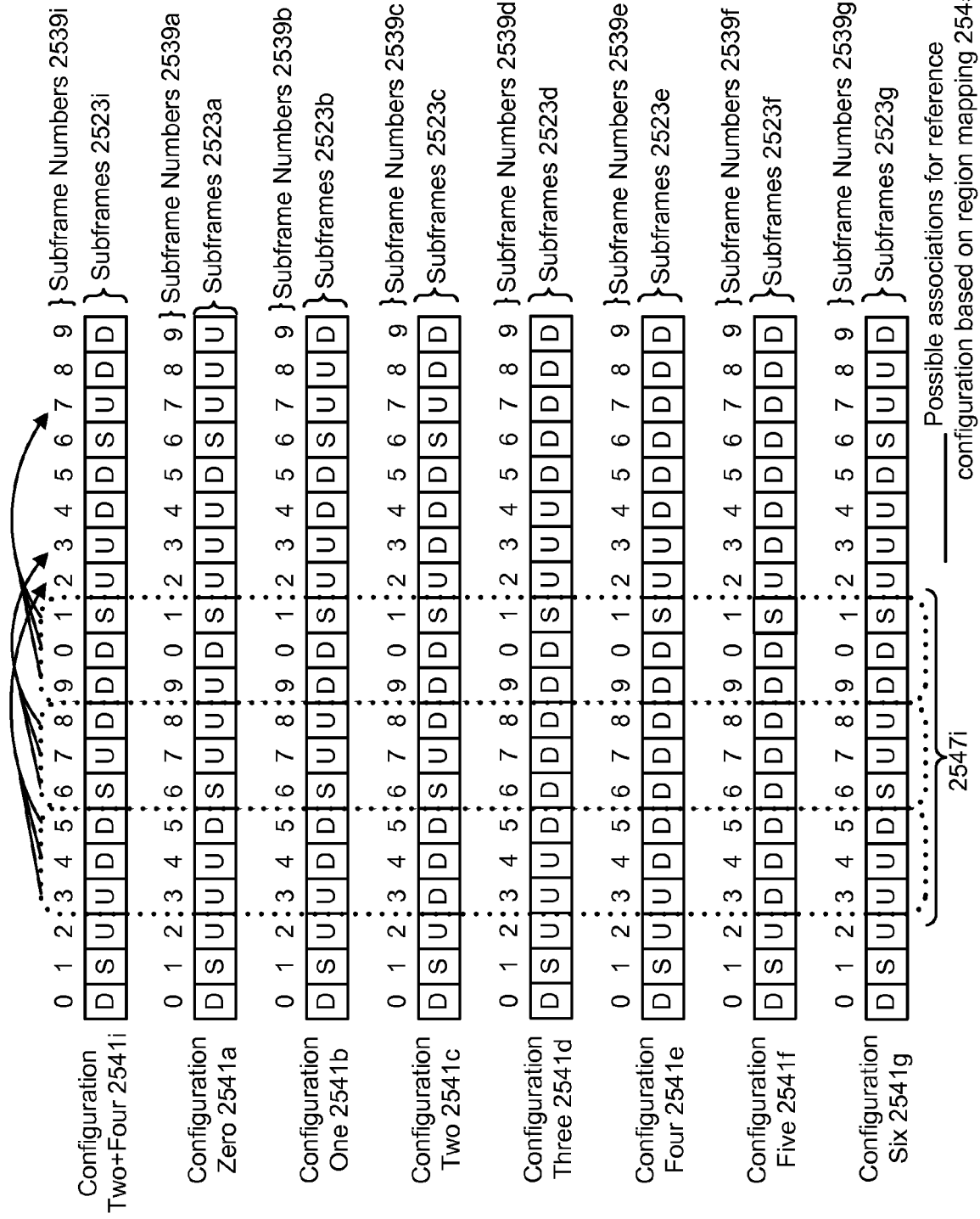
FIG. 25 illustrates more specifically the association regions for configuration two+four with respect to other uplink-downlink (UL-DL) configurations.

FIG. 25 illustrates more specifically the association regions for configuration two+four 2541i with respect to other uplink-downlink (UL-DL) configurations 2541a-g. For example, the association regions 2547i illustrated in FIG. 25 may be the same as the association regions 2147i illustrated in FIG. 21 as applied to other UL-DL configurations 2541a-g. The configurations 2541a-g, 25411 in FIG. 25 are illustrated as subframes 2523a-g, 2523i with corresponding subframe numbers 2539a-g, 2539i. Table 28 below indicates the possible associations 2545 for configuration two+four 25411 (e.g., the reference configuration) for aggregated uplink reporting of different UL-DL configurations.

TABLE 28

| Superset UL-DL Con-figuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 + 4 (Ref. Conf) | — | — | 9, 8, 7 | 7, 6, 5 | — | — | — | 8, 7, 6 | — | — |
| 0 | — | — | 7 | 7 | — | — | — | 7, 6 | — | — |
| 1 | — | — | 8, 7 | 7 | — | — | — | 8, 7, 6 | — | — |
| 2 | — | — | 9, 8, 7 | 7, 5 | — | — | — | 8, 7, 6 | — | — |
| 3 | — | — | 7 | 7, 6, 5 | — | — | — | 8, 7, 6 | — | — |
| 4 | — | — | 8, 7 | 7, 6, 5 | — | — | — | 8, 7, 6 | — | — |
| 5 | — | — | 9, 8, 7 | 7, 6, 5 | — | — | — | 8, 7, 6 | — | — |
| 6 | — | — | 7 | 7 | — | — | — | 8, 7, 6 | — | — |

The added associations listed in Table 28 allow for uplink reporting from the association regions for configuration two+four 25411 described previously with respect to FIG. 21. For example, the first association region 2547i for configuration two+four 25411 captures the additional downlink subframes (e.g., subframe 3) for configuration three 2541*d* and configuration five 2541*f*. As illustrated, the association regions 2547*i* for configuration two+four 25411 allow for uplink reporting of any of the other UL-DL configurations.

Figure 26:
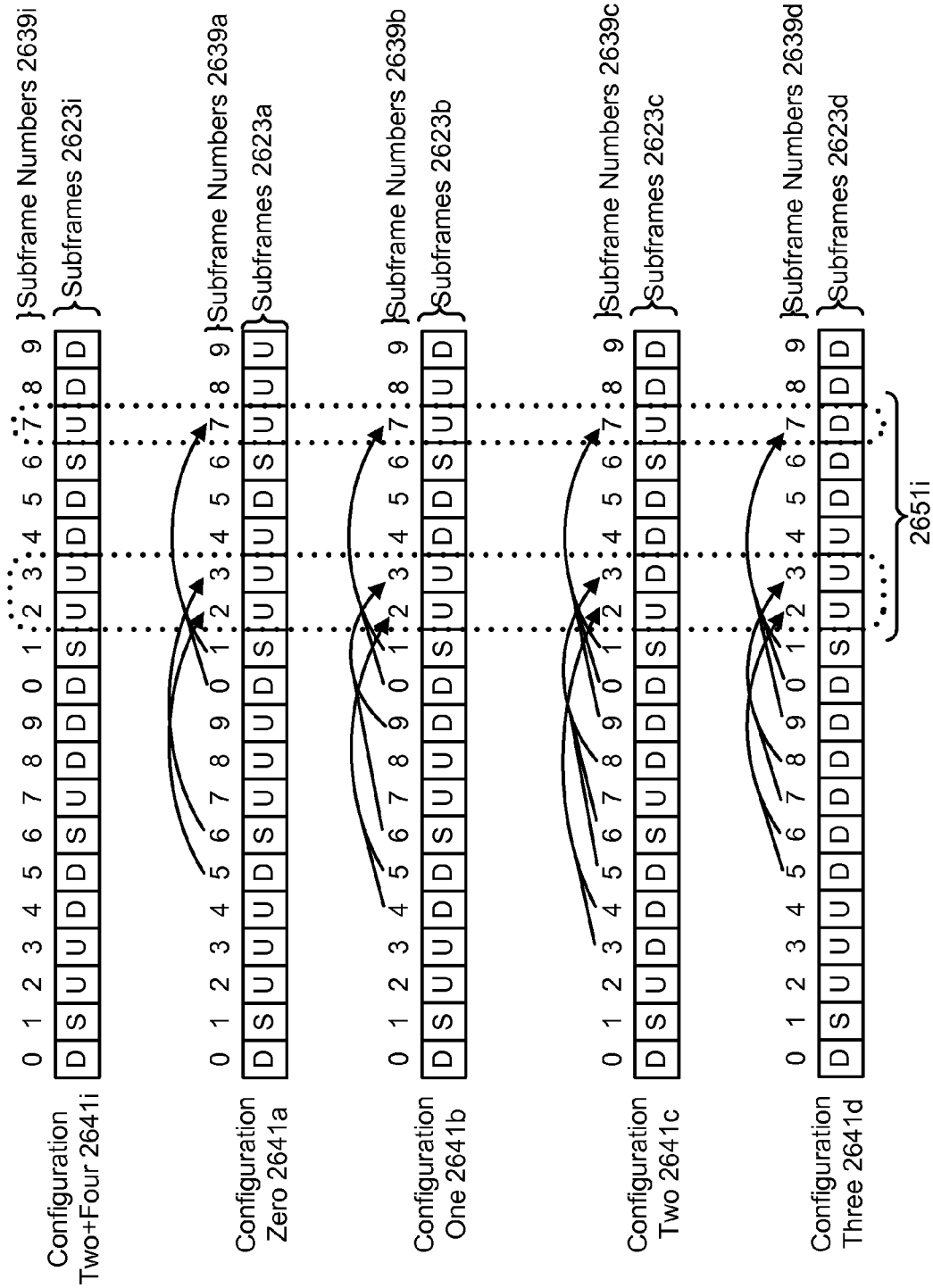
FIG. 26 is a diagram illustrating one example of a more evenly distributed mapping approach for configuration two+four.

FIG. 26 is a diagram illustrating one example of a more evenly distributed mapping approach for configuration two+four 26411 as applied to other configurations 2641*a-d*. For convenience, possible associations 2649 that have been added based on the distribution region mappings may be indicated with solid lines. Subframe numbers 2639 may indicate corresponding subframes 2623. In this example, two distribution regions 26511 may correspond to configuration two+four 2641*i*. A first distribution region 2651*i* for configuration two+four 26411 includes uplink subframes 2 and 3 and the second distribution region 2651*i* for configuration two+four 2641*i* includes uplink subframe 7. Distribution regions 2651*i* may be based on configuration two+four 2641*i* (e.g., the reference configuration). As illustrated in FIG. 26, the uplink reporting associations for each of the reporting subframes in each of the UL-DL configurations may be distributed between subframes 2623 within the distribution regions 2651*i*. For example, in configuration three 2641*d*, possible associations 2649 from subframes 5, 6, 7, 8, 9, 0 and 1 are distributed between the subframes 2623*d* within the distribution regions 26511 with subframes 5, 6, 7 and 8 distributed within the first distribution region 26511 and with subframes 9, 0 and 1 distributed within the second distribution region 26511.

Figure 27:
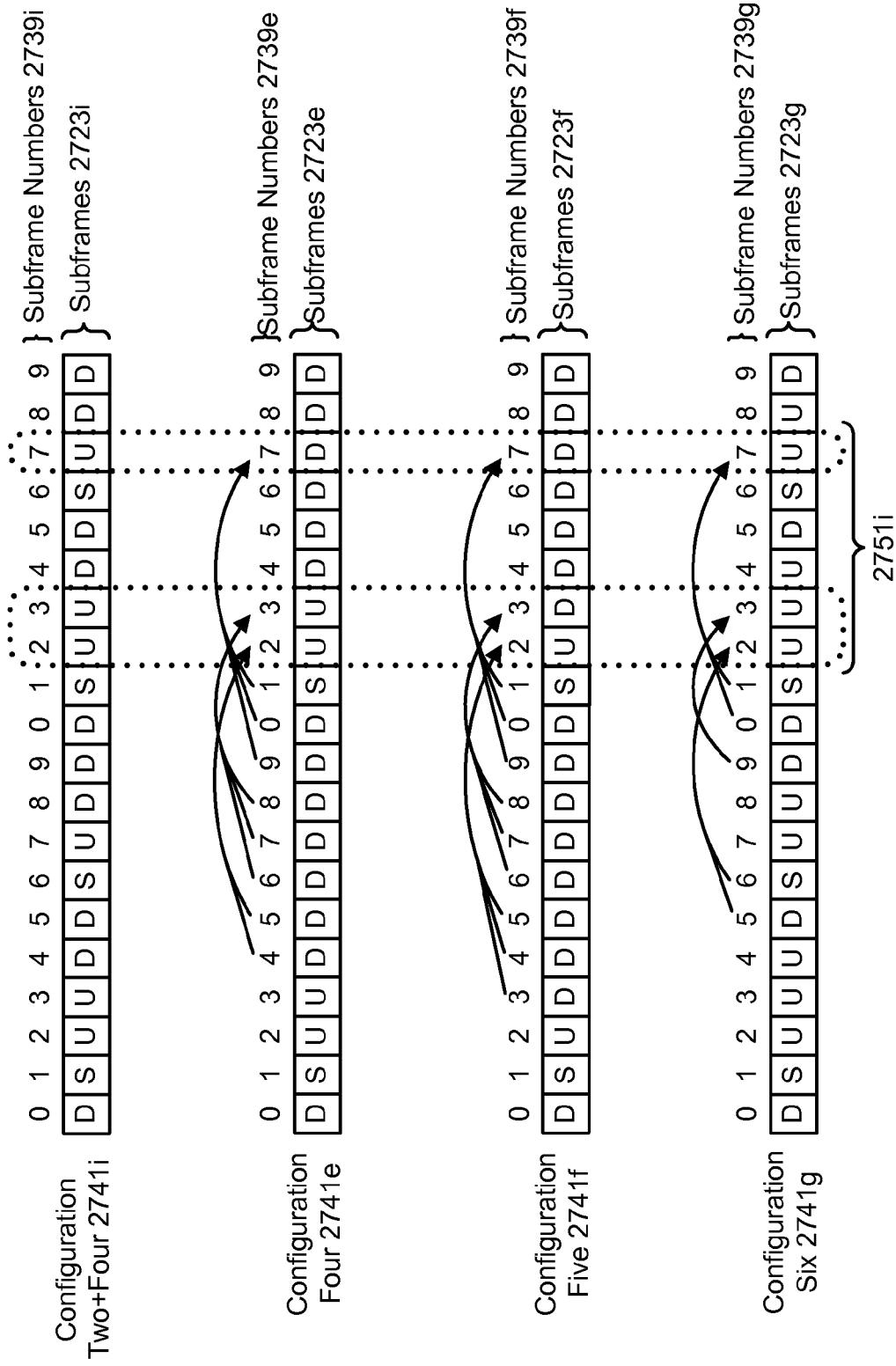
FIG. 27 is a diagram further illustrating the example set forth in FIG. 26.

FIG. 27 is a diagram further illustrating the example set forth in FIG. 26. More specifically, FIG. 27 illustrates an example of a more evenly distributed mapping approach for configuration two+four 27411 as applied to other configurations 2741*e-g*. For convenience, possible associations 2749 that have been added based on the distribution region mappings may be indicated with solid lines. Subframe numbers 2739 may indicate corresponding subframes 2723. In this example, two distribution regions 27511 may correspond to configuration two+four 27411 as described previously. As illustrated in FIG. 27, the uplink reporting associations for each of the reporting subframes in each of the UL-DL configurations may be distributed between subframes 2723 within the distribution regions 27511 as described previously. Table 29 below summarizes one example of distribution mapping associations for each of the UL-DL configurations. Table 29 corresponds with the diagrams in FIGS. 26 and 27.

TABLE 29

| Superset UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2 + 4 (Ref. Conf) | — | — | | | — | — | — | | — | — |
| 0 | — | — | 7 | 7 | — | — | — | 7, 6 | — | — |
| 1 | — | — | 8, 7 | 7, 4 | — | — | — | 7, 6 | — | — |
| 2 | — | — | 9, 8 | 8, 5, 7 | — | — | — | 8, 7, 6 | — | — |
| 3 | — | — | 7, 6 | 6, 5 | — | — | — | 8, 7, 6 | — | — |
| 4 | — | — | 8, 7 | 7, 6, 5 | — | — | — | 8, 7, 6 | — | — |
| 5 | — | — | 9, 8, 7 | 7, 6, 5 | — | — | — | 8, 7, 6 | — | — |
| 6 | — | — | 7, 6 | 4 | — | — | — | 7, 6 | — | — |

Figure 28:
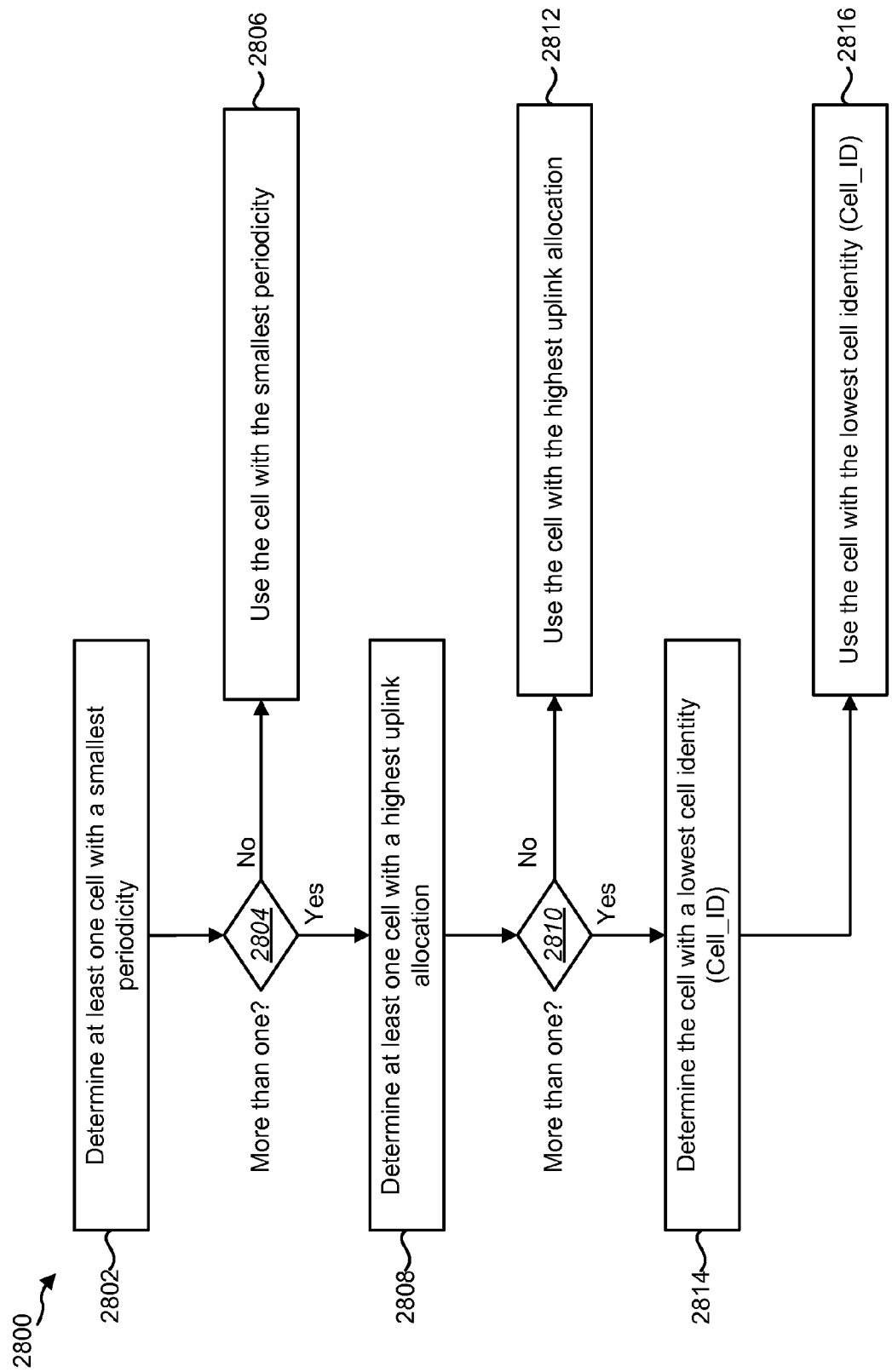
FIG. 28 is a flow diagram illustrating one configuration of a method for selecting a reference cell on a UE.

FIG. 28 is a flow diagram illustrating one configuration of a method 2800 for selecting a reference cell on a UE 102. The UE 102 may determine 2802 at least one cell with a smallest periodicity. For example, as described previously, some UL-DL configurations may have 5 ms periodicity and some UL-DL configurations may have 10 ms periodicity. In the case that some of the cells have 5 ms periodicity and some of the cells have 10 ms periodicity, then a cell with a smallest periodicity may be a cell with 5 ms periodicity. In the case that all of the cells have 10 ms periodicity, then a cell with a smallest periodicity will be a cell with 10 ms periodicity. In the case that all of the cells have 5 ms periodicity, then a cell with a smallest periodicity may be a cell with 5 ms periodicity.

The UE 102 may determine 2804 whether there is more than one cell with a smallest periodicity. If there is only one cell with the smallest periodicity (e.g., not more than one), then the UE 102 may use 2806 (e.g., designate) the cell with the smallest periodicity as the reference cell. If there is more than one cell with the smallest periodicity, then the UE 102 may determine 2808 at least one cell with a highest uplink allocation. The UE 102 may determine 2808 the cell with a highest uplink allocation from among the more than one cells determined 2802 to have a smallest periodicity. In one configuration, the UE 102 may determine 2808 at least one cell with a highest uplink allocation by comparing the number of uplink subframes. For example, configuration 0 includes six uplink subframes for each radio frame and configuration 6 includes five uplink subframes for each radio frame. In this example, between a cell with configuration 0 and a cell with configuration 6, the cell with configuration 0 may have the highest uplink allocation. Selecting a cell with the highest uplink allocation may be beneficial because the higher the uplink allocation, the more uplink subframes that associations may be distributed among. This may reduce or minimize the number of allocations per uplink subframe, which may reduce the size of uplink reporting payloads.

The UE 102 may determine 2810 whether there is more than one cell with a highest uplink allocation. If there is only one cell with a highest uplink allocation (e.g., not more than one), then the UE 102 may use 2812 (e.g., designate) the cell with the highest uplink allocation as the reference cell. If there is more than one cell with a highest periodicity, then the UE 102 may determine 2814 the cell with a lowest cell index (Cell_ID). The UE 102 may determine 2814 the cell with the lowest Cell_ID from among the more than one cells determined 2808 to have a highest uplink allocation. Each cell may have a Cell_ID. Therefore, the cell with the lowest Cell_ID may be determined 2814 by comparing Cell_ID values. The UE 102 may use 2816 (e.g., designate) the cell with the lowest cell index (Cell_ID) as the reference cell.

In one configuration, method 2800 may be used to select a reference cell based on the UL-DL configuration of each cell (selecting a reference cell any time there may be a change in cells or UL-DI configuration of a cell, for example). Once the reference cell is selected, the reference cell may be used to carry uplink ACK/NACK reporting. In another configuration, the method 2800 may be used to select a reference cell to decide the reference cell configuration. However, the actual uplink reporting may be based on each uplink subframe occurring on any of the cells. For example, the PCell may be the uplink reporting cell for some uplink subframes in the reference cell configuration, but if an SCell includes an uplink subframe when the PCell has a downlink subframe, then the uplink subframe on the SCell with the lowest Cell_ID may be selected as the uplink reporting cell for that particular subframe in the reference cell configuration.

Figure 29:
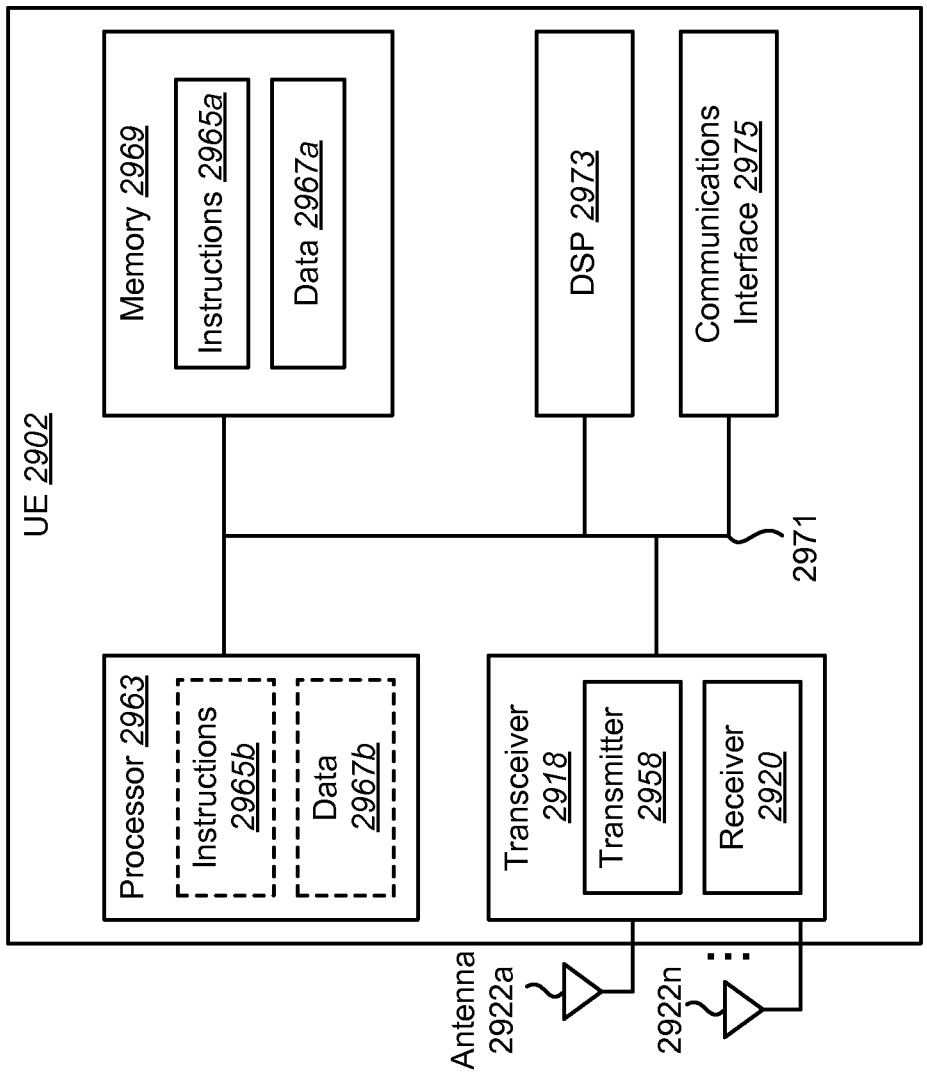
FIG. 29 illustrates various components that may be utilized in a user equipment (UE)

FIG. 29 illustrates various components that may be utilized in a user equipment (UE) 2902. The UE 2902 may be utilized as the UE 102 described above. The UE 2902 includes a processor 2963 that controls operation of the UE 2902. The processor 2963 may also be referred to as a central processing unit (CPU). Memory 2969, which may include read-only memory (ROM), random access memory (RAM), a combination of the two or any type of device that may store information, provides instructions 2965a and data 2967a to the processor 2963. A portion of the memory 2969 may also include non-volatile random access memory (NVRAM). Instructions 2965b and data 2967b may also reside in the processor 2963. Instructions 2965b and/or data 2967b loaded into the processor 2963 may also include instructions 2965a and/or data 2967a from memory 2969 that were loaded for execution or processing by the processor 2963. The instructions 2965b may be executed by the processor 2963 to implement one or more of the methods 200 and 2800 described above.

The UE 2902 may also include a housing that contains one or more transmitters 2958 and one or more receivers 2920 to allow transmission and reception of data. The transmitter(s) 2958 and receiver(s) 2920 may be combined into one or more transceivers 2918. One or more antennas 2922a-n are attached to the housing and electrically coupled to the transceiver 2918.

The various components of the UE 2902 are coupled together by a bus system 2971, which may include a power bus, a control signal bus and a status signal bus, in addition to a data bus. However, for the sake of clarity, the various buses are illustrated in FIG. 29 as the bus system 2971. The UE 2902 may also include a digital signal processor (DSP) 2973 for use in processing signals. The UE 2902 may also include a communications interface 2975 that provides user access to the functions of the UE 2902. The UE 2902 illustrated in FIG. 29 is a functional block diagram rather than a listing of specific components.

Figure 30:
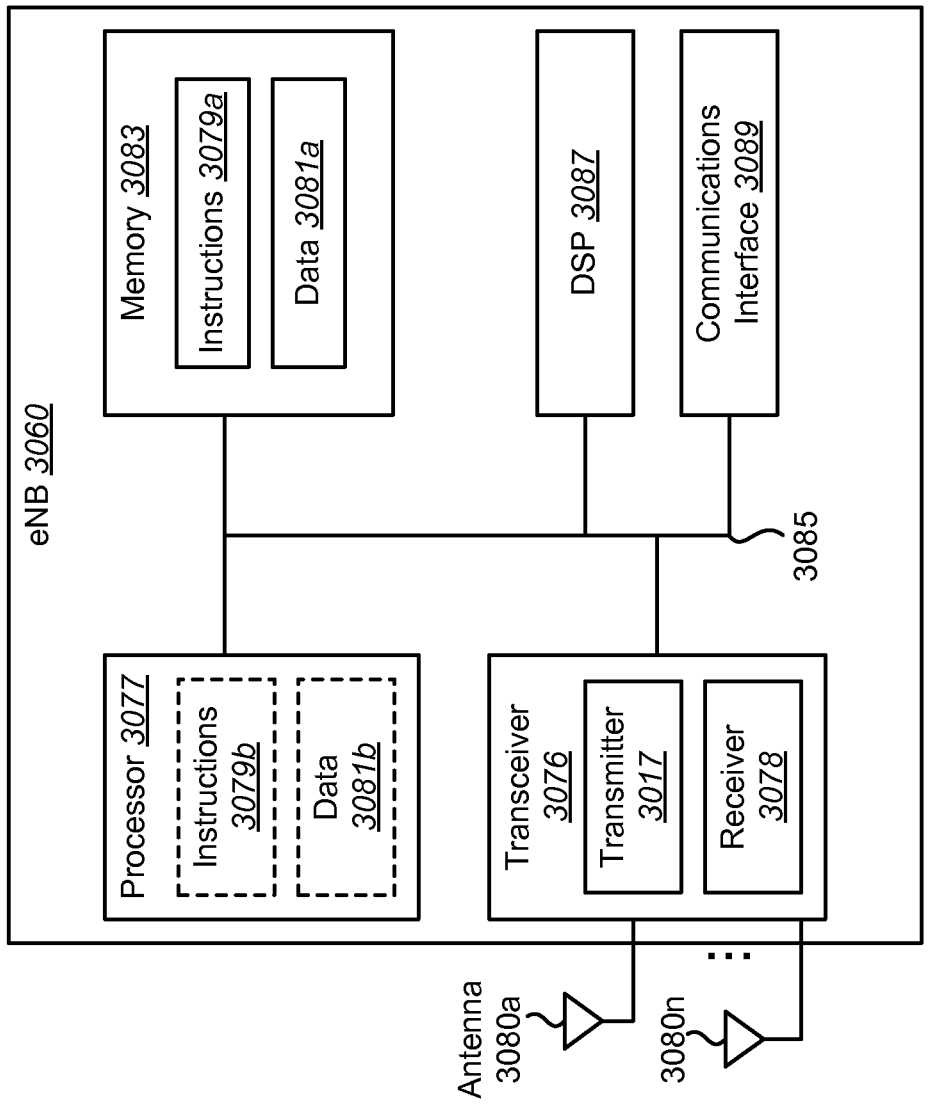
FIG. 30 illustrates various components that may be utilized in an evolved Node B (eNB).

FIG. 30 illustrates various components that may be utilized in an evolved Node B (eNB) 3060. The eNB 3060 may be utilized as the eNB 160 described above. The eNB 3060 includes a processor 3077 that controls operation of the eNB 3060. The processor 3077 may also be referred to as a central processing unit (CPU). Memory 3083, which may include read-only memory (ROM), random access memory (RAM), a combination of the two or any type of device that may store information, provides instructions 3079a and data 3081a to the processor 3077. A portion of the memory 3083 may also include non-volatile random access memory (NVRAM). Instructions 3079b and data 3081b may also reside in the processor 3077. Instructions 3079b and/or data 3081b loaded into the processor 3077 may also include instructions 3079a and/or data 3081a from memory 3083 that were loaded for execution or processing by the processor 3077. The instructions 3079b may be executed by the processor 3077 to implement the method 300 described above.

The eNB 3060 may also include a housing that contains one or more transmitters 3017 and one or more receivers 3078 to allow transmission and reception of data. The transmitter(s) 3017 and receiver(s) 3078 may be combined into one or more transceivers 3076. One or more antennas 3080a-n are attached to the housing and electrically coupled to the transceiver 3076.

The various components of the eNB 3060 are coupled together by a bus system 3085, which may include a power bus, a control signal bus and a status signal bus, in addition to a data bus. However, for the sake of clarity, the various buses are illustrated in FIG. 30 as the bus system 3085. The eNB 3060 may also include a digital signal processor (DSP) 3087 for use in processing signals. The eNB 3060 may also include a communications interface 3089 that provides user access to the functions of the eNB 3060. The eNB 3060 illustrated in FIG. 30 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE) for reporting information, comprising:
    an operations unit configured to determine a time division duplex (TDD) uplink-downlink (UL-DL) configuration of each serving cell for TDD carrier aggregation of multiple serving cells with different TDD UL-DL configurations;
    the operations unit configured to determine a reference UL-DL configuration for each serving cell based on at least the TDD UL-DL configuration of a primary cell (PCell);
    the operations unit configured to determine a downlink association set of each serving cell based on the reference UL-DL configuration for each serving cell; and
    a transmitting unit configured to report acknowledgement/negative acknowledgement (ACK/NACK) information based on the downlink association set of each serving cell.

2. The UE of claim 1, wherein if a serving cell is the PCell, the UL-DL configuration of the PCell is the reference UL-DL configuration for the serving cell.

3. The UE of claim 1, wherein if a serving cell is a secondary cell (SCell), the UL-DL configuration of the PCell is the reference UL-DL configuration for the serving cell.

4. A reporting method in a user equipment (UE), comprising:
    determining a time division duplex (TDD) uplink-downlink (UL-DL) configuration of each serving cell for TDD carrier aggregation of multiple serving cells with different TDD UL-DL configurations;

determining a reference UL-DL configuration for each serving cell based on at least the TDD UL-DL configuration of a primary cell (PCell);

determining a downlink association set of each serving cell based on the reference UL-DL configuration for each serving cell; and reporting acknowledgement/negative acknowledgement (ACK/NACK) information based on the downlink association set of each serving cell.

5. The method of claim 4, wherein if a serving cell is the PCell, the UL-DL configuration of the PCell is the reference UL-DL configuration for the serving cell.

6. The method of claim 4, wherein if a serving cell is a secondary cell (SCell), the UL-DL configuration of the PCell is the reference UL-DL configuration for the serving cell.

7. An evolved Node B (eNB) for receiving information, comprising:

an operations unit configured to determine a time division duplex (TDD) uplink-downlink (UL-DL) configuration of each serving cell for TDD carrier aggregation of multiple serving cells with different TDD UL-DL configurations;

the operations unit configured to determine a reference UL-DL configuration for each serving cell based on at least the TDD UL-DL configuration of a primary cell (PCell);

the operations unit configured to determine a downlink association set of each serving cell based on the reference UL-DL configuration for each serving cell; and a receiving unit configured to obtain acknowledgement/negative acknowledgement (ACK/NACK) information based on the downlink association set of each serving cell.

8. The eNB of claim 7, wherein if a serving cell is the PCell, the UL-DL configuration of the PCell is the reference UL-DL configuration for the serving cell.

9. A receiving method in an evolved Node B (eNB), comprising:

determining a time division duplex (TDD) uplink-downlink (UL-DL) configuration of each serving cell for TDD carrier aggregation of multiple serving cells with different TDD UL-DL configurations;

determining a reference UL-DL configuration for each serving cell based on at least the TDD UL-DL configuration of a primary cell (PCell);

determining a downlink association set of each serving cell based on the reference UL-DL configuration for each serving cell; and obtaining acknowledgement/negative acknowledgement (ACK/NACK) information based on the downlink association set of each serving cell.

10. The method of claim 9, wherein if a serving cell is the PCell, the UL-DL configuration of the PCell is the reference UL-DL configuration for the serving cell.

11. The eNB of claim 7, wherein if a serving cell is a secondary cell (SCell), the UL-DL configuration of the PCell is the reference UL-DL configuration for the serving cell.

12. The method of claim 9, wherein if a serving cell is a secondary cell (SCell), the UL-DL configuration of the PCell is the reference UL-DL configuration for the serving cell.

* * * * *